United States Patent
Kato et al.

[11] Patent Number: 5,861,821
[45] Date of Patent: Jan. 19, 1999

[54] KEYBOARD-TYPE INPUT APPARATUS

[75] Inventors: Yoshiya Kato; Syunji Kato, both of 34-6, Mejirodai 3-chome, Hachiohgji-shi, Tokyo, Japan

[73] Assignees: Misawa Homes Co., Ltd.; Yoshiya Kato; Syunji Kato, all of Tokyo, Japan

[21] Appl. No.: 522,306

[22] PCT Filed: Dec. 26, 1994

[86] PCT No.: PCT/JP94/02216

§ 371 Date: Jan. 4, 1996

§ 102(e) Date: Jan. 4, 1996

[87] PCT Pub. No.: WO95/18405

PCT Pub. Date: Jul. 6, 1995

[30]   Foreign Application Priority Data

Dec. 27, 1993 [JP] Japan ................................. 5-333822
Oct. 21, 1994 [JP] Japan ................................. 6-256920

[51] Int. Cl.⁶ .................................................. H03K 17/94
[52] U.S. Cl. ................................. 341/22; 341/23; 341/28; 400/100; 400/110
[58] Field of Search ................................. 341/20, 22, 23, 341/28; 364/709.12, 709.16; 345/168, 169, 171; 400/88, 94, 100, 110, 482, 484, 486, 489

[56]   References Cited

U.S. PATENT DOCUMENTS

| | | | |
|---|---|---|---|
| 4,655,621 | 4/1987 | Holden | 400/100 |
| 4,737,040 | 4/1988 | Moon | 400/110 |
| 4,847,799 | 7/1989 | Morita et al. | 364/709.12 |
| 5,124,702 | 6/1992 | van Ardenne | 341/22 |
| 5,367,298 | 11/1994 | Axthelm | 341/22 |

FOREIGN PATENT DOCUMENTS 2208732   4/1989   United Kingdom .

*Primary Examiner*—Jeffery Hofsass
*Assistant Examiner*—Andrew Hill
*Attorney, Agent, or Firm*—Flynn, Thiel, Boutell & Tanis, P.C.

[57]   ABSTRACT

A keyboard-type input apparatus has a main key area consisting of at least fifteen keys arranged in a three-line and five-column state to include a basic side either on right or left side of the column, of which two-column belongs to the basic side being provided as a vowel sound area to input vowel sounds and other columns composed of three-column being provided as a consonant sound area to input consonant sounds.

30 Claims, 89 Drawing Sheets

F I G. 3

FREQUENCY IN USE OF ROMAN LETTER (%)

| VOWEL SOUND | | CONSONANT SOUND (VOICELESS SOUND) | | CONSONANT SOUND (VOICELESS SOUND) | | CONSONANT SOUND (VOICED CONSONANT) | | ETC. | |
|---|---|---|---|---|---|---|---|---|---|
| A | 11.0 | K | 6.6 | M | 1.9 | G | 2.0 | ん | 3.4 |
| I | 12.7 | S | 5.2 | Y | 3.1 | Z | 1.4 | っ | 1.5 |
| U | 10.2 | T | 5.8 | R | 3.9 | D | 1.8 | 、 | 2.0 |
| E | 5.9 | N | 4.9 | W | 1.2 | B | 0.9 | 。 | 0.8 |
| O | 11.3 | H | 2.3 | | | P | 0.2 | | |

NOTE : THIS TABLE IS QUOTED FROM PUBLISHED REFERENCE OF "SKYARRANGEMENT"

F I G. 5

FREQUENCY IN USE OF ALPHABET (%)

| SPACE | 18.4 | S | 5.4 | M | 2.2 | P | 1.5 | K | 0.5 |
|-------|------|---|-----|---|-----|---|-----|---|-----|
| E | 10.8 | I | 5.3 | C | 2.1 | Y | 1.3 | J | 0.3 |
| T | 7.2 | R | 4.7 | U | 2.0 | B | 1.2 | X | 0.2 |
| A | 6.7 | H | 4.4 | W | 1.6 | , | 0.9 | Q | 0.1 |
| N | 6.0 | D | 3.3 | F | 1.6 | . | 0.9 | Z | 0.1 |
| O | 5.8 | L | 3.3 | G | 1.5 | V | 0.6 | ; | 0.1 |

QWERTY ARRANGEMENT

Dvorak ARRANGEMENT

FIG. 14(A)

PRESSING MANNER FOR COMPOUND FUNCTION

| COMPOUND FUNCTION | KEY-FINGER-CORRESPONDENCE |
|---|---|
| (A) TO LEFT AND ABOVE | ← + ↑ +機能シフト<br>(◄) (▲) (□) |
| (B) TO RIGHT AND ABOVE | ↑ + → +機能シフト<br>(▲) (▼) (□) |
| (C) TO LEFT AND BELOW | ← + ↓ +機能シフト<br>(◄) (▲) (□) |
| (D) TO RIGHT AND BELOW | ↓ + → +機能シフト<br>(▲) (▼) (□) |
| (E) TAB-MOVEMENT TO LEFT | タブ+ ← +機能シフト<br>(◄) (▲) (□) |
| (F) TAB-MOVEMENT TO RIGHT | タブ+ → +機能シフト<br>(◄) (▼) (□) |
| (G) TO TOP OF LINE | 領域+ ← +機能シフト<br>(◄) (▲) (□) |
| (H) TO END OF LINE | 領域+ → +機能シフト<br>(◄) (▼) (□) |

LEGEND : □=RIGHT HAND THUMB, ◄=RIGHT HAND INDEX FINGER
▲=RIGHT HAND MIDDLE FINGER, ▼=RIGHT HAND RING FINGER,
►=RIGHT HAND LITTLE FINGER

F I G. 14 (B)

PRESSING MANNER FOR COMPOUND FUNCTION

| COMPOUND FUNCTION | KEY-FINGER-CORRESPONDENCE |
|---|---|
| (I) TO TOP OF PAGE | 領域＋ ↑ ＋機能シフト<br>(◄)　(▲)　(□) |
| (J) TO END OF PAGE | 領域＋ ↓ ＋機能シフト<br>(◄)　(▲)　(□) |
| (K) TO TOP OF SENTENCE | 領域＋ △ ＋機能シフト<br>(◄)　(▲)　(□) |
| (L) TO END OF SENTENCE | 削除＋ ▽ ＋機能シフト<br>(◄)　(▲)　(□) |
| (M) ELIMINATION LEFT ON LINE | 削除＋ ← ＋機能シフト<br>(►)　(◄)　(□) |
| (N) ELIMINATION RIGHT ON LINE | 削除＋ → ＋機能シフト<br>(►)　(▼)　(□) |
| (O) ELIMINATION HEAD OF PAGE | 削除＋ ↑ ＋機能シフト<br>(►)　(▲)　(□) |
| (P) ELIMINATION END OF PAGE | 削除＋ ↓ ＋機能シフト<br>(►)　(▲)　(□) |

LEGEND : □=RIGHT HAND THUMB, ◄=RIGHT HAND INDEX FINGER
▲=RIGHT HAND MIDDLE FINGER, ▼=RIGHT HAND RING FINGER,
►=RIGHT HAND LITTLE FINGER

FIG. 14(C)

PRESSING MANNER FOR COMPOUND FUNCTION

| COMPOUND FUNCTION | KEY-FINGER-CORRESPONDENCE |
|---|---|
| (Q) ELIMINATION ONE LINE | 削除 + ← + → + 機能シフト<br>(▶) (◀) (▼) (□) |
| (R) ELIMINATION PRIOR SENTENCE | 削除 + △ + ↑ + 機能シフト<br>(▶) (◀) (▲) (□) |
| (S) ELIMINATION LATTER SENTENCE | 削除 + ▽ + ↓ + 機能シフト<br>(▶) (◀) (▲) (□) |
| (T) ELIMINATION ALL SENTENCES | 削除 + △ + ▽ + 機能シフト<br>(▶) (◀) (▲) (□) |
| (U) ELIMINATION FIELD | 領域 + 削除 + 機能シフト<br>(◀) (▶) (□) |
| (V) TAB SET | タブ + 領域 + 機能シフト<br>(▲) (◀) (□) |
| (W) DECIMAL TAB | タブ + ↓ + 機能シフト<br>(◀) (▲) (□) |
| (X) PAGE FEED | ↵ + ▽ + 機能シフト<br>(▶) (◀) (□) |

LEGEND : □=RIGHT HAND THUMB, ◀=RIGHT HAND INDEX FINGER
▲=RIGHT HAND MIDDLE FINGER, ▼=RIGHT HAND RING FINGER,
▶=RIGHT HAND LITTLE FINGER

FIG. 16(A)

STANDARD MODE CHANGES

| MODES | OPERATION OF MODE CHANGE | | INPUT OPERATION AFTER CHANGING |
|---|---|---|---|
| | FULL SIZE | HALF SIZE | |
| (A) HALF SIZE MODE | — | ①+②+機能シフト (◀) (□) (▼) | PRESS MAIN KEY TO INPUT MODE IN HALF SIZE |
| (B) FIGURE MODE | ②+③+機能シフト (◀) (▼) (□) | ①+③+機能シフト (◀) (□) (▼) | INPUT TEN-KEY ONE BY ONE INPUT UPPERS BY THUMB SHIFT |
| (C) SYMBOL MODE | ③+④+機能シフト (▲) (▼) (□) | ①+④+機能シフト (▼) (▼) (□) | SELECT ONE FROM SYMBOL LIST ON SCREEN TO INPUT BY KEY NUMBER |

LEGEND : □=RIGHT HAND THUMB, ◀=RIGHT HAND INDEX FINGER
▲=RIGHT HAND MIDDLE FINGER, ▼=RIGHT HAND RING FINGER,
▶=RIGHT HAND LITTLE FINGER

FIG. 16(B)

STANDARD MODE CHANGES

| MODES | OPERATION OF MODE CHANGE | | INPUT OPERATION AFTER CHANGING |
|---|---|---|---|
| | FULL SIZE | HALF SIZE | |
| (D) ENGLISH MODE | ④＋⑤＋機能シフト (▼)(▲)(□) | ①＋⑤＋機能シフト (▼)(▲)(□) | PRESS CHARACBER KEY TO INPUT SMALL LETTER IN ENGLISH |
| (E) LINE MODE | ⑤＋⑩＋機能シフト (▼)(▲)(□) | ①＋⑩＋機能シフト (▼)(▲)(□) | MOVE CURSOR ON SCREEN BY CURSOR-KEY TO INPUT LINE |
| (F) ANGULAR JAPANESE PHONETIC SYLLABARY MODE | ⑩＋⑮＋機能シフト (▼)(▲)(□) | ①＋⑮＋機能シフト (▼)(▲)(□) | PRRSS LETTER KEY TO INPUT ANGULAR JAPANESE PHONETIC SYLLABARY |

LEGEND : □=RIGHT HAND THUMB, ◀=RIGHT HAND INDEX FINGER
▲=RIGHT HAND MIDDLE FINGER, ▼=RIGHT HAND RING FINGER,
▶=RIGHT HAND LITTLE FINGER

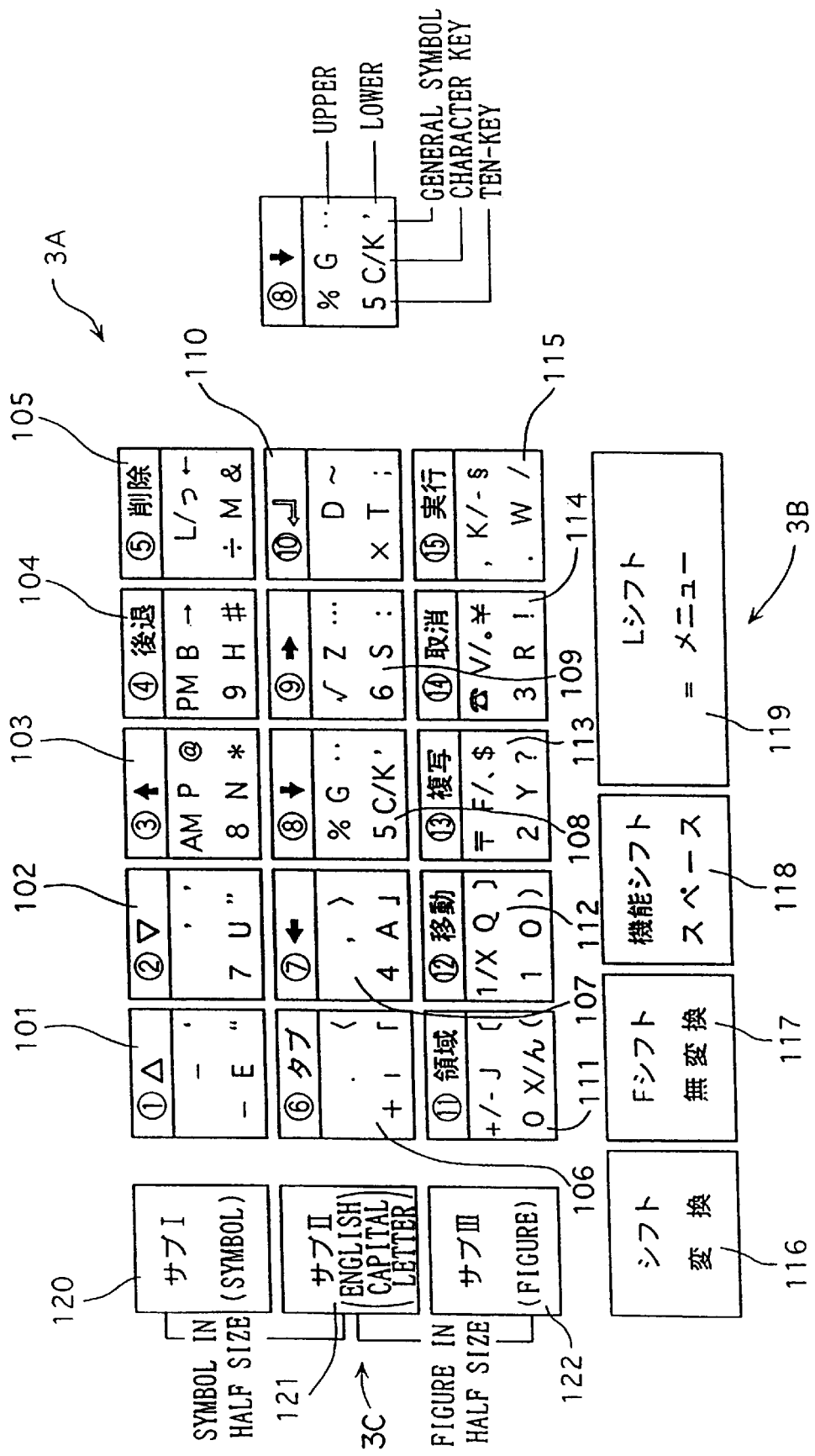

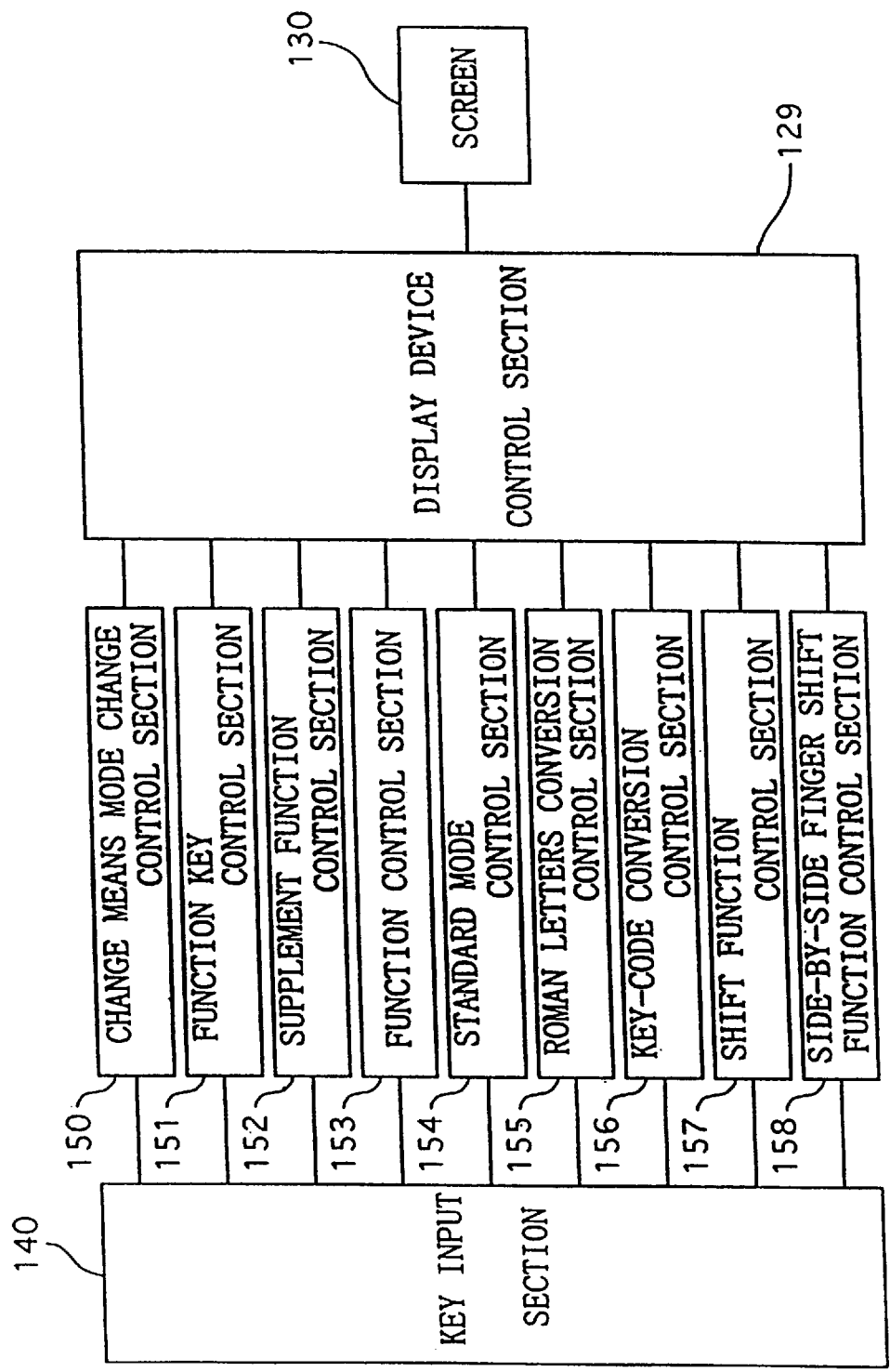

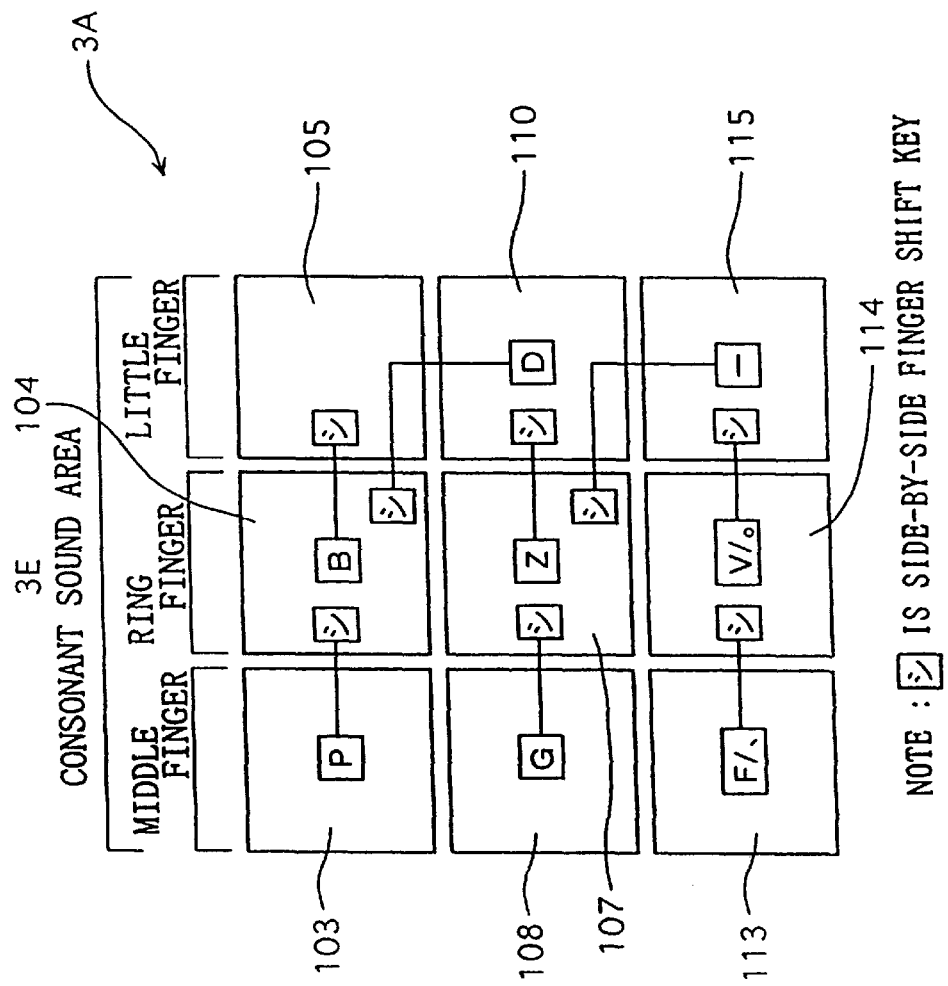

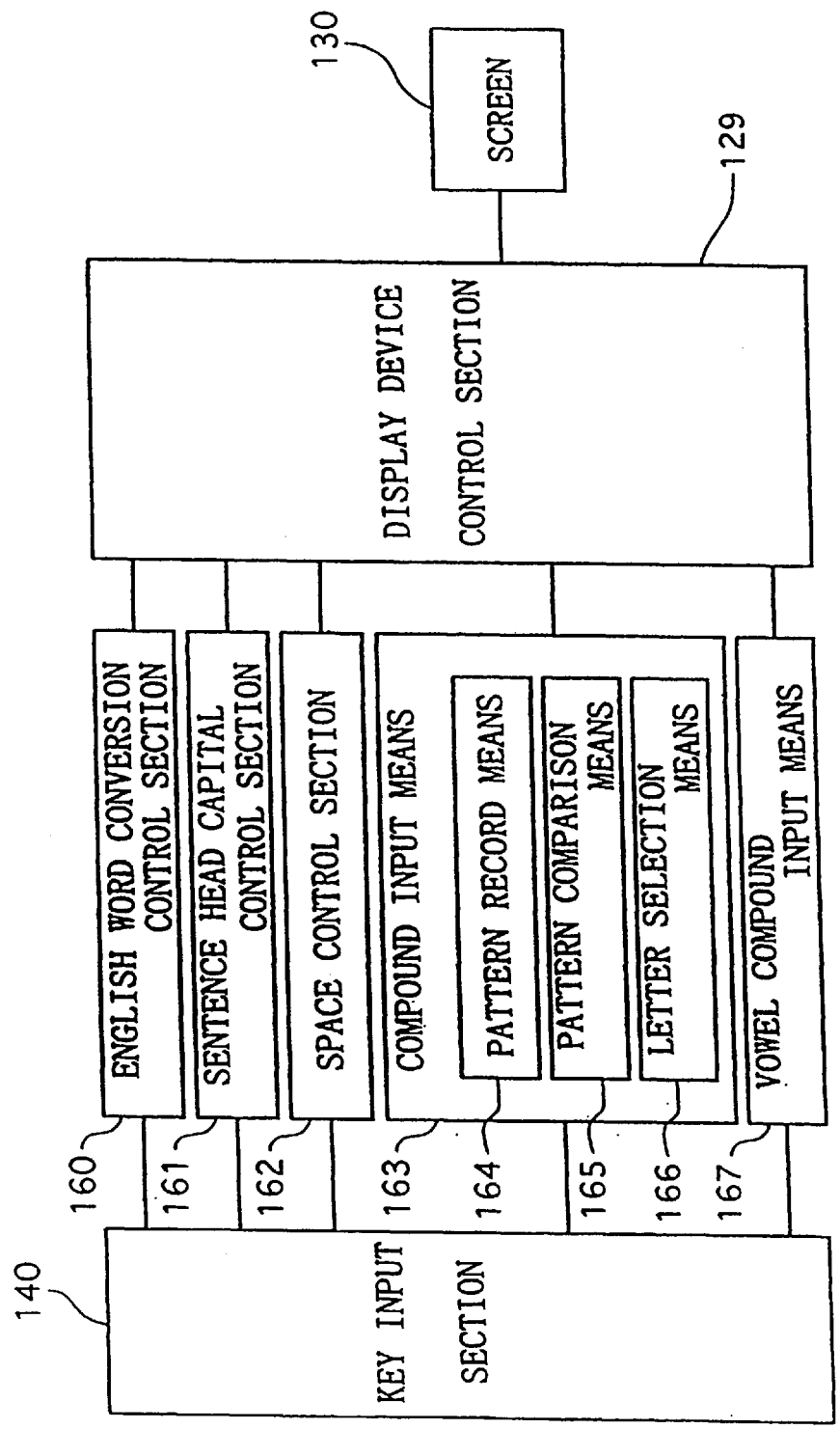

FIG. 22(A)

PATTERN OF TWO-LETTER UNIT

| BASIC ORDER | PATTERN | EXAMPLE OF TWO-LETTER WORD | EXAMPLE OF PLURAL-LETTER WORD |
|---|---|---|---|
| (A) | CONSONANT + VOWEL | do, go, he, me, so, to | cold, have, push, sight, once |
| (B) | CONSONANT + CONSONANT | by, my | straw, type, back, dish, cost |
| (C) | VOWEL + VOWEL | — | aunt, auto, ease, east, ought |

F I G. 22 (B)

PATTERN OF TWO-LETTER UNIT

| | PATTERN | EXAMPLE OF TWO-LETTER WORD | EXAMPLE OF PLURAL-LETTER WORD |
|---|---|---|---|
| BASIC ORDER | (D) OVERLAPPING CONSONANT | — | staff, call, tall, less, mitt |
| | (E) OVERLAPPING VOWEL | — | eel, eerie, oomph, oops, ooze |
| INVERTED ORDER | (F) VOWEL + CONSONANT | as, am, in, is, it, on | also, into, only, clean, poet |

FIG. 23 (A)

PATTERN OF THREE-LETTER UNIT

| | PATTERN | EXAMPLE OF THREE-LETTER WORD | EXAMPLE OF PLURAL-LETTER WORD |
|---|---|---|---|
| BASIC ORDER | (G) CONSONANT + VOWEL + VOWEL | l<u>ie</u>, s<u>ea</u>, t<u>ea</u>, y<u>ou</u> | h<u>ear</u>t, m<u>ou</u>th, r<u>ou</u>gh, t<u>ea</u>ch |
| | (H) CONSONANT + CONSONANT + VOWEL | <u>pr</u>o, <u>sh</u>e, <u>th</u>e, <u>wh</u>o | <u>pr</u>ice, <u>st</u>ock, <u>th</u>ere, ju<u>dg</u>e |
| | (I) CONSONANT + CONSONANT + CONSONANT | c<u>ry</u>, s<u>ky</u>, t<u>ry</u>, w<u>hy</u> | s<u>tyl</u>e, lu<u>cky</u>, li<u>ght</u>, ca<u>tch</u> |
| | (J) CONSONANT + OVERLAPPING VOWEL | b<u>ee</u>, s<u>ee</u>, t<u>oo</u>, z<u>oo</u> | g<u>oo</u>ds, g<u>oo</u>se, agr<u>ee</u>, thr<u>ee</u> |

FIG. 23(B)

PATTERN OF THREE-LETTER UNIT

| | PATTERN | EXAMPLE OF THREE-LETTER WORD | EXAMPLE OF PLURAL-LETTER WORD |
|---|---|---|---|
| INVERTED ORDER | (K) VOWEL + VOWEL + CONSONANT | air, ear, our, out | early, earth, outgo, pious |
| | (L) VOWEL + CONSONANT + CONSONANT | and, any, ask, old | elder, owner, going, point |
| | (M) VOWEL + OVERLAPPING CONSONANT | all, egg, ill, off | allow, apply, inner, offer |
| RECIPROCAL | (N) CONSONANT + VOWEL + CONSONANT | boy, for, him, run | first, large, music, total |
| | (O) VOWEL + CONSONANT + VOWEL | ago, are, ice, one | above, alive, alone, among |

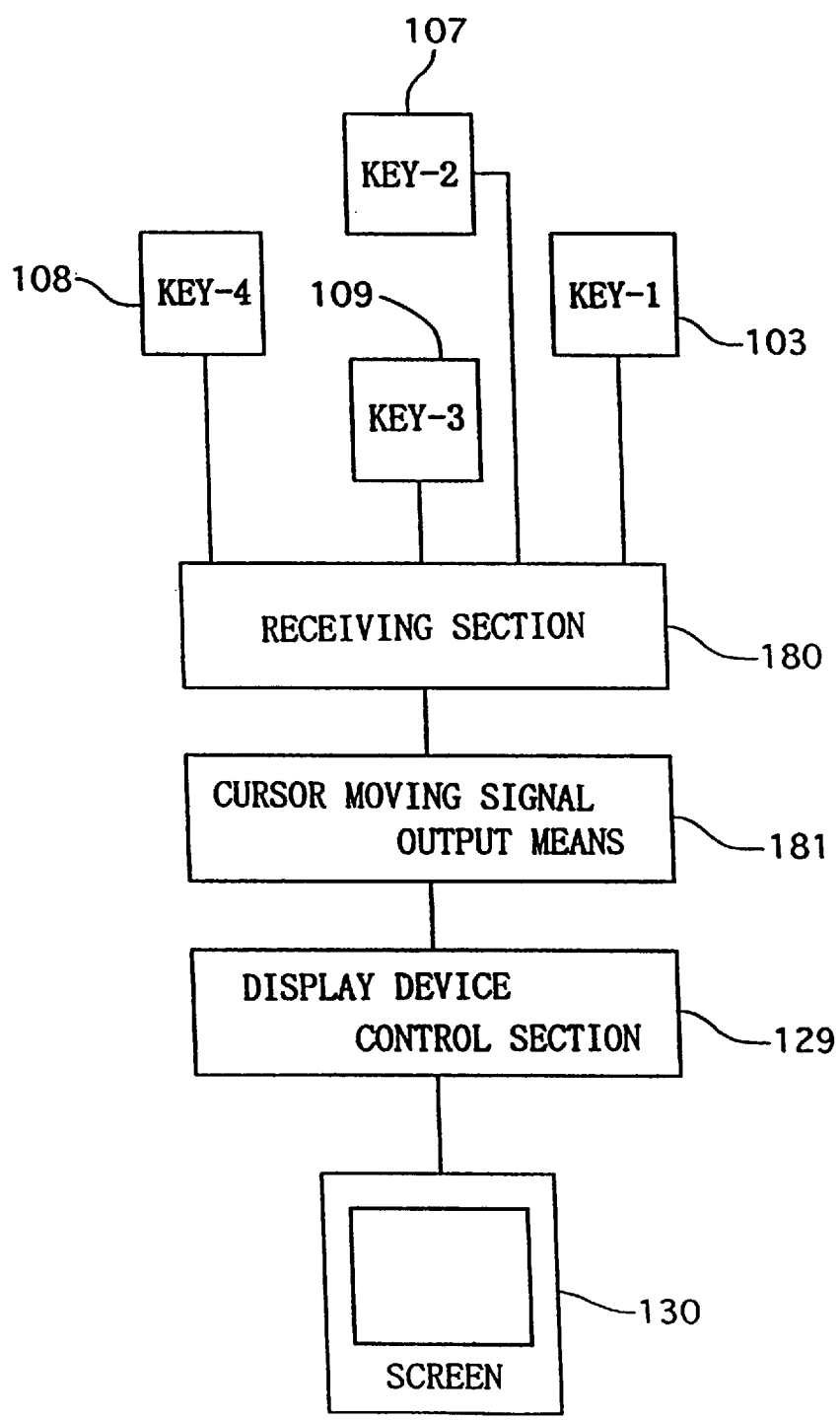

FIG. 26(A)

| | い段 (I)<br>(VOWEL I) | う段 (U)<br>(VOWEL U) | え段 (E)<br>(VOWEL E) | お段 (O)<br>(VOWEL O) |
|---|---|---|---|---|---|
| | あ段 (A)<br>(VOWEL A) | | | | |
| あ行(A)<br>(A GROUP) | あ (A) | い (I) | う (U) | え (E) | お (O) |
| か行(K)<br>(Ka GROUP) | か (Ka) | き (Ki) | く (Ku) | け (Ke) | こ (Ko) |
| さ行(S)<br>(Sa GROUP) | さ (Sa) | し (Si) | す (Su) | せ (Se) | そ (So) |
| た行(T)<br>(Ta GROUP) | た (Ta) | ち (Ti) | つ (Tu) | て (Te) | と (To) |
| な行(N)<br>(Na GROUP) | な (Na) | に (Ni) | ぬ (Nu) | ね (Ne) | の (No) |

LEGEND: ▼=RIGHT HAND INDEX FINGER, ▲=RIGHT HAND MIDDLE FINGER,
▶=RIGHT HAND RING FINGER, ◀=RIGHT HAND LITTLE FINGER

FIG. 26(B)

| | あ段 (A)<br>(VOWEL A) | い段 (I)<br>(VOWEL I) | う段 (U)<br>(VOWEL U) | え段 (E)<br>(VOWEL E) | お段 (O)<br>(VOWEL O) |
|---|---|---|---|---|---|
| は行(H)<br>(Ha GROUP) | は (Ha) | ひ (Hi) | ふ (Hu) | へ (He) | ほ (Ho) |
| ま行(M)<br>(Ma GROUP) | ま (Ma) | み (Mi) | む (Mu) | め (Me) | も (Mo) |
| や行(Y)<br>(Ya GROUP) | や (Ya) | — | ゆ (Yu) | — | よ (Yo) |
| ら行(R)<br>(Ra GROUP) | ら (Ra) | り (Ri) | る (Ru) | れ (Re) | ろ (Ro) |
| わ行(W)<br>(Wa GROUP) | わ (Wa) | ゐ (Wi) | — | ゑ (We) | を (Wo) |

LEGEND: ◀ = RIGHT HAND INDEX FINGER, ▲ = RIGHT HAND MIDDLE FINGER, ▶ = RIGHT HAND RING FINGER, ▼ = RIGHT HAND LITTLE FINGER

FIG. 27

LEGEND: ☐=RIGHT HAND THUMB, ◀=RIGHT HAND INDEX FINGER, ◢=RIGHT HAND MIDDLE FINGER, ▼=RIGHT HAND RING FINGER, ▲=RIGHT HAND LITTLE FINGER

FIG. 28

| NASAL SOUND | DOUBLE CONSONANT | LONG SOUND | COMMA |
|---|---|---|---|
| 撥音(ん) (N) | 促音(っ) (SMALL TU) | 長音(ー) | 読点(、) |
| PERIOD | | | |
| 句点(。) | | | |

LEGEND : ☐ =RIGHT HAND THUMB, ▼ =RIGHT HAND INDEX FINGER, ▲ =RIGHT HAND MIDDLE FINGER,
▼ =RIGHT HAND RING FINGER, ▶ =RIGHT HAND LITTLE FINGER

FIG. 30

| | | |
|---|---|---|
| come | CO | ME |
| some | SO | ME |
| give | GI | VE |
| have | HA | VE |
| take | TA | KE |
| like | LI | KE |

LEGEND : ☐=RIGHT HAND THUMB, ◄=RIGHT HAND INDEX FINGER, ▲=RIGHT HAND MIDDLE FINGER, ▼=RIGHT HAND RING FINGER, ►=RIGHT HAND LITTLE FINGER

FIG.31

| | KYO | SYU |
|---|---|---|
| 拳 手<br>(RAISING A HAND) | | |
| | ZYU | RYOU |
| 受 領<br>( RECEIPT ) | | |
| | TYUU | SYA |
| 駐 車<br>( PARKING ) | | |
| | ZYOU | KYOU |
| 状 況<br>( CONDITION ) | | |
| | KYOU | KYUU |
| 供 給<br>( SUPPLY ) | | |
| | SYUU | GYOU |
| 就 業<br>( OCCUPATION ) | | |

LEGEND : ▢ =RIGHT HAND THUMB, ◀ =RIGHT HAND INDEX FINGER,
▲ =RIGHT HAND MIDDLE FINGER, ▼ =RIGHT HAND RING FINGER,
▶ =RIGHT HAND LITTLE FINGER

F I G. 32

COMPOUND INPUT EXAMPLE OF SECOND SYLLABLES BEING /I, U, N/
(INPUTTED BY ONLY RIGHT HAND)

| | | |
|---|---|---|
| 該当<br>(CORRESPONDANCE) | GAI | TOU |
| 交通<br>(TRANSPORTATION) | KOU | TUU |
| 雄大<br>( HUGE ) | YUU | DAI |
| 永遠<br>( ETERNAL ) | EI | Eん |
| 水準<br>( STANDARD ) | SUI | ZYUん |
| 人類<br>( HUMAN ) | ZIん | RUI |

LEGEND : ■=LEFT HAND THUMB,  ☐=RIGHT HAND THUMB,
◄=RIGHT HAND INDEX FINGER,  ▲=RIGHT HAND MIDDLE FINGER,
▼=RIGHT HAND RING FINGER,  ►=RIGHT HAND LITTLE FINGER

COMPOUND INPUT EXAMPLE OF SECOND SYLLABLES BEING /KI, KU, TI, TU/ AND SMALL /TU/ (INPUTTED BY BOTH HANDS)

LEGEND: ■=LEFT HAND THUMB, □=RIGHT HAND THUMB,
◀=RIGHT HAND INDEX FINGER, ▲=RIGHT HAND MIDDLE FINGER,
▼=RIGHT HAND RING FINGER, ▶=RIGHT HAND LITTLE FINGER

FIG. 34

COMPOUND INPUT EXAMPLE OF CHINESE READING

| | | |
|---|---|---|
| 経 済<br>( ECONOMICS ) | KEI<br> | ZAI<br> |
| 交 通<br>(TRANSPORTATION) | KOU<br> | TUU<br>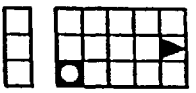 |
| 推 薦<br>(RECOMMENDATION) | SUI<br>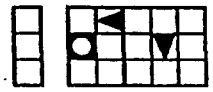 | SEん<br>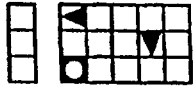 |
| 圧 縮<br>( PRESSURE ) | Aつ<br>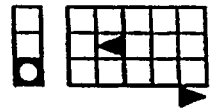 | SYU く<br>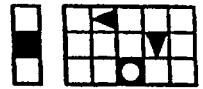 |
| 出 発<br>( DESECTIONURE ) | SYUつ<br> | PAつ<br> |
| 一 撃<br>( BLOW ) | Iち<br> | GEき<br> |

LEGEND : ■=LEFT HAND THUMB, □=RIGHT HAND THUMB,
◄=RIGHT HAND INDEX FINGER, ▲=RIGHT HAND MIDDLE FINGER,
▼=RIGHT HAND RING FINGER, ►=RIGHT HAND LITTLE FINGER

FIG.35

| | KA_ん_ | GA_E_ |
|---|---|---|
| 考え<br>( THOUGHT ) | | |
| | A_き_ | N_AI_ |
| 商い<br>( BUSINESS ) | | |
| | _OO_ | G_OE_ |
| 大声<br>( LOUD VOICE ) | | |
| | T_II_ | S_AI_ |
| 小さい<br>( SMALL ) | | |
| | MA_ち_ | G_AU_ |
| 間違う<br>( MISTAKE ) | | |
| | K_OI_ | S_II_ |
| 恋しい<br>( LOVE ) | | |

LEGEND : ■=LEFT HAND THUMB, □=RIGHT HAND THUMB,
◀=RIGHT HAND INDEX FINGER, ▲=RIGHT HAND MIDDLE FINGER,
▼=RIGHT HAND RING FINGER, ▶=RIGHT HAND LITTLE FINGER

FIG. 36

| | | |
|---|---|---|
| ビュッフェ<br>( BUFFET ) | BYUっ | FE |
| ハイファイ<br>( HI-FI ) | HAI | FAI |
| チェッカー<br>( CHECKER ) | TYEっ | KA— |
| ディーラー<br>( DEALER ) | DYI— | RA— |
| アクション<br>( ACTION ) | A< | SYOん |
| ジャンケン<br>(GAME OF PAPER,<br>STONE AND<br>SCISSORS) | ZYAん | KEん |

LEGEND : ■=LEFT HAND THUMB, ☐=RIGHT HAND THUMB,
◄=RIGHT HAND INDEX FINGER, ▲=RIGHT HAND MIDDLE FINGER,
▼=RIGHT HAND RING FINGER, ►=RIGHT HAND LITTLE FINGER

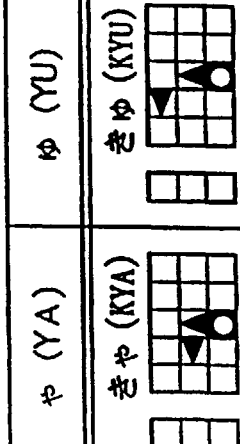

FIG. 37(B)

| | や (YA) | ゆ (YU) | よ (YO) | ゆう (YUU) | よう (YOU) |
|---|---|---|---|---|---|
| は行(H)<br>(HA GROUP) | | ひゃ (HYA) | ひゅ (HYU) | ひょ (HYO) | ひゅう (HYUU) | ひょう (HYOU) |
| ま行(M)<br>(MA GROUP) | | みゃ (MYA) | みゅ (MYU) | みょ (MYO) | みゅう (MYUU) | みょう (MYOU) |
| ら行(R)<br>(RA GROUP) | | りゃ (RYA) | りゅ (RYU) | りょ (RYO) | りゅう (RYUU) | りょう (RYOU) |

LEGEND : ■=LEFT HAND THUMB, ☐=RIGHT HAND THUMB, ◀=RIGHT HAND INDEX FINGER, ▲=RIGHT HAND MIDDLE FINGER, ▶=RIGHT HAND RING FINGER, ▼=RIGHT HAND LITTLE FINGER

FIG. 38

| | や (YA) | ゆ (YU) | よ (YO) | ゆう (YUU) | よう (YOU) |
|---|---|---|---|---|---|
| か行(G)<br>(GA GROUP) | ぎゃ (GYA) | ぎゅ (GYU) | ぎょ (GYO) | ぎゅう (GYUU) | ぎょう (GYOU) |
| さ行(Z)<br>(ZA GROUP) | じゃ (ZYA) | じゅ (ZYU) | じょ (ZYO) | じゅう (ZYUU) | じょう (ZYOU) |
| だ行(D)<br>(DA GROUP) | ぢゃ (DYA) | ぢゅ (DYU) | ぢょ (DYO) | ぢゅう (DYUU) | ぢょう (DYOU) |
| ば行(B)<br>(BA GROUP) | びゃ (BYA) | びゅ (BYU) | びょ (BYO) | びゅう (BYUU) | びょう (BYOU) |
| ぱ行(P)<br>(PA GROUP) | ぴゃ (PYA) | ぴゅ (PYU) | ぴょ (PYO) | ぴゅう (PYUU) | ぴょう (PYOU) |

LEGEND: ■=LEFT HAND THUMB, □=RIGHT HAND THUMB, ◀=RIGHT HAND INDEX FINGER,
▲=RIGHT HAND MIDDLE FINGER, ▼=RIGHT HAND RING FINGER, ▶=RIGHT HAND LITTLE FINGER

FIG.39(A)

| | いん (IN) | うん (UN) | えん (EN) | おん (ON) |
|---|---|---|---|---|
| あ行 (A GROUP) | あん (AN) | いん (IN) | うん (UN) | えん (EN) | おん (ON) |
| か行 (K) (KA GROUP) | かん (KAN) | きん (KIN) | くん (KUN) | けん (KEN) | こん (KON) |
| さ行 (S) (SA GROUP) | さん (SAN) | しん (SIN) | すん (SUN) | せん (SEN) | そん (SON) |
| た行 (T) (TA GROUP) | たん (TAN) | ちん (TIN) | つん (TUN) | てん (TEN) | とん (TON) |
| な行 (N) (NA GROUP) | なん (NAN) | にん (NIN) | ぬん (NUN) | ねん (NEN) | のん (NON) |

LEGEND: ■=LEFT HAND THUMB, □=RIGHT HAND THUMB, ◀=RIGHT HAND INDEX FINGER,
▲=RIGHT HAND MIDDLE FINGER, ▼=RIGHT HAND RING FINGER, ▶=RIGHT HAND LITTLE FINGER

FIG. 39(B)

| | あん (AN) | いん (IN) | うん (UN) | えん (EN) | おん (ON) |
|---|---|---|---|---|---|
| は行(H)<br>(HA GROUP) | はん(HAN) | ひん(HIN) | ふん(HUN) | へん(HEN) | ほん(HON) |
| ま行(M)<br>(MA GROUP) | まん(MAN) | みん(MIN) | むん(MUN) | めん(MEN) | もん(MON) |
| や行(Y)<br>(YA GROUP) | やん(YAN) | — | ゆん(YUN) | — | よん(YON) |
| ら行(R)<br>(RA GROUP) | らん(RAN) | りん(RIN) | るん(RUN) | れん(REN) | ろん(RON) |
| わ行(W)<br>(WA GROUP) | わん(WAN) | — | — | — | — |

LEGEND : ■=LEFT HAND THUMB, □=RIGHT HAND THUMB, ◀=RIGHT HAND INDEX FINGER,
▲=RIGHT HAND MIDDLE FINGER, ▼=RIGHT HAND RING FINGER, ▶=RIGHT HAND LITTLE FINGER

FIG. 40

| | あん (AN) | いん (IN) | うん (UN) | えん (EN) | おん (ON) |
|---|---|---|---|---|---|
| か行(G) (GA GROUP) | がん (GAN) | ぎん (GIN) | ぐん (GUN) | げん (GEN) | ごん (GON) |
| さ行(Z) (ZA GROUP) | ざん (ZAN) | じん (ZIN) | ずん (ZUN) | ぜん (ZEN) | ぞん (ZON) |
| だ行(D) (DA GROUP) | だん (DAN) | ぢん (DIN) | づん (DUN) | でん (DEN) | どん (DON) |
| ば行(B) (BA GROUP) | ばん (BAN) | びん (BIN) | ぶん (BUN) | べん (BEN) | ぼん (BON) |
| ぱ行(P) (PA GROUP) | ぱん (PAN) | ぴん (PIN) | ぷん (PUN) | ぺん (PEN) | ぽん (PON) |

LEGEND : ■=LEFT HAND THUMB, ◻=RIGHT HAND THUMB, ◀=RIGHT HAND INDEX FINGER, ▲=RIGHT HAND MIDDLE FINGER, ▼=RIGHT HAND RING FINGER, ▶=RIGHT HAND LITTLE FINGER

FIG. 41(A)

| | あい(AI) | うい(UI) | えい(EI) | うう(UU) | おう(OU) |
|---|---|---|---|---|---|
| あ行 (A GROUP) | あい(AI) | うい(UI) | えい(EI) | — | おう(OU) |
| か行 (KA GROUP) | かい(KAI) | くい(KUI) | けい(KEI) | くう(KUU) | こう(KOU) |
| さ行 (S GROUP) | さい(SAI) | すい(SUI) | せい(SEI) | すう(SUU) | そう(SOU) |
| た行 (T GROUP) | たい(TAI) | つい(TUI) | てい(TEI) | つう(TUU) | とう(TOU) |
| な行 (N GROUP) | ない(NAI) | ぬい(NUI) | ねい(NEI) | ぬう(NUU) | のう(NOU) |

LEGEND : ■=LEFT HAND THUMB, ◻=RIGHT HAND THUMB, ◀=RIGHT HAND INDEX FINGER, ▲=RIGHT HAND MIDDLE FINGER, ▼=RIGHT HAND RING FINGER, ▶=RIGHT HAND LITTLE FINGER

FIG. 41(B)

| | あい (AI) | うい (UI) | えい (EI) | うう (UU) | おう (OU) |
|---|---|---|---|---|---|
| は行(H) (HA GROUP) | はい (HAI) | ふい (HUI) | へい (HEI) | ふう (HUU) | ほう (HOU) |
| ま行(M) (MA GROUP) | まい (MAI) | むい (MUI) | めい (MEI) | むう (MUU) | もう (MOU) |
| や行(Y) (YA GROUP) | やい (YAI) | ゆい (YUI) | — | ゆう (YUU) | よう (YOU) |
| ら行(R) (RA GROUP) | らい (RAI) | るい (RUI) | れい (REI) | るう (RUU) | ろう (ROU) |
| わ行(W) (WA GROUP) | わい (WAI) | — | — | — | — |

LEGEND: ■=LEFT HAND THUMB, □=RIGHT HAND THUMB, ◀=RIGHT HAND INDEX FINGER,
▼=RIGHT HAND MIDDLE FINGER, ▶=RIGHT HAND RING FINGER, ▲=RIGHT HAND LITTLE FINGER

FIG. 42

| | あい (AI) | うい (UI) | えい (EI) | うう (UU) | おう (OU) |
|---|---|---|---|---|---|
| か行(G)<br>(GA GROUP) | がい(GAI) | ぐい(GUI) | げい(GEI) | ぐう(GUU) | ごう(GOU) |
| ざ行(Z)<br>(ZA GROUP) | ざい(ZAI) | ずい(ZUI) | ぜい(ZEI) | ずう(ZUU) | ぞう(ZOU) |
| だ行(D)<br>(DA GROUP) | だい(DAI) | づい(DUI) | でい(DEI) | づう(DUU) | どう(DOU) |
| ば行(B)<br>(BA GROUP) | ばい(BAI) | ぶい(BUI) | べい(BEI) | ぶう(BUU) | ぼう(BOU) |
| ぱ行(P)<br>(PA GROUP) | ぱい(PAI) | ぷい(PUI) | ぺい(PEI) | ぷう(PUU) | ぽう(POU) |

LEGEND : ■=LEFT HAND THUMB, ☐=RIGHT HAND THUMB, ◀=RIGHT HAND INDEX FINGER,
▲=RIGHT HAND MIDDLE FINGER, ▶=RIGHT HAND RING FINGER, ▼=RIGHT HAND LITTLE FINGER

FIG. 43(A)

| | あう(AU) | あえ(AE) | あお(AO) | あい(OI) | おえ(OE) |
|---|---|---|---|---|---|
| あ行 (A GROUP) | あう(AU) | あえ(AE) | あお(AO) | おい(OI) | おえ(OE) |
| か行(K) (KA GROUP) | かう(KAU) | かえ(KAE) | かお(KAO) | こい(KOI) | こえ(KOE) |
| さ行(S) (SA GROUP) | さう(SAU) | さえ(SAE) | さお(SAO) | そい(SOI) | そえ(SOE) |
| た行(T) (TA GROUP) | たう(TAU) | たえ(TAE) | たお(TAO) | とい(TOI) | とえ(TOE) |
| な行(N) (NA GROUP) | なう(NAU) | なえ(NAE) | なお(NAO) | のい(NOI) | のえ(TOE) |

LEGEND: ■=LEFT HAND THUMB, □=RIGHT HAND THUMB, ◀=RIGHT HAND INDEX FINGER,
▲=RIGHT HAND MIDDLE FINGER, ▼=RIGHT HAND RING FINGER, ▶=RIGHT HAND LITTLE FINGER

FIG. 43(B)

LEGEND: ■=LEFT HAND THUMB, □=RIGHT HAND THUMB, ◀=RIGHT HAND INDEX FINGER, ▲=RIGHT HAND MIDDLE FINGER, ▼=RIGHT HAND RING FINGER, ▶=RIGHT HAND LITTLE FINGER

FIG. 44

| | あう (AU) | あえ (AE) | あお (AO) | おい (OI) | おえ (OE) |
|---|---|---|---|---|---|
| が行(G)<br>(GA GROUP) | がう (GAU) | がえ (GAE) | がお (GAO) | ごい (GOI) | ごえ (GOE) |
| ざ行(Z)<br>(ZA GROUP) | ざう (ZAU) | ざえ (ZAE) | ざお (ZAO) | ぞい (ZOI) | ぞえ (ZOE) |
| だ行(D)<br>(DA GROUP) | だう (DAU) | だえ (DAE) | だお (DAO) | どい (DOI) | どえ (DOE) |
| ば行(B)<br>(BA GROUP) | ばう (BAU) | ばえ (BAE) | ばお (BAO) | ぼい (BOI) | ぼえ (BOE) |

LEGEND : ■=LEFT HAND THUMB, ☐=RIGHT HAND THUMB, ◀=RIGHT HAND INDEX FINGER,
▲=RIGHT HAND MIDDLE FINGER, ▼=RIGHT HAND RING FINGER, ▶=RIGHT HAND LITTLE FINGER

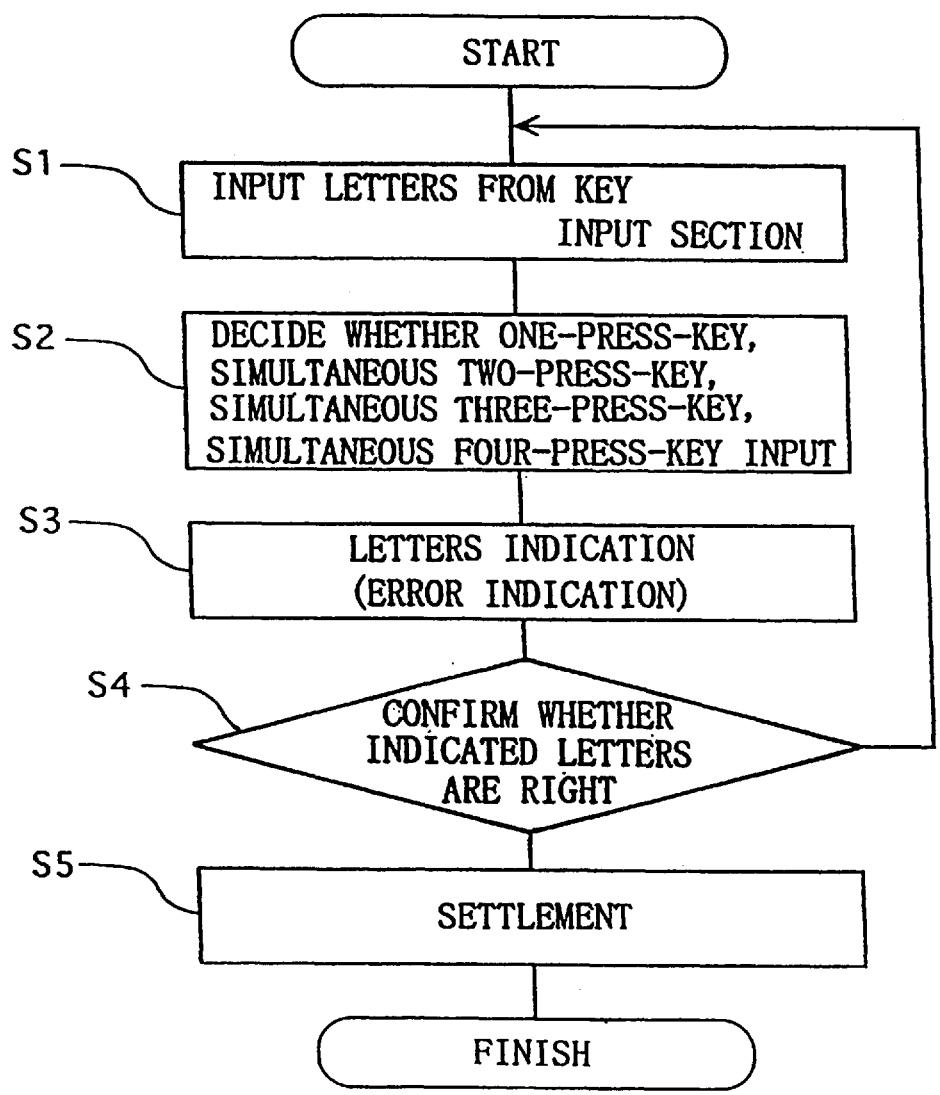
F I G. 45

FIG. 47

| | EA | ST |
|---|---|---|
| east | | |
| | GE | TS |
| gets | | |
| | JU | MP |
| jump | | |
| | HE | LP |
| help | | |
| | PA | SS |
| pass | | |
| | AL | SO |
| also | | |

LEGEND: ■=LEFT HAND THUMB, ☐=RIGHT HAND THUMB,
◀=RIGHT HAND INDEX FINGER, ▲=RIGHT HAND MIDDLE FINGER,
▼=RIGHT HAND RING FINGER, ▶=RIGHT HAND LITTLE FINGER

FIG. 48

| | SKE | TCH |
|---|---|---|
| sketch | | |
| | WEI | GHT |
| weight | | |
| | PRE | FER |
| prefer | | |
| | DEG | REE |
| degree | | |
| | OFF | END |
| offend | | |
| | OUT | AGE |
| outage | | |

LEGEND: ■ = LEFT HAND THUMB, ☐ = RIGHT HAND THUMB,
◀ = RIGHT HAND INDEX FINGER, ▲ = RIGHT HAND MIDDLE FINGER,
▼ = RIGHT HAND RING FINGER, ▶ = RIGHT HAND LITTLE FINGER

FIG. 49

| | SHA | DOW |
|---|---|---|
| shadow | | |
| | OUT | LAW |
| outlaw | | |
| | QUA | RTS |
| quarts | | |
| | TWE | NTY |
| twenty | | |
| | PAY | ING |
| paying | | |
| | BRI | NG |
| bring | | |

LEGEND : ■=LEFT HAND THUMB, ☐=RIGHT HAND THUMB,
◄=RIGHT HAND INDEX FINGER, ▲=RIGHT HAND MIDDLE FINGER,
▼=RIGHT HAND RING FINGER, ►=RIGHT HAND LITTLE FINGER

FIG. 50

| | | |
|---|---|---|
| unify | UNI | FY |
| realm | REA | LM |
| pinch | PIN | CH |
| napkin | NAP | KIN |
| eleven | ELE | VEN |
| luxury | LUX | URY |

LEGEND : ■=LEFT HAND THUMB, ◻=RIGHT HAND THUMB,
◀=RIGHT HAND INDEX FINGER, ▲=RIGHT HAND MIDDLE FINGER,
▼=RIGHT HAND RING FINGER, ▶=RIGHT HAND LITTLE FINGER

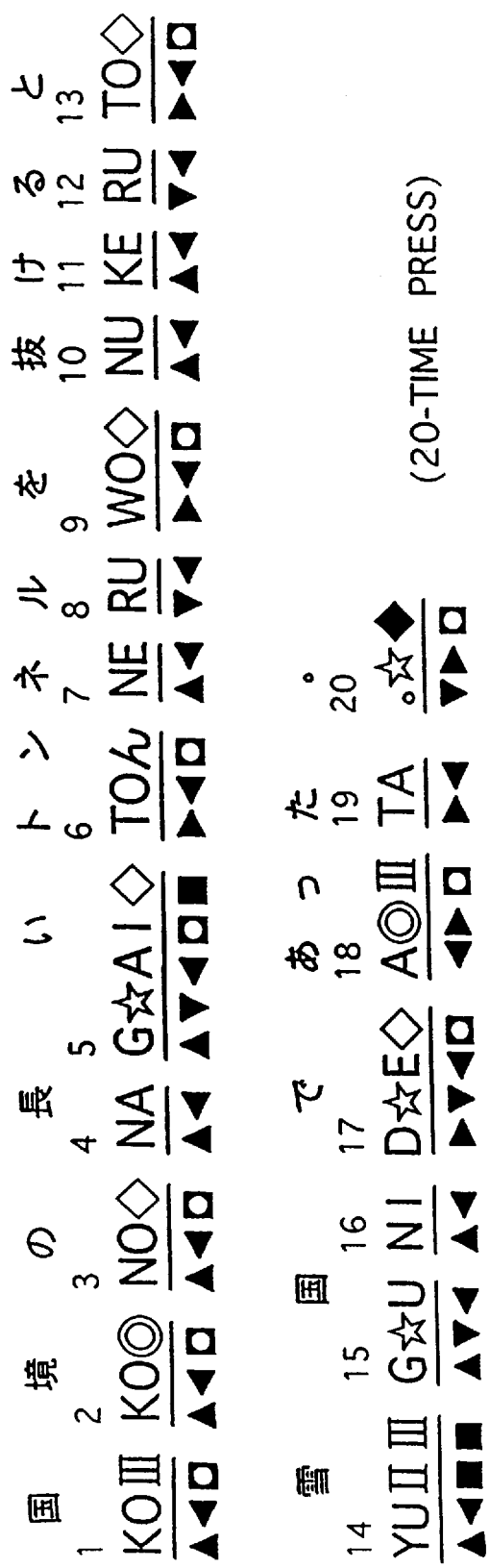

FIG. 52(B)

(EXAMPLE 2)

```
 現         代      の    通    信   に   は   パ   ソ   コ   ン   や
 1          2       3     4     5    6    7    8    9    10   11
 G☆Eん     D☆AI   NO◇  Tん   SIん NI  HA◇ P☆A  SO  KOん YA◇
 ▲▼▼▲    ▲▼▲   ▲▼◻  ▲◻   ▲◻  ▲▼  ▲▼◻ ▲▼◻ ▲▼  ▲▼◻ ▲▼◻
                                                                ◻

フ    ァ    ク    ス    が       つ   か   わ   れ   る   。
 12    13    14    15            16   17   18   19   20   21
 F☆A Ⅲ KU    SU   G☆A◇         TU   KA   WA   RE   RU  。☆◇
 ▲▼▲◻ ▲▼   ▲▼   ▲▼◻           ▲◻  ▲◻   ▲▲   ▲▼   ▲▼  ▲▼◻
                                                                (21-TIME PRESS)
```

LEGEND
FINGER ABBREVIATION SYMBOL: ■=LEFT HAND THUMB, ◻=RIGHT HAND THUMB,
▼=RIGHT HAND INDEX FINGER, ▲=RIGHT HAND MIDDLE FINGER,
▶=RIGHT HAND RING FINGER, ▶=RIGHT HAND LITTLE FINGER

KEY ABBREVIATION SYMBOL: Ⅰ=SUBKEY-Ⅰ, Ⅱ=SUBKEY-Ⅱ, Ⅲ=SUBKEY-Ⅲ, ◇=CONVERSION,
♦=NON-CONVERSION, ☆=SIDE-BY-SIDE FINGER SHIFT,
△=SHIFT, ◎=L-SHIFT

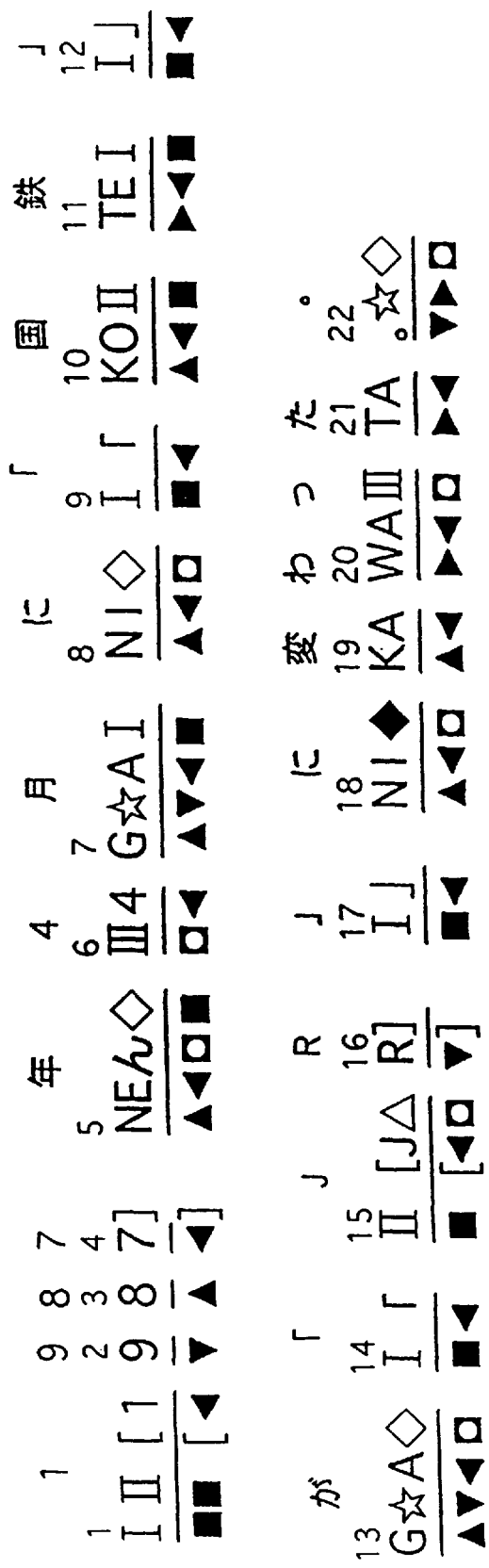

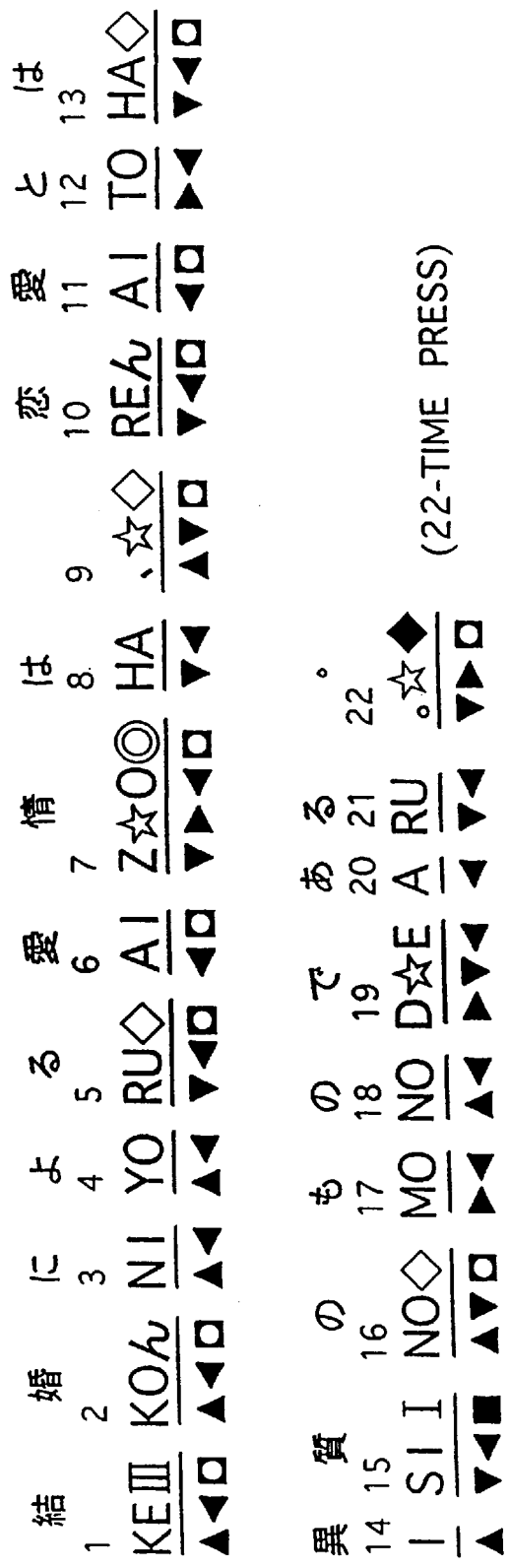

F I G. 53(B)

(EXAMPLE 5)

| 日 | 常 | 生 | 活 | か | ら | 脱 | し | て | 、 |
|---|---|---|---|---|---|---|---|---|---|
| 1 | 2 | 3 | 4 | 5 | 6 | 7 | 8 | 9 | 10 |
| NI I Ⅱ | Z☆O◎ | SEI | KAI | KA | RA◇ | D☆AⅢ | SI | TE | 、☆◇ |
| ▲▼■ | ▼▲▶□ | ▼▲□ | ▲▼□ | ▲▼ | ▲▶□ | ▲▼▶□ | ▲▼ | ▲▼ | ▲▼□ |

| 未 | 来 | の | 世 | 界 | を | 訪 | ね | た | い | 。 |
|---|---|---|---|---|---|---|---|---|---|---|
| 11 | 12 | 13 | 14 | 15 | 16 | 17 | 18 | 19 | 20 | |
| MI I Ⅱ | NO◇ | SE | KAI | WO◇ | TA | Z☆U | NE | TAI | 。☆◆ | |
| ▲▼■ | ▲▼▶□ | ▼▲□ | ▲▼□ | ▲▶□ | ▲▶□ | ▲▼▶ | ▲▼ | ▼▲□ | ▼▲□ | |

(20-TIME PRESS)

LEGEND
FINGER ABBREVIATION SYMBOL : ■=LEFT HAND THUMB, □=RIGHT HAND THUMB,
▼=RIGHT HAND INDEX FINGER, ▲=RIGHT HAND MIDDLE FINGER,
▶=RIGHT HAND RING FINGER, ▸=RIGHT HAND LITTLE FINGER

KEY ABBREVIATION SYMBOL : Ⅰ=SUBKEY-Ⅰ, Ⅱ=SUBKEY-Ⅱ, Ⅲ=SUBKEY-Ⅲ, ◇=CONVERSION,
◆=NON-CONVERSION, ☆=SIDE-BY-SIDE FINGER SHIFT,
△=SHIFT, ◎=L-SHIFT

FIG. 53(C)

(EXAMPLE 6)

| # | Kanji/Kana | Romaji | Keys |
|---|---|---|---|
| 1 | 日 | NI | ▼▲ |
| 2 | 本 | HOん | ▼□ |
| 3 | に | NI | ▲◀ |
| 4 | は | HA | ▼▲ |
| 5 | 、 | ,☆ | ◀▼□ |
| 6 | 狭 | ◇ | ▲▼ |
| 7 |   | SE | ▲▼▲ |
|   |   | MAI |   |
| 8 | か | KA | ◀▲ |
| 9 | ら | RA | ▼▶ |
| 10 | こ | KO | ▲◀ |
| 11 | そ | SO◇ | ▼□ |
| 12 | す | SU | ▼ |
| 13 | は | B☆A | ▼▲▶ |
| 14 | ら | RA | ▶▼ |

| 15 | し | SI I III | ▼■■□ |
| 16 | 自 | ◆ | ■ |
|    |   | SI | ▼▶ |
| 17 | 然 | Z☆Eん | ▼▲▼□ |
| 18 | が | G☆A | ▲▼◇ |
| 19 | あ | A◇ | ▲▼□ |
| 20 | る | RU | ▼ |
| 21 | 。 | 。☆ | ▼▶□ |

(21-TIME PRESS)

LEGEND
FINGER ABBREVIATION SYMBOL : ■=LEFT HAND THUMB, □ =RIGHT HAND THUMB,
◀=RIGHT HAND INDEX FINGER, ▲ =RIGHT HAND MIDDLE FINGER,
▶=RIGHT HAND RING FINGER, ▼=RIGHT HAND LITTLE FINGER

KEY ABBREVIATION SYMBOL :
I =SUBKEY- I , II =SUBKEY-II, III =SUBKEY-III, ◇ =CONVERSION,
◆ =NON-CONVERSION, ☆ =SIDE-BY-SIDE FINGER SHIFT,
△ =SHIFT, ⓒ =L-SHIFT

FIG. 54(A)

(EXAMPLE 7)

```
  人  間  に  は  、      知  り  た  い  と      知
  1   2  3   4  5        6   7   8  9        10  11  12
 NIん G☆Eん NI  HA  、☆◇ SI  RI  TAI TO◇    NE  G☆AU◇ TI
 ▲▼□ ▲▼□▲ ▲▼  ▲▼ ▲▽◀   ▲▼  ▲▼  ▲▼▲ ▲▽◀    ▲▼  ▲▼▲▽◀ ▲
                                                      ▼
                                                      ▲

的      好  奇     心      が   あ  る  。
  13      14         15     16  17  18  19
 TEⅡ Ⅲ   KOUⅡⅢ    SIん   G☆A◇ A  RU  ☆
 ▲▼■    ▲□◀■     ▲▼□    ▲▼□  ▲  ▲▼▲ ◆
 ▲                                    ▽
                                      □
                  (19-TIME PRESS)
```

LEGEND
FINGER ABBREVIATION SYMBOL : ■ =LEFT HAND THUMB, □ =RIGHT HAND THUMB,
▼ =RIGHT HAND INDEX FINGER, ▲ =RIGHT HAND MIDDLE FINGER,
▶ =RIGHT HAND RING FINGER, ▲ =RIGHT HAND LITTLE FINGER

KEY ABBREVIATION SYMBOL : Ⅰ =SUBKEY-Ⅰ, Ⅱ =SUBKEY-Ⅱ, Ⅲ =SUBKEY-Ⅲ, ◇ =CONVERSION,
◆ =NON-CONVERSION, ☆ =SIDE-BY-SIDE FINGER SHIFT,
△ =SHIFT, ◎ =L-SHIFT

FIG. 54(B)

(EXAMPLE 8)

```
 ま  す  ま  す   ご  清   栄   の   こ   と   と   お    菩
 1   2   3   4   5   6   7   8   9   10  11  12  13  14
 MA  SU  MA  SU◆ G☆O SEI  EI   NO◇ KO  TO  TO◆ O   YO  RO
 ▼   ▲   ▲   ▲  ▲▼  ▲▼   ▲▼   ▲▼  ▲▼  ▲   ▲▼  ▼   ▲   ▼
 ▼   □           □    □    □            □
```

```
 び       申    し   上   げ   ま   す      。
 15  16  17    18   19   20  21   22   23
 KO  B☆I◇ MOU   SI   A    G☆E MA   SU     ☆
 ▼▲  ▲▼  ▲    ▼   ▲    ▲   ▲    ▲      ◆
 ▼   □   □                              □
```

(23-TIME PRESS)

LEGEND
FINGER ABBREVIATION SYMBOL : ■ =LEFT HAND THUMB, □ =RIGHT HAND THUMB,
▼ =RIGHT HAND INDEX FINGER, ◀ =RIGHT HAND MIDDLE FINGER,
▶ =RIGHT HAND RING FINGER, ▲ =RIGHT HAND LITTLE FINGER

KEY ABBREVIATION SYMBOL :   I =SUBKEY-I,  II =SUBKEY-II,  III =SUBKEY-III,  ◇ =CONVERSION,
◆ =NON-CONVERSION, ☆ =SIDE-BY-SIDE FINGER SHIFT,
△ =SHIFT, ◎ =L-SHIFT

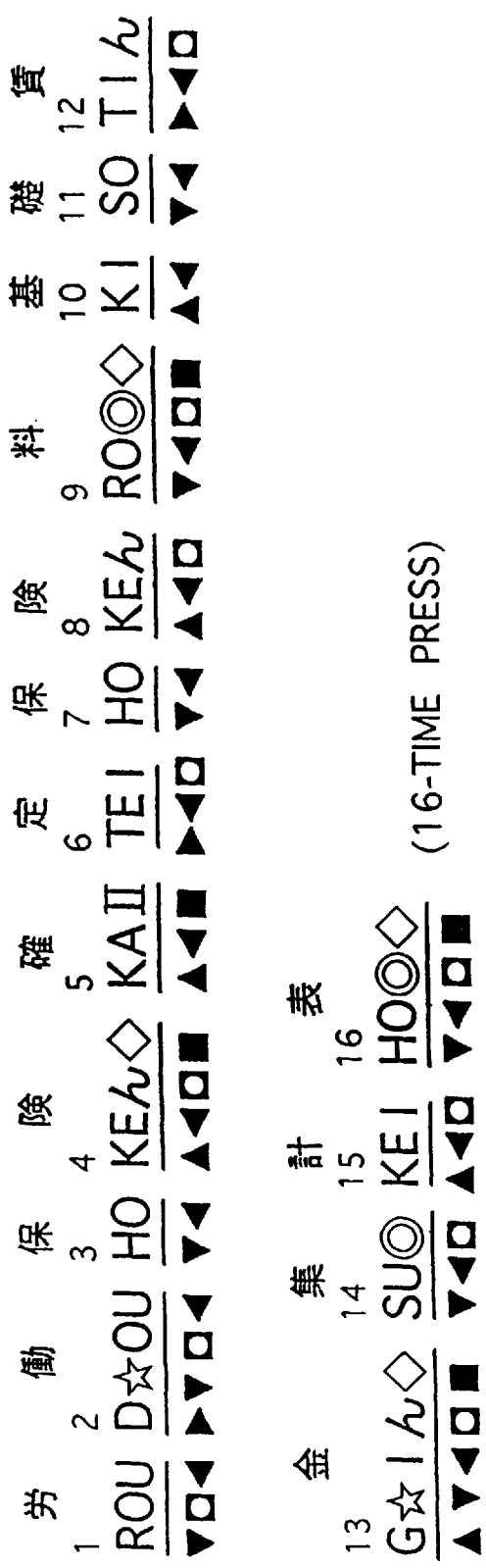

FIG.55

☐ INDICATES BLANK IN TABLE

| | HA | VE☐ |
|---|---|---|
| have☐ | | |
| | THI | S☐ |
| this☐ | | |
| | ONE | ,☐ |
| one,☐ | | |
| | GO☐ | TO☐ |
| go to☐ | | |
| | A☐ | MAN☐ |
| a man☐ | | |
| | THE☐ | END☐ |
| the end☐ | | |

LEGEND : ■=LEFT HAND THUMB, ☐=RIGHT HAND THUMB,
◀=RIGHT HAND INDEX FINGER, ▲=RIGHT HAND MIDDLE FINGER,
▼=RIGHT HAND RING FINGER, ▶=RIGHT HAND LITTLE FINGER

FIG. 56
UNDERLINED SECTION IS CAPITAL AND
☐ INDICATES BLAND IN TABLE.
| | | |
|---|---|---|
| What☐ | <u>W</u> 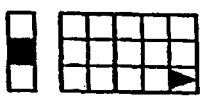 | HAT☐  |
| Rome☐ | <u>R</u> 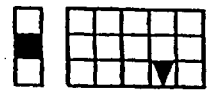 | OME☐ 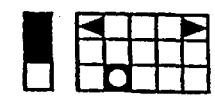 |
| John☐ | <u>J</u> 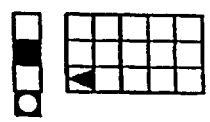 | OHN☐  |
| As☐ | <u>A</u> 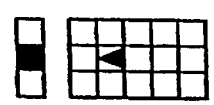 | S☐  |
| A man☐ | <u>A</u>☐  | MAN☐  |
| I am☐ | <u>I</u>☐ 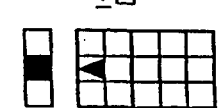 | AM☐  |
LEGEND : ■=LEFT HAND THUMB, ☐=RIGHT HAND THUMB,
◄=RIGHT HAND INDEX FINGER, ▲=RIGHT HAND MIDDLE FINGER,
▼=RIGHT HAND RING FINGER, ►=RIGHT HAND LITTLE FINGER

FIG. 57(A)

(EXAMPLE 1)

| R | e | gre |   | ts |   | are |   | as |   | per |   | so | | nal |
|---|---|-----|---|----|---|-----|---|----|---|-----|---|----|---|-----|
| 1 | 2 | 3   |   | 4  |   | 5   |   | 6  |   | 7   |   | 8 | 9 | |

II R E G△RE TS II ARE I II AS III II P△ER I SO NAL▲ I II

| | fin | | ger | | pri | | nts | . | |
|---|---|---|---|---|---|---|---|---|---|
| as | 11 | | 12 | | 13 | | 14 | 15 | |
| 10 | | | | | | | | | |

AS III II  F△IN I  G△ER I  P△RI  NTS  △

(15-TIME PRESS)

LEGEND

FINGER ABBREVIATION SYMBOL: ■ =LEFT HAND THUMB, □ =RIGHT HAND THUMB,
▼ =RIGHT HAND INDEX FINGER, ▲ =RIGHT HAND MIDDLE FINGER,
▽ =RIGHT HAND RING FINGER, ▶ =RIGHT HAND LITTLE FINGER
I =SUBKEY-I, II =SUBKEY-II, III =SUBKEY-III, △ =SHIFT,
◎ =L-SHIFT

KEY ABBREVIATION SYMBOL: ▲ =F-SHIFT, ▌=FUNCTION SHIFT, (EXAMPLE 2)

FIG. 57(C)

(EXAMPLE 3)

A person has a house near a interest in it.

(17-TIME PRESS)

LEGEND
FINGER ABBREVIATION SYMBOL: ■=LEFT HAND THUMB, ◻=RIGHT HAND THUMB,
▼=RIGHT HAND INDEX FINGER, ▲=RIGHT HAND MIDDLE FINGER,
▶=RIGHT HAND RING FINGER, ▶=RIGHT HAND LITTLE FINGER
KEY ABBREVIATION SYMBOL: I=SUBKEY-I, II=SUBKEY-II, III=SUBKEY-III, △=SHIFT,
▲=F-SHIFT, ■=FUNCTION SHIFT, ◎=L-SHIFT

FIG. 58(A)

(EXAMPLE 4)

```
 H  ou  se  wo  rk    ,
 1   2   3   4   5    6      7        8       9      10    11
ⅡH  OU  SE  WO  RK▲  ,△Ⅱ   IF△ⅢⅡ   ITⅢⅡ   ISⅢⅡ   D△O   NEⅡ
■▼  ▼▲  ▼▲  ▲▼  ▼▲▢  ▼▢■   ▼▲▢■    ▼▲■    ▼▲■    ▲▼   ▲▼■ ri  ght       ,         can           ki    ⊔
 12  13        14        15            16    17      18      19
RI   G△HT     ,△Ⅱ      CANIⅡ        K△I   L◎Ⅱ    YOU△   .△
▼▲  ▲▢▼▲     ▼▢■      ▢▼▲◼■        ▼▲   ▲▼■    ▲▢▢■   ▼▢
```

(19-TIME PRESS)

LEGEND
FINGER ABBREVIATION SYMBOL : ■ =LEFT HAND THUMB, ▢ =RIGHT HAND THUMB,
▼ =RIGHT HAND INDEX FINGER, ▲ =RIGHT HAND MIDDLE FINGER,
▶ =RIGHT HAND RING FINGER, ▶ =RIGHT HAND LITTLE FINGER

KEY ABBREVIATION SYMBOL : Ⅰ =SUBKEY-Ⅰ, Ⅱ =SUBKEY-Ⅱ, Ⅲ =SUBKEY-Ⅲ, △ =SHIFT,
▲ =F-SHIFT, ▮ =FUNCTION SHIFT, ◎ =L-SHIFT

FIG. 58(B)

(EXAMPLE 5)

```
  M  ost         wo  men              are       not          so    you   ng
  1   2           3   4                5         6            7     8     9
 ⅡM  OSTⅢⅡ      WO  MENⅡ            AREⅠⅡ    NOTⅠⅡ        SOⅡ  YOU  NG▲Ⅱ
 ▼   ▲▼▲■       ▲▼  ▲▲■              □▼▼■    ▲▼▲■          ▼▲■   ▲□▼   ▲□■
 ▲■  ■                                                              ■
```

```
      as    the   y       are          pai   nt    ed                    .
      10    11    12      13           14    15    16                    17
     ASⅢⅡ  THE   YⅡ      AREⅠⅡ        P△AⅠ  NT   ED△Ⅲ                 .△
     ▼▼■   ▲▼▲   ▲■       □▼▼■         ▲■▼   ▲▲   ▲▼□■                 ▼□
     ▲■    ▲     ▼                     ▼▼□   ▼                          ■
```

(17-TIME PRESS)

LEGEND

FINGER ABBREVIATION SYMBOL : ■ =LEFT HAND THUMB, □ =RIGHT HAND THUMB,
▼ =RIGHT HAND INDEX FINGER, ▲ =RIGHT HAND MIDDLE FINGER,
▼ =RIGHT HAND RING FINGER, ▶ =RIGHT HAND LITTLE FINGER

KEY ABBREVIATION SYMBOL : Ⅰ =SUBKEY-Ⅰ, Ⅱ =SUBKEY-Ⅱ, Ⅲ =SUBKEY-Ⅲ, △ =SHIFT,
▲ =F-SHIFT, ■ =FUNCTION SHIFT, ⊙ =L-SHIFT

FIG. 58(C)

(EXAMPLE 6)

| | C | on | cei | t | is | G | od | ' | s | gi | ft |
|---|---|---|---|---|---|---|---|---|---|---|---|
| | 1 | 2 | 3 | 4 | 5 | 6 | 7 | 8 | 9 | 10 | 11 |
| | IIC | ONIII | CEI | TII | ISIIII | IIG△ | OD△III | '△ | SII | G△I | F△TII |

| | to | li | tt | le | men | . |
|---|---|---|---|---|---|---|
| | 12 | 13 | 14 | 15 | 16 | 17 |
| | TOII | L△I | TO◎ | L△EII | MENI | .△ |

(17-TIME PRESS)

LEGEND
FINGER ABBREVIATION SYMBOL : ■=LEFT HAND THUMB, ◻=RIGHT HAND THUMB,
▼=RIGHT HAND INDEX FINGER, ▲=RIGHT HAND MIDDLE FINGER,
▽=RIGHT HAND RING FINGER, △=RIGHT HAND LITTLE FINGER

KEY ABBREVIATION SYMBOL :
I =SUBKEY-I, II =SUBKEY-II, III =SUBKEY-III, △ =SHIFT,
▲ =F-SHIFT, ■ =FUNCTION SHIFT, ◎ =L-SHIFT

FIG. 59(A)

(EXAMPLE 7)

```
  W   hen       you      be  co  me  se  ni  le       you
  1    2    3    4    5    6    7    8    9   10   11
 ⅡW  HENⅠⅡ  YOUⅡ  BΔE  CO  MEⅡ  SE  NI  LΔE  ,ΔⅡ  YOUⅡ
 ▲   ▼▲Ⅰ■  ▲□▼  ▼□   ▲   ▲▼   ▼   ▲   ▲□▼ ▼□   ▲□▼
 ■           ■    ■                        ■    ■ won  ,       t   kno       w        it   .
  12   13  14   15       16       17   18
 WONⅠ  ,  Δ  TⅡ  KΔNO    WⅡ      ITⅢ  .Δ
 ▼▼▲   ▼  □   ▲   ▲□▼     ▲       ▲▼   ▼□
 ■         ■  ■    ■      ■       ■
 ▲
```

(18-TIME PRESS)

LEGEND
FINGER ABBREVIATION SYMBOL: ■=LEFT HAND THUMB, □=RIGHT HAND THUMB,
▼=RIGHT HAND INDEX FINGER, ▲=RIGHT HAND MIDDLE FINGER,
▼=RIGHT HAND RING FINGER, ▲=RIGHT HAND LITTLE FINGER

KEY ABBREVIATION SYMBOL: Ⅰ=SUBKEY-Ⅰ, Ⅱ=SUBKEY-Ⅱ, Ⅲ=SUBKEY-Ⅲ, Δ=SHIFT,
▲=F-SHIFT, ■=FUNCTION SHIFT, ◎=L-SHIFT

FIG. 59(B)

(EXAMPLE 8)

```
 W   e      do      not
 1   2   3          4
IIW EII   D△○II   NOTI II
▼▲  ▪   ▼□▲▪   ▲▼▲▪
▪ re  mem        ber
 5   6          7
RE   MEI        B△ERI II
▼▲   ▲▪         ▼□▲▼▪▪ da       ys  ,
           8        9   10
           D△△A    YS  ,△II
           ▲▼□▲▪   ▲▼  ▼□▪ we   re  mem       ber
 11   12  13        14
WEII  RE  MEI       B△ERI II
▼▲▪   ▼▲  ▲▪         ▼□▲▼▪▪ mo   men        ts  .
 15   16         17  18
MO    MENI       TS  .△
▼▲    ▼▲▲▪       ▲▼  ▼□

(18-TIME PRESS)
```

LEGEND
FINGER ABBREVIATION SYMBOL : ▪=LEFT HAND THUMB, □=RIGHT HAND THUMB,
▼=RIGHT HAND INDEX FINGER, ▲=RIGHT HAND MIDDLE FINGER,
▼=RIGHT HAND RING FINGER, ▲=RIGHT HAND LITTLE FINGER

KEY ABBREVIATION SYMBOL :
I =SUBKEY-I, II =SUBKEY-II, III =SUBKEY-III, △ =SHIFT,
▲ =F-SHIFT, ▪ =FUNCTION SHIFT, ◎ =L-SHIFT

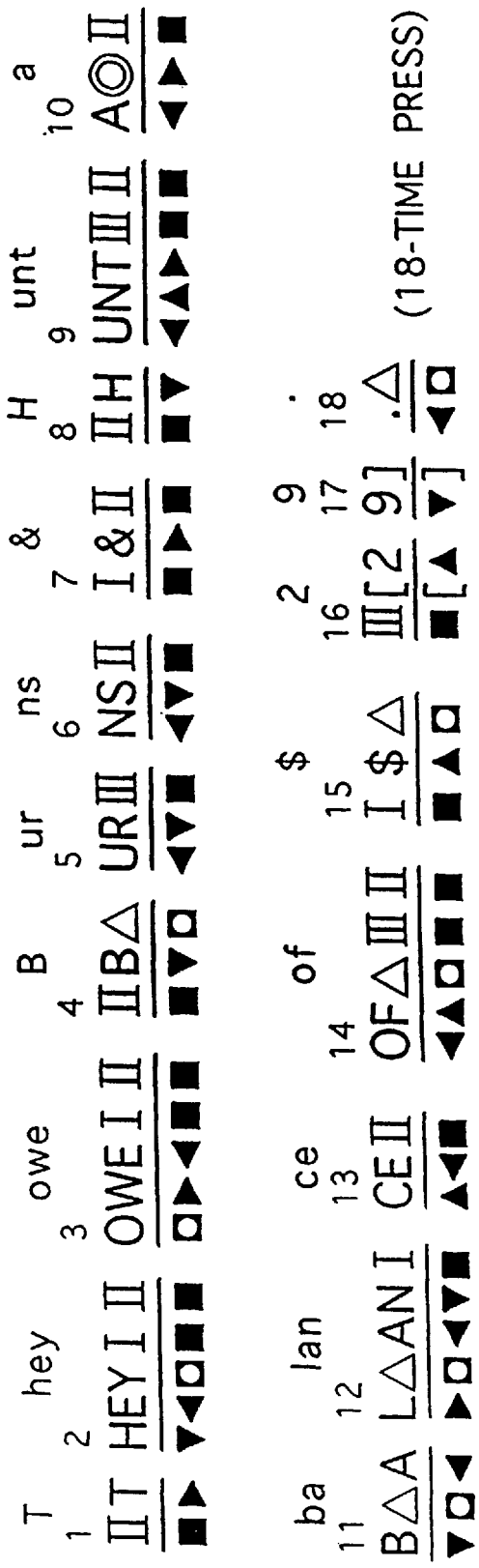

F I G. 59 (D)

(EXAMPLE 10)

|   | L | ife | | is | | 4 | 4 | 0 | hor | se | po | wer | |
|---|---|-----|---|----|---|---|---|---|-----|----|----|-----|---|
|   | 1 | 2   | 3 |    | 4 | 5 | 6 |   | 7   | 8  | 9  | 10  |   |

II L △ | IF △ E I II | IS III II | III 4 | III 4 | III O II | HOR I | SE P △ O | WER I II

|   | in | a | - | cy | lin | der | en | gi | ne | . | |
|---|----|---|---|----|-----|-----|----|----|----|---|---|
|   | 11 | 12 | 13 | 14 | 15 | 16 | 17 | 18 | 19 | 20 | 21 |

IN III II | A ◎ II | III 2 | - △ | CY | L △ I N I | D △ ER I II | EN III | G △ I | NE | . △ | □

(21-TIME PRESS)

LEGEND
FINGER ABBREVIATION SYMBOL : ■ =LEFT HAND THUMB, □ =RIGHT HAND THUMB,
▼ =RIGHT HAND INDEX FINGER, ▲ =RIGHT HAND MIDDLE FINGER,
▶ =RIGHT HAND RING FINGER, ▶ =RIGHT HAND LITTLE FINGER

KEY ABBREVIATION SYMBOL : I =SUBKEY-I, II =SUBKEY-II, III =SUBKEY-III, △ =SHIFT,
▲ =F-SHIFT, ■ =FUNCTION SHIFT, ◎ =L-SHIFT

KEYBOARD-TYPE INPUT APPARATUS

FIELD OF THE INVENTION

This invention is concerned with an apparatus utilized in a character input apparatus or an input method and, more particularly, to a key board for performing input operation as a key board used in small-sized electric notebook and word-processor, personal computer and others.

BACKGROUND OF THE INVENTION

A word-processor or personal computer has a good function to input, edit, print, and save quite freely "a sentence with Chinese character and Japanese syllabary" and various letter, symbol, drawing, and so on, will being necessary a tool (writing utensils) in future.

However, writing utensils are inconvenient for being to big and heavy and it is not easy to carry. It still has inconveniences that it cannot be put in a pocket, be handled by one hand, and is bard to be operated.

Because it is for reason of the mechanism in a word-processor or personal computer, further a surface of keyboard, and a unavoidable limitation of miniaturization for crowding with keys over eighty even of a portable type.

Namely, because it is miniaturized without decreasing the figure of 80 keys, the keys are close in formation and it is hard to type. Conversely, if the figure of keys are decreased simply, a crucial function is deteriorated and it is meaningless.

Is there any way to input more rapidly like a pocket calculator without damaging original performances of a word-processor or a personal computer? If it is possible, anybody can go for a work and a play with it in a pocket and a new media world which is completely different from now will be able to be opened.

Therefore, the development of keyboard has been required for a long time that the keyboard of the wordprocessor and personal computer could be minimizing as "a pocket calculator" in addition to easy typing in both of Japanese and English and all operation on the keyboard could be operated by one hand. Following five needed conditions are necessitated to meet the demand that figure of keys on the keyboard are drastically reduced with ensuring ability more than conventional keyboard.
1. "miniature" size to be able to type with holding by a hand.
2. "brevity" to input letter and symbol.
3. "simplicity" to make a selection from abundant functions.
4. "simplicity" to change respective modes.
5. "a high speed" to input with Japanese and English.

[EXISTING STATE OF KEYBOARD AND DISADVANTAGE THEREOF]

What everyone thinks when using a word processor and personal computer that it is hard to memorize and type a keyboard. There are many ways to type, for example, JIS rounded Japanese phonetic syllabary, roman letter input (QWERTY arrangement), thumb shift, new JIS rounded Japanese phonetic syllabary and so on as far as we know. As each has its merits and demerits, it is hard to select one of them taking future needs into consideration.

According to an explanation or a manual, it is necessary to type in touch-typing using all ten fingers without seeing a keyboard in order to input speedily and efficiently.

Many people challenge this ten-finger typing method and practice it, however some give it up halfway and return one-finger type method without practicing deliberately.

Especially in the case of JIS rounded Japanese phonetic syllabary, there are many keys in correspondence with the figure of the rounded Japanese phonetic syllabary and it is still hard to type because they are arranged in four lines. Additionally, a letter arrangement has no rule and is complicating, therefore it is difficult to memorize the arrangement and also acquire the touch type. When inputting Japanese voiced sounds (a consonant sound such as /g/, /z/ or /d/) and flat sounds (a consonant sound such as /p/), an original rounded Japanese phonetic syllabary sound is input at first and a mark of the Japanese voiced sound ["] or that of the flat sound [°] is input thereafter and after all we need to press the key twice.

On the other hand, in the case of ROMAN LETTER INPUT, it is comparatively easy to type in the touch typing because ROMAN LETTER INPUT is similar to an English input of which letter figure is not many, the figure of key is small, and it has three lines' arrangement which is easy for typing. Nowadays, more 80% of men prefer roman letters among general word processor and personal computer population except professionals.

Apparently effective "ROMAN LETTER INPUT", however, needs to input with pressing the keys twice for one "JAPANESE SYLLABARY LETTER" because of letter keys separated a vowel sound and a consonant sound. Defects which the figure of pressing the key increases than "JIS JAPANESE SYLLABARY" and the inputting time is prolonged cannot be denied.

In "THUMB SHIFT" which is thought as the most rationally convenient way in the input method of Japanese or "NEW JIS JAPANESE SYLLABRY" similar to the former, one key is allotted two letters which are classified by shift of a thumb or little finger. An effective design is actualized to easily type with the touch-typing because of less figure of keys arranged in the three-line on the keyboard. The difficulty of mastering the key position is not such different from "JIS JAPANESE SYLLABARY", so that many people think and hesitate of the compatibility of the keyboard and others or the diffusion in future.

[CONTRADICTIONS OF KEYBOARD AND MANY TRIALS]

To examine why such problems have still remained even after the word-processor and personal computer gained popularity, it is found out that the present keyboard improved from past English typewriter and Japanese syllabaries such as JIS JAPANESE SYLLABARY were forcibly used without changing their forms.

Still, in the case of ROMAN LETTER INPUT, an alphabet arrangement used for an English sentence composition called QWERTY ARRANGEMENT is diverted to Japanese sentence composition. Accordingly, it is natural that contradictions that frequently used letters are arranged in positions not coming up to a human engineering or conversely not-used letters are arranged in positions coming up to a human engineering occur.

Furthermore, the keys are arranged off to the right side in zigzags in a present keyboard, which is a remnant of the past mechanical typewriter. A mechanism of the machinery is similar to a construction of a piano, that is the key striking a letter is connected with a type bar, tapping a paper, therefore the connected bars are scrubbed and lie on each other if upper and lower keys are not arranged off to the side.

The key arrangement which each lines for keys is slightly arranged off to the right side to one another in a zigzag state is absolutely needed on a current keyboard of electronic switch type but is applied by habit. A deficiency of the human engineering such as asymmetric arrangement disturbs in a finger effective shifting. It is easily convinced that the keyboard arrangement which each lines of keys is not slightly arranged off set would force into typing easier when a ten-key of the personal computer and the key arrangement of the pocket calculator are thought of.

Most people who have thought of the solution of a contradictory matter upon the input in Japanese have studied the development of the keyboard in order to easily memorized the key position thereon, to be easy typed, and to be easy input in speed with the touch-typing. Some excellent method in the theoretical and essentials such as SKY ARRANGEMENT and M-TYPE are proposed but is not generally known unfortunately yet.

This contradiction of the input method exists not only in Japanese also in English keyboard. The worldwide common QWERTY ARRANGEMENT is in fact an arrangement not coming up to a human engineering for English.

It is considered that QWERTY ARRANGEMENT were devised in the beginning of the typewriter, however, there were a problem that neighboring type bars with letters were lied on each other, therefore the frequently used letters were arranged in position not coming up to a human engineering apart from each other. Afterwards, many improvements have been suggested, one of which being called Dvorak Arrangement which is an excellent representative method, and it acquired a high reputation, however, it missed an opportunity, being spread to only some people.

EXPECTATION OF SMALL-SIZED INPUT TOOL MEETING DOWNSIZED COMPUTER

Nowadays, a function of the computer has been improved into high quality and diversified more and more. Conversely, a function of electronics has been subdivided, turning to a downsizing.

The word processor and personal computer is being miniaturized from a desktop model to a laptop model improving the function, furthermore to a portable notebook model and to a palm-top model.

The small-sized electronic notebook becomes popular and the function is improving every year, some being supplied with capacities superior to that of the personal computer of one generation before. To be regret, the size of the keys arranged on the keyboard of the present small-sized electric notebook is extremely small, whereby it is an effort to type without watching the keys, not to speak of the touch typing.

Recently, PEN INPUT method of a non-keyboard is improved in a small-sized personal computer called PORTABLE INFORMATION TOOL and PDA developed from the small-sized electric notebook and a method to select letters or information shown on a screen by an attached touch pen or to "input by hand writing" letters or symbols on the screen directly is getting popular.

However, the demerits of this PEN INPUT method are that the touch typing cannot be performed because depending on only one pen like SINGLE-FINGER TYPING METHOD, whereby, speedy typing can not be desired as much as KEY INPUT method.

By the way, many people may have wrong views that a time when the keyboard or the touch pen is not needed comes in the future and it will be possible to input Japanese by SOUND INPUT of Japanese. It cannot be denied that there is possibility of this SOUND INPUT, however, many problems must be solved.

First of all; to perform a selection of a complicating FUNCTION or a change of MODE by only the sound as minutely and rapidly as the present word processor except simple letters or words requires techniques as high as to operate an automobile by the sound.

Secondly, to read the sound clearly is not desirable in the case of feeling uncomfortable in other people's presence or keeping information a secret. Accordingly, KEY INPUT is more preferable for the input of minutes or memorandum at a meeting and the input at a train and others where there are many people than SOUND INPUT in the future.

If there is the PORTABLE INFORMATION TOOL of which size is approximately a notebook with the small-sized keyboard which can be handled easily like the pocket calculator, it can be utilized for various purposes.

For example, it is integrated with a portable telephone, whereby speedy personal computer communication or electric mail can be carried out. The present portable telephone has defects of bothering others and being unable to keep information a secret. If BOTH DIRECTION LETTER COMMUNICATION of the small-sized keyboard can be carried out, materials can be transmitted and answered and records can be kept from the meeting or the train, compact MULTI-MEDIA TERMINAL will come true.

Some people who are usually handling the word processor or personal computer at an office or home get irritated because they do not have a suitable computer at hand when inputting and recording sentences and ideas outside suddenly.

Current portable wordprocessor and personal computer are used in its own way but a facile typing is impossible because, for example when a person types into the wordprocessor or personal computer while standing in a train or input the keys by on his/her lap the touch-typing in the train, his/her elbow is bumps against other or the wordprocessor or personal computer slides down from his/her lap.

Because current key arrangement on the keyboard is designed prerequisite for the operation by both hands. A big number of keys separated into letter keys and function keys will causes the keyboard to be hard to type with crowding of the keys, if the keyboard is sized to be small without changing the design.

If it is actual that the small-sized keyboard is used practically in earnest, the mechanism would be needed to reconsider basically with devising the drastic reduction of key figure while keeping the property.

CONCEPT OF SMALL-SIZED KEYBOARD

It is convenient to strike all keys by only right hand holding it by a left hand like a small-sized electronic notebook when designing a convenient small-sized keyboard for carrying. An abacus which was as important as reading and writing was made to operate its beads by an index finger and a thumb of the right hand being held by the left hand.

This input method of the pocket calculator of the abacus by one hand must be the most fitted method for Japanese who use chopsticks at meals once they get accustomed to this method, operating speedily.

Why has it been thought important to type the wordprocessor or personal computer using all fingers of both right and left hands? It is because that there are much information needed for the input such as letters, functions and others overwhelmingly compared with the pocket calculator and the abacus and it has followed the mechanical English typewriter's footstep as it is by allotting one key to one letter or one function.

As the result, we became to need to struggle hard with the keyboard possessing keys ten times as many as fingers of both hands (for example, a portable one has closely 80 keys). It cannot be hoped to use all keys by the touch typing.

Therefore, as a result that this inventor investigates earnestly in order to solve the above-mentioned conventional problems, LETTER.SYMBOL.FUNCTION.MODE allotted to the keyboard was sorted out on a new consideration such as LEFT HAND AUXILIARY of RIGHT HAND PRINCIPLE, it was compacted using an electronic mechanism different from the mechanical one effectively, and a new keyboard-type input apparatus typing all keys rapidly and simply by the touch typing has been invented.

The present inventor and others surveyed beforehand a precedent technique in the International Patent Classification "G06F3/02" by a patris of the Japan Patent Information Association as a conventional technique of the key input apparatus. In consequence, following relative references are obtained, Japanese Patent Application Publication No. He 4-77331 "A keyboard of key arrangement for 2-stroke", Japanese Patent Application Publication No. He 5-21247 "A keyboard apparatus for inputting in Japanese", Japanese Patent Application Publication No. He 3-37054 "A keyboard apparatus", Japanese Patent Application Publication No. He 4-139520 "A keyboard apparatus utilized for inputting Japanese by a few keys", and so on.

The former three of the precedent technique are different from the new way key input device which the present inventor and others invented "RIGHT HAND PRINCIPLE" and "LEFT HAND AUXILIARY", hence impossible matters are to type briefly, simply and rapidly all keys on the keyboard by the touch-typing with one hand.

The two technique of Japanese Patent Application Publication No. He 4-77331 "A keyboard of key arrangement for 2-stroke", Japanese Patent Application Publication No. He 5-21247 "A keyboard device for inputting in Japanese" are prerequisite to input with both of right and left hands, hence the structure is not the way of inputting with the key arrangement of less keys by one hand.

Japanese Patent Application Publication No- He 3-37054 "A keyboard apparatus" has the key arrangement input in the alphabet, the square form of the Japanese Syllabary, the Japanese syllabary and so on with less keys arranged. But it leaves two things which the simple typing on the key arrangement and letters of the vowel sound group and the consonant sound group out of consideration, so that letters are not able to input quickly.

Japanese Patent Application Laid-open No. 4-139520 "A keyboard apparatus utilized for inputting Japanese by a few-keys" is that alphabets are "complicatedly arranged in five lines and four columns, among which each key except the right end is arranged by two keys on each right and left side, the left letters being inputted by one hand's striking and the right letters being inputted by striking with right neighbor key. The technique is possible to input the letters by one band because 4-line arrangement is used as 7-line arrangement to press neighbor keys at the same time. In the technique the letter input by one hand is possible, but since Japanese or English is inputted by typing always alphabets one by one, the letter input is difficult, and the various needful function selection as the wordprocessor cannot.

The intention of this invention is to solve the following problems in the above-mentioned conventional functions.

First of all, the input speed is slow because there are many keys in correspondence with the figure of JAPANESE SYLLABARY and keys are arranged in four lines in the case of the conventional JIS JAPANESE SYLLABARY.

Secondary, the figure of times for striking keys is more and the input time becomes longer than JIS JAPANESE SYLLABARY, because the letter keys are divided into consonant and vowel sounds and therefore striking twice is necessary for inputting one JAPANESE SYLLABARY, even though the input of ROMAN LETTER INPUT looks more effective than that of JIS JAPANESE SYLLABARY.

Thirdly, there is no small-sized keyboard which can correspond to the word-processor and personal computer, select one among abundant functions, and input letters rapidly when the word-processor and personal computer are becoming miniaturized and changing into the portable notebook model and the palm-top model furthermore especially in the future. Recently, "PEN INPUT" method of non-keyboard has been developed, whereby sentences and information displayed on the screen can be selected by an attached touch pen and sentences and symbols written directly on the screen are inputted, of which way is acquiring its popularity, however, there is a disadvantage that the keyboard method cannot be hope to get a smooth input.

This invention is suggested in consideration with the previous conditions and its object is to provide the keyboard-type input apparatus being utilized for memorizing LETTER.SYMBOL.FUNCTION.MODE more easily than the general keyboard, arranging the keys in compound in an easily typing order, typing matched several keys simultaneously, and inputting all keys rapidly by the touch typing.

It is still an object to provide the keyboard-type input apparatus improving an application to the word-processor, personal computer and so on of the palm-top model and provided without making worse its usage of the word-processor or personal computer of the portable notebook or palm-top model by decreasing the figure of the striking keys.

SUMMARY OF THE INVENTION

The unique points in the present invention are that fifteen keys in the three-line and five-column are at least divided into the vowel sound area and consonant sound area to assign the vowel sounds and consonant sounds onto respective keys, and before explaining various embodiment in the present invention, it will have to be explained first that the fifteen keys are arranged in the three-line and five column state and the key latwistedt concept is originally reconsidered by the present inventors.

Referring to FIG. 1, there is shown the positions for the right fingers upon using the fifteen keys, in vertical three lines and horizontal five columns (the positions shown with the figures of 7, 8, 9 and 10 with circle in the drawing), which have a possible sphere for the fingers pressing smoothly the keys with the touch-typing by fingers of either the right hand or left hand except the thumb. Upon considering pressing effectively in accordance with conventional way of typing, the right fingers on the key arrangement should be divided into the two columns in the left side assigned by the index finger and the three columns in the right side assigned by the middle finger, ring finger and little finger and the home positions of such the four fingers are divided onto the four keys of the figures of 7, 8, 9 and 10 with circle in the middle line.

FIG. 13 shows EASY TYPING ORDER of fifteen keys in vertical three columns and horizontal five lines. As shown in FIG. 2, in the area of one index finger and the area including one middle, ring and little fingers, the finger positions on the middle line are the easiest typing area and the upper line is the second easiest followed by the lower line and furthermore as shown by figure in the figure, in each line the area of one index finger has 1 and 2 from the right of the figure and the area of one middle, ring and little fingers has 1, 2 and 3 from the left of the figure in easy typing order.

Furthermore, when four keys are added below the fifteen keys of vertical three columns and horizontal five lines (the lowest column) and pressed by one thumb, one thumb can be used in the area of the thumb as shown in FIG. 2. A key of (4) at the right end in the lowest column can be pressed by one little finger when it is difficult to press by one thumb.

While nineteen keys of fifteen keys in the vertical three columns and horizontal five lines and four keys in the lowest column are used and the position of each key are kept, one single key or plural keys of some fingers' combination are pressed, which does not demolish a natural form of hand and fingers and it is comparatively easy to type by the touch typing.

Necessary letter, figure, symbol, function and mode are arranged in compound in this keyboard-type input apparatus and plural keys are pressed simultaneously, so that various input can be performed easily. The inventors devised the letter latwistedt of the keyboard-type input apparatus for this invention.

The letter latwistedt of the keyboard-type input apparatus is needed to consider the following points.

The most important thing for planing the keyboard-type input apparatus is the arrangement for easy remembering and typing in accordance with a frequency of used letters. More preciously, the following four points are needed.
1. The letter arrangement has such rules as much as possible that it is easy to remember.
2. The high frequent letters are arranged at easy pressing key positions.
3. The position of the high active finger, such as an index or thumb should be wide and the used frequency should be high.
4. The activity becomes lower in the order of a middle, ring and little fingers, so that the used frequency needs to be adjusted to the order.

To be convenient, Japanese appearance frequency has its rule to some degrees.

FIG. 3 shows an appearance frequency of alphabets in Roman letter input and fifty sounds have always vowels respectively and the frequency of the vowel is the highest the Roman letter input and the following order is consonant Ka group, Sa group, Ta group, Na group and so on in the frequent order which is almost the same order as fifty sound table as shown in FIG. 3.

FIG. 3 was taken from an announced material of SKY ARRANGEMENT.

According to an easy typing order in FIG. 2, in the fifty sounds order, vowels are arranged at one index finger position, which is VOWEL AREA and consonants are arranged at one middle, ring and little finger position, which is CONSONANT AREA, whereby SEPARATED AREA ARRANGEMENT can be formed for easy remembering and typing in accordance with the appearance frequency to some degrees.

FIG. 4 shows a basic construction of this invention and explains in correspond to FIG. 2 that the keyboard-type input apparatus is comprising a main key area consisting of at least fifteen keys in vertical three lines and horizontal five columns and including a basic side on either right or left side of the column, a vowel sound area consisting of two columns of keys (the right two columns in the figure) in the basic side and inputting vowel sounds, and a consonant sound area consisting of the remained three column of keys (the left three columns in the figure) and inputting consonant sounds (in FIG. 4 of one right hand, the left two columns are the vowel area and the right three columns are the consonant area) and "I" and "A" are arranged at the middle line in the vowel area, "E" and "U" are at the upper line, and "O" is at the lower line.

"K", "S" and "T" are arranged at the middle column, "N", "H" and "M" are arranged at the upper column, and "Y", "R" and "W" are arranged at the lower column in said consonant sounds area. "G", "Z", "P" and "B" inputting Japanese voiced consonants and P-sound by a combination of vowels "A", "I", "U", "E" and "O" in the shift condition of each "K", "S", "T", "N" and "H" (the shift key written " シフト " at the lowest line in FIG. 4 changing each key into a shift condition or non-shift condition is pressed) are arranged in the consonant sound area.

The inventors examined not only Japanese arrangement for easy typing but also English arrangement for easy typing and considered a common arrangement for easy typing of both Japanese and English.

Namely, the letter arrangement of conventional English machine-type writer is as follows.
1 QA 2 ZWS 3 XE 4 DCRF 5 VTG 6 BYHN 7 UJ 8 MIK 9, OL O.P To examine this order minutely, it is found that figures are not arranged successively. Additionally, it is found that neighbor spellings of "the, twisted, she, they, it, for, and, to" which are frequently used are not arranged successively. This is because type bars with letters lie one above the other and successively used letters of high frequency are arranged separately. Namely, the arrangement of English type writer are not planned as a premise of easy typing.

FIG. 5 shows the appearance frequency of alphabet, space, period and comma in order to examine an input method of effective and easy-typing English.

FIG. 5 quotes "English word-processor step test text book" (Gijyutu Htwistedron Co.) written by Yoshitaka Hagino.

"QWERTY ARRANGEMENT" shown in FIG. 6 (refer to FIG. 6(a)) and "Dvorak ARRANGEMENT" (refer to FIG. 6(b)) are compared referring to FIG. 5.

In QWERTY ARRANGEMENT, "F, J, K" which are comparatively low appearance frequency are arranged at the middle line of index and middle fingers of right and left hands, which are the most easy typing positions. Conversely, five vowels with comparatively high frequency are arranged disconnectedly and "E" is at the left upper line of a middle finger, which is not comparatively an easy typing position. Accordingly, ALTERNATE PRESSING for good balance of right and left hands can not be desired.

On the other hand, in Dvorak ARRANGEMENT most consonant are arranged at the right hand positions centered around high frequent letters such as "T. N. S. H" and all five vowels are arranged at the left hand positions. The reason for this is that consonant and vowel are pressed in pairs, consonants of which figure is more than vowels are arranged loosely at the right hand positions, and high frequent vowels of which figure is less than consonants are arranged intensively at the center of left finger positions, so that "RECIPROCAL PRESSING KEY" can be easily performed by both right and left hands.

English and Japanese are not similar, though one common part is that both languages have completely similar five vowels and words are formed by combining consonants and vowels when expressed in Roman letters. When Japanese are inputted by using Dvorak ARRANGEMENT by which English is easily pressed, Dvorak ARRANGEMENT is far easier for pressing than QWERTY ARRANGEMENT.

If are paradox of this fact is realized and the thought of the above-mentioned Japanese standard arrangement is similar to Dvorak ARRANGEMENT, Japanese arrangement can be applied to English standard arrangement.

Comparing the arrangement in FIG. 4 with Dvorak ARRANGEMENT in FIG. 6(b), its forms and letter positions are different, however, thought of arrangement are similar. High frequent consonants are arranged at the right three columns and five vowels are at the left two columns, so that RECIPROCAL PRESSING KEY and SIMULTANEOUS PRESSING KEY can be easily performed by the combinations of one middle, ring, little and index finger.

In this invention, not only Japanese key also English are arranged in a common easy-typing arrangement by a basic key arrangement as shown in FIG. 4.

Shortly, as recited in claim 1, the present keyboard-type input apparatus has a main key area consisting of at least fifteen keys arranged in a three-line and five-column state to including a basic side either on right or left side of the column, two-column which belongs to the basic side being provided as a vowel sound area to input vowel sounds and other columns composed of three-column being provided as a consonant sound area to input consonant sounds.

As recited in claim 2, the keyboard-type input apparatus has a home position instruction means for indicating a home position on the keys at the middle of the column, arranged in the main key area is formed and to establish a projection on the key surface can be listed as the home position instruction means.

As recited in claim 3, the present keyboard-type input apparatus is that the keys in the vowel and/or consonant sounds area are lined up in conformity with an easy-pressing order and a frequency in use.

As recited in claim 4, the present keyboard-type input apparatus is that the easy-pressing order starts from the basic side to the opposite side in the middle line first, in the upper line second and in the lower line third.

As recited in claim 5, the present keyboard-type input apparatus is that the keys in the vowel sound area are assigned as vowel sound keys of "A", "I", "U", "E" and "O" respectively to input Japanese vowels, and the keys in the consonant sound area are assigned as voiceless sound keys of "K", "S", "T", "N", "H", "M", "Y", "R" and "W" respectively to input Japanese voiceless sound of "か行" (Ka group), "さ行" (Sa group), "た行" (Ta group), "な行" (Na group), "は行" (Ha group), "ま行" (Ma group), "や行" (Ya group), "ら行" (Ra group) and "わ行" (Wa group) in conjunction with the vowel sound keys.

As recited in claim 6, the present keyboard-type input apparatus has the keys' assignment in the vowel sound area as keys for inputting "I" and "A" are arranged in this order from the basic side on the middle line, keys for inputting "E" and "U" are arranged in this order from the basic side on the upper line, and key for inputting "O" is arranged on either key on the lower line.

As recited in claim 7, the present keyboard-type input apparatus has the keys' assignment in the consonant sound area as keys for inputting "K", "S" and "T" are arranged in this order from the basic side on the middle line, keys for inputting "N", "H" and "M" are arranged in this order from the basic side on the upper line, and keys for inputting "Y", "R" and "W" are arranged in this order from the basic side on the lower line.

As recited in claim 8, the present keyboard-type input apparatus has a shift key changing each key arranged in said main key area either in a shift condition or non-shift condition thereof, and wherein the respective keys of "K", "S", "T", "N" and "H" in the consonant sound area are also provided to be as keys of "G", "Z", "D", "P" and "B" inputting Japanese voiced consonants and P-sound in conjunction with the vowel sound keys of "A", "I", "U", "E" and "O".

As recited in claims 9 and 10, the present keyboard-type input apparatus according to any one of claims 5 to 8, is that some of the keys in the main key area are also provided to input a nasal sound "ん" /n/, a double consonant "っ" /t/, a period "、", a comma "。" and a long sound "—" are arranged in said main key area, and one key on the lower line in the vowel sound area is assigned as a key of "ん" /n/.

As recited in claim 11, the present keyboard-type input apparatus has a shift key changing each key arranged in the main key area either in a shift condition or non-shift condition thereof, and the keys in the vowel sound area under the shift condition are adapted to input a comma ",", a period ".", a hyphen "-" and an apostrophe "'".

As recited in claims 12 and 13, the present keyboard-type input apparatus according to claim 1, comprises a change means for alternating a Japanese input mode by means of Roman letter input and English input mode by Alphabet input. And the keys on the lower line in the vowel sound area are assigned as "O" and "X".

As recited in claim 14, the present keyboard-type input apparatus according to claim 12, is that the key at a home position for the middle finger on the middle line and on the one column in the consonant sound area is provided as a key of "C/K" to input the consonant sound "K" in the Japanese input mode and to input an alphabet "C" in the English input mode.

As recited in claim 15, the present keyboard-type input apparatus according to claim 12, further comprises a shift key changing each key arranged in the main key area either in a shift condition or non-shift condition thereof, and the keys arranged in said main key area are arranged such that the keys on the upper line under the shift condition are assigned respectively from the basic side as a hyphen symbol "-", an apostrophe symbol "'", "P", "B" and "L", the keys on the middle line under the shift condition are assigned respectively from the basic side as a period ".", a comma ",", "G", "Z" and "D", and the keys on the lower line under the shift condition are assigned respectively from the basic side as "J", "Q", "F", "V" and "K".

As recited in claim 16, the present keyboard-type input apparatus according to claim 1, further comprises a function control key alternating each key in the main key area between under a letter key condition and under a function key condition, the keys in the main key area under the function key condition being adapted to carry out "後退" (RETREAT), "削除" (DELETE), "改行" (LINE FEED), "実行" (RETURN), "取消" (DELETE), "タブ" (TAB), "移動" (MOVE), "領域 設定" (REGION SETUP), "単漢字" (SINGLE CHINESE CHARACTER), "前候補"(FORMER SELECTION), "部首別" (SORTING ON STANDARD COMMON PART COMPOSING CHINESE CHARACTER), and "分野別" (SORTING ON FIELD).

As recited in claim 17, the present keyboard-type input apparatus according to claim 16, is that the function control key is provided at a place to be pressed with a thumb when the middle line row is used as a home position for waiting index, middle, ring and little fingers.

As recited in claim 18, the present keyboard-type input apparatus according to claim 16, is that the function control key consists of plural subkeys arranged outside of the basic side of said main key area, and plural control keys arranged below the lower line in said main key area.

As recited in claim 19, the present keyboard-type input apparatus according to claim 1, further comprises a shift key changing each key arranged in the main key area either in a shift condition or non-shift condition thereof, and a side-by-side finger shift input means for generating a symbol code established under the shift condition of one key when the one key and other keys corresponding to the one key are pressed at the same time.

As recited in claim 20, the present keyboard-type input apparatus according to claim 16, further comprises a function shift input means for carrying out a predetermined function upon pressing plural associated keys at the same time.

As recited in claim 21, the present keyboard-type input apparatus according to claim 19 is that the plural associated keys are two side-by-side keys in one line.

As recited in claim 22, the present keyboard-type input apparatus according to claim 19 is that the plural associated keys are of key combinations selected from the upper or middle line and from one line lower than the upper or middle line at an opposite to the basic side.

As recited in claim 23, the present keyboard-type input apparatus according to claim 1, further comprises a compound input means for generating a predetermined symbol code corresponding to a combination state of keys which are pressed simultaneously.

As recited in claim 24, the present keyboard-type input apparatus, is that the compound input means is provided with a vowel compound input means for producing Japanese letter codes of a twisted sound or diphthong when simultaneously pressing plural vowel sound keys establishing vowel sounds which become the twisted sounds or diphthong.

As recited in claim 25, the present keyboard-type input apparatus, is that the compound input means includes a pattern record means for recording a combination patter of plural keys and character string corresponding to the combination pattern, a pattern comparing means for comparing the combination of plural keys pressed simultaneously with the pattern recorded in the pattern record means, and a character string selection means for obtaining and outputting the character string from the pattern record means corresponding to the patterns when an applied pattern is find out in the pattern comparing means.

As recited in claim 26, the present keyboard-type input apparatus according to claim 25, is that the plural character string in a different arrangement are established corresponding to the combination pattern of the keys, and wherein the character string selection means is adapted to select the plural character strings in turns in accordance with a predetermined key operation.

As recited in claim 27, the present keyboard-type input apparatus according to claim 25, is that the patterns are defined by fifteen patterns; six patterns of two letters (A) consonant+vowel, (B) consonant+consonant, (C) vowel+vowel, (D) diphthong consonants, (E) diphthong vowels, (F) vowel+consonant; and nine patterns of three letters (G) consonant+vowel+consonant, (H) consonant+consonant+vowel, (I) consonant+consonant+consonant, (J) consonant+diphthong vowels, (K) vowel+vowel+consonant, (L) vowel+consonant+consonant, (M) vowel+diphthong consonants, (N) consonant+vowel+consonant, (O) vowel+consonant+vowel.

As recited in claim 28, the present keyboard-type input apparatus according to claim 25, is that the patterns belong to the twisted sound patterns of "consonant+Y+vowel" such as "しゃ" /sya/, "しゅ" /syu/ and "しょ" /syo/ concerning the spelling of Japanese Roman input.

As recited in claim 29, the present keyboard-type input apparatus according to claim 25, is that the patterns are to include syllabic nasal sound at the end such as "vowel+syllabic nasal", for example "あん" /an/, "いん" /in/ and "うん" /un/ and "consonant+syllabic nasal", for example "かん" /kan/, "きん" /kin/ and "くん" /kun/ concerning the spelling of Japanese Roman input.

As recited in claim 30, the present keyboard-type input apparatus according to claim 1, further comprises a cursor movement key provided in said main key area and a cursor movement signal output means for outputting a cursor movement signal moving the cursor displayed on a monitor of a word-processor or personal computer when the cursor movement key is pressed.

As recited in claim 1, the present keyboard-type input apparatus has a main key area consisting of at least fifteen keys arranged in a three-line and five-column state to including a basic side either on right or left side of the column, two-column which belongs to the basic side being provided as a vowel sound area to input vowel sounds and other columns composed of three-column being provided as a consonant sound area to input consonant sounds. Therefore, frequently used vowel sounds can be inputted by actively using index fingers because the vowel sound area is assigned as a position of index fingers and the consonant sound area is assigned as a position of middle fingers, ring fingers and little fingers upon inputting keys by hands stood by on the keys arranged with three columns and five lines for typing.

As recited in claim 2, the keyboard-type input apparatus has a home position instruction means for indicating a home position at the middle of the column of the keys arranged in the main key area. Therefore, it facilitates to identify the position to place fingers in the main area key consist of 15 keys arranged in 3 lines and 5 columns.

As recited in claim 3, the present keyboard-type input apparatus is that the keys in the vowel and/or consonant sounds area are lined up in conformity with an easy-pressing order and a frequency in use. And also, as recited in claim 4, the present keyboard-type input apparatus is that the easy-pressing order starts from the basic side to the opposite side in the middle line first, in the upper line second and in the lower line third. Therefore, the operation on the key input can be elevated by allotting the most actively used index fingers in whole fingers for high frequently used letters and middle fingers, ring fingers and little fingers to other letters in order of using frequently.

As recited in claim 5, the present keyboard-type input apparatus is that the keys in the vowel sound area are assigned as vowel sound keys of "A", "I", "U", "E" and "O" respectively to input Japanese vowels, and the keys in the consonant sound area are assigned as voiceless sound keys of "K", "S", "T", "N", "H", "M", "Y", "R" and "W" respectively to input Japanese voiceless sound of "か行" (Ka group), "さ行" (Sa group), "た行" (Ta group), "な行" (Na group), "は行" (Ha group), "ま行" (Ma group), "や行" (Ya group), "ら行" (Ra group) and "わ行" (Wa group) in conjunction with the vowel sound keys. Therefore, the operation of the Japanese input needed to press alternately the consonant sound and vowel sound can be elevated by allotting the frequently used vowel sound in Japanese, "A", "I", "U", "E"

and "O" for the area managed by the index fingers and the consonant sound, "K", "S", "T", "N", "H", "M", "Y", "R" and "W", for the middle fingers, ring fingers and little fingers.

As recited in claim 6, the present keyboard-type input apparatus has the keys' assignment in the vowel sound area as keys for inputting "I" and "A" are arranged in this order from the basic side on the middle line, keys for inputting "E" and "U" are arranged in this order from the basic side on the upper line, and key for inputting "O" is arranged on either key on the lower line. Therefore, letters of "I" and "A" used most frequently in Roman letters are arranged at the middle of the column as the home position and vowel keys of "E", "U" and "O" are arranged at the upper of the column and lower column in frequent order. It could be possible to memorize easily the key positions because the vowel key arrangement in the vowel sound area depends on "A", "I", "U", "E", "O" in an easy-pressing order of keys (the middle of the column, upper column and lower column).

As recited in claim 7, the present keyboard-type input apparatus has the keys' assignment in the consonant sound area as keys for inputting "K", "S" and "T" are arranged in this order from the basic side on the middle line, keys for inputting "N", "H" and "M" are arranged in this order from the basic side on the upper line, and keys for inputting "Y", "R" and "W" are arranged in this order from the basic side on the lower line. Therefore, it could be easy to memorize the positions of respective keys in the consonant sound area because the key arrangement in the consonant sound area is arranged with "Ka", "Sa", "Ta", "Na", "Ha", "Ma", "Ya", "Ra" and "Wa" in frequent order.

As recited in claim 8, the present keyboard-type input apparatus has a shift key changing each key arranged in said main key area either in a shift condition or non-shift condition thereof, and wherein the respective keys of "K", "S", "T", "N" and "H" in the consonant sound area are also provided to be as keys of "G", "Z", "D", "P" and "B" inputting Japanese voiced consonants and P-sound in conjunction with the vowel sound keys of "A", "I", "U", "E" and "O". Therefore, it could be easy to memorize the positions of respective keys in the consonant sound area because the key arrangement in the consonant sound area is arranged with "K", "S", "T", "N" and "H".

As recited in claims 9 and 10, the present keyboard-type input apparatus is that some of the keys in the main key area are also provided to input a nasal sound " ん " /n/, a double consonant " っ " /t/, a period " 、 ", a comma " 。 " and a long sound " ─ " are arranged in said main key area, and one key on the lower line in the vowel sound area is assigned as a key of " ん " /n/. Therefore, it is easy to memorize the key positions of a voiced consonant and P-sound because "Ga", "Za" and "Da" are arranged at input positions corresponding to "Ka", "Sa" and "Ta" and "Pa" and "Ba" are arranged at input positions corresponding to "Na" and "Ha".

As recited in claims 11, the present keyboard-type input apparatus has a shift key changing each key arranged in the main key area either in a shift condition or non-shift condition thereof, and the keys in the vowel sound area under the shift condition are adapted to input a comma ",", a period ".", a hyphen "-" and an apostrophe "'". Therefore, it facilitate to input a comma ",", a period ".", a hyphen "-" and an apostrophe "'".

As recited in claim 12, the present keyboard-type input apparatus comprises a change means for alternating a Japanese input mode by means of Roman letter input and English input mode by Alphabet input. And the keys on the lower line in the vowel sound area are assigned as "O" and "X". Therefore, change of English input and Japanese input and input of English and Japanese can be performed in the same key arrangement. According to the keyboard-type input apparatus mentioned in claim 13, since "O" and "X" are arranged at the lower of the column in the vowel sound area, "X" used almost never in the Japanese input and scarcely as alphabet is effectively arranged in the key arrangement with few keys.

As recited in claim 14, the present keyboard-type input apparatus is that the key at a home position for the middle finger on the middle line and on the one column in the consonant sound area is provided as a key of "C/K" to input the consonant sound "K" in the Japanese input mode and to input an alphabet "C" in the English input mode. Therefore, "K" used frequently in Japanese and used scarcely in English is separately arranged from a "K" key of English.

As recited in claim 15, the present keyboard-type input apparatus further comprises a shift key changing each key arranged in the main key area either in a shift condition or non-shift condition thereof, and the keys arranged in said main key area are arranged such that the keys on the upper line under the shift condition are assigned respectively from the basic side as a hyphen symbol "-", an apostrophe symbol "'", "P", "B" and "L", the keys on the middle line under the shift condition are assigned respectively from the basic side as a period ".", a comma ",", "G", "Z" and "D", and the keys on the lower line under the shift condition are assigned respectively from the basic side as "J", "Q", "F", "V" and "K". Therefore, English standard input for the punctuation marks of the period ".", the comma ",", the hyphen symbol "-" and the apostrophe symbol "'" and the consonant sound of "P", "B", "L", "J", "Q", "F", "V" and "K" can be operated by the shift operation.

As recited in claim 16, the present keyboard-type input apparatus further comprises a function control key alternating each key in the main key area between under a letter key condition and under a function key condition, the keys in the main key area under the function key condition being adapted to carry out " 後退 " (RETREAT), " 削除 " (DELETE), " 改行 " (LINE FEED), " 実行 " (RETURN), " 取消 " (DELETE), " タブ " (TAB), " 移動 " (MOVE), " 領域設定 " (REGION SETUP), " 単漢字 " (SINGLE CHINESE CHARACTER), " 前候補 " (FORMER SELECTION), " 部首別 " (SORTING ON STANDARD COMMON PART COMPOSING CHINESE CHARACTER), and " 分野別 " (SORTING ON FIELD). Therefore, respective keys of the main key area are in a function condition by the operation of the function control key and functions such as "RETREAT, NEW LINE, ENTER, DELETE, TAB, MOVEMENT, REGION SETUP SINGLE CHINESE CHARACTER, BUSHU SEPARATION, FIELD SEPARATION" are able to be operated with receptive fifteen keys in vertical three lines and horizontal five columns.

As recited in claim 17, the present keyboard-type input apparatus according to claim 16 is that the function control key is provided at a place to be pressed with a thumb when the middle line row is used as a home position for waiting index, middle, ring and little fingers. Therefore, it can be easy that the fifteen keys are operated by the combination of the thumbs, index fingers, middle fingers, ring fingers and little fingers.

As recited in claim 18, the present keyboard-type input apparatus according to claim 16 is that the function control key consists of plural subkeys arranged outside of the basic side of said main key area and plural control keys arranged below the lower line in said main key area. Therefore, the function operation can be simply carried out by also the combination of the plural subkeys.

As recited in claim 19, the present keyboard-type input apparatus according to claim 1, further comprises a shift key changing each key arranged in the main key area either in a shift condition or non-shift condition thereof, and a side-by-side finger shift input means for generating a symbol code established under the shift condition of one key when the one key and other keys corresponding to the one key are pressed at the same time. Therefore, letters in the shift position can be inputted even though the shift operation of the shift key is not carried out.

As recited in claim 20, the present keyboard-type input apparatus according to claim 16, further comprises a function shift input means for carrying out a predetermined function upon pressing plural associated keys at the same time. Therefore, it is possible of the function operation and more kinds of function selection in independence of the operation of the function control key.

As recited in claim 21, the present keyboard-type input apparatus according to claims 19 is that the plural associated keys are two side-by-side keys in one line. Therefore, letters in the shift positions are inputted by the shift operation with using adjoining fingers such as the index finger and middle finger, the middle finger and ring finger, and the ring finger and little finger.

As recited in claim 22, the present keyboard-type input apparatus according to claim 19 is that the plural associated keys are of key combinations selected from the upper or middle line and from one line lower than the upper or middle line at an opposite to the basic side. Therefore, letters in the shift position can be inputted by the shift operation of the keys in the inborn moving condition of finger.

As recited in claim 23, the present keyboard-type input apparatus according to claim 1, further comprises a compound input means for generating a predetermined symbol code corresponding to a combination state of keys which are pressed simultaneously. Therefore, COMPOUND INPUT is carried out and the operation of letters, figures, symbols, functions and modes operates as a chord played on the piano by using the combination of plural keys.

As recited in claim 24, the present keyboard-type input apparatus according to claim 23 is that the compound input means is provided with a vowel compound input means for producing Japanese letter codes of a twisted sound or diphthong when simultaneously pressing plural vowel sound keys establishing vowel sounds which become the twisted sounds or diphthong. Therefore, the key operation operated as the chord played the piano enable the input of the TWISTED-sound such as "sya" "syu" and so on and the diphthong word such as "AI" "UI", "EI" "UU, "OU" and so on to carry out at one pressing operation, for example a word of " 会計 KAIKEI" is typed by one pressing operation of KAI and one pressing operation of KEI.

As recited in claim 25, the present keyboard-type input apparatus according to claim 23 is that the compound input means includes a pattern record means for recording a combination pattern of plural keys and character string corresponding to the combination pattern, a pattern comparing means for comparing the combination of plural keys pressed simultaneously with the pattern recorded in the pattern record means, and a character string selection means for obtaining and outputting the character string from the pattern record means corresponding to the patterns when an applied pattern is find out in the pattern comparing means. Therefore, the pattern of the letter combination in the operation by the pressing plural keys at one time is compared by the pattern comparing means and the applied pattern in correspondence with the above pattern is discovered in the pattern comparing means, from which the above-mentioned letter column in correspondence with the applied pattern is selected and outputted by the letter selection means.

As recited in claim 26, the present keyboard-type input apparatus according to claim 25 is that the plural character string in a different arrangement are established corresponding to the combination pattern of the keys, and wherein the character string selection means is adapted to select the plural character strings in turns in accordance with a predetermined key operation. Therefore, even though the letter column composed of different pattern is selected, the order of letters column could be changed by the predetermined key operation, for example, in the case of free from order of the vowel sound and consonant sound such as "on" and "no", the letters are exactly displayed by pressing the function key on inputting the letter order.

As recited in claim 27, the present keyboard-type input apparatus according to claim 25 is that the patterns are defined by fifteen patterns; six patterns of two letters (A) consonant+vowel, (B) consonant+consonant, (C) vowel+vowel, (D) diphthong consonants, (E) diphthong vowels, (F) vowel+consonant; and nine patterns of three letters (G) consonant+vowel+consonant, (H) consonant+consonant+vowel, (I) consonant+consonant+consonant, (J) consonant+diphthong vowels, (K) vowel+vowel+consonant, (L) vowel+consonant+consonant, (M) vowel+diphthong consonants, (N) consonant+vowel+consonant, (O) vowel+consonant+vowel. Therefore, in particular it is possible for the English input to be operated by the fast input with retrieving a word inputted by the compound input at one pressing from the fifteen patterns.

As recited in claim 28, the present keyboard-type input apparatus according to claim 25 is that the patterns belong to the twisted sound patterns of "consonant+Y+vowel" such as "しゃ" /sya/, "しゅ" /syu/ and "しょ" /syo/ concerning the spelling of Japanese Roman input. Therefore, it is possible that the simultaneous input of the vowel sound and consonant sound and also the fast input of the TWISTED-sound by one press are operated.

As recited in claim 29, the present keyboard-type input apparatus is that the patterns are to include syllabic nasal sound at the end such as "vowel+syllabic nasal", for example "あん" /an/, "いん" /in/ and "うん" /un/ and "consonant+syllabic nasal", for example "かん" /kan/, "きん" /kin/ and "くん" /kun/ concerning the spelling of Japanese Roman input. Therefore, it is possible that the fast input of letters column including nasal sound at the end such as "consonant+nasal" and so on is operated.

As recited in claim 30, the present keyboard-type input apparatus, further comprises a cursor movement key provided in said main key area and a cursor movement signal output means for outputting a cursor movement signal moving the cursor displayed on a monitor of a word-processor or personal computer when the cursor movement key is pressed. Therefore, upon pressing the cursor movement key by a finger placed on the cursor movement key established in the main key area, the key operation could operate the cursor with the cursor movement signal inputted from the cursor movement signal output means.

BRIEF DESCRIPTION OF THE DRAWINGS

The invention will be more particularly described with reference to the accompanying drawings, in which:

FIG. 3 is a table of frequency in use of Roman letters quoted from the announced report of SKY ARRANGEMENT;

FIG. 5 is a table of frequency in use of alphabets quoted from "A TEXTBOOK OF ENGLISH WORDPROCESSOR STEPTEST" by Yoshika Hagino;

FIGS. 14(A), 14(B) and 14(C) are tables explaining how the keys are pressed to execute a compound function by the keyboard-type input apparatus in the foregoing embodiment;

FIGS. 16(A) and 16(B) are tables explaining how respective standard modes are alternated from one to the other by the keyboard-type input apparatus in the foregoing embodiment;

FIG. 17 is a diagram showing how the compound function is operated by the keyboard-type input apparatus in the foregoing embodiment;

FIG. 19 is a block diagram showing an inner structure of the keyboard-type input apparatus in the foregoing embodiment;

FIG. 20 is a plan view explaining side-by-side finger shift function by the keyboard-type input apparatus in the foregoing embodiment;

FIG. 21 is a block diagram showing an inner structure of the keyboard-type input apparatus in the foregoing embodiment;

FIGS. 22(A) and 22(B) are each a table of the pattern of the two letter unit in English recorded in the pattern record means;

FIGS. 23(A) and 22(B) are each a table of the pattern of the three letter unit in English recorded in the pattern record means;

FIG. 25 is a block diagram of the inner structure of the keyboard-type input apparatus related to the foregoing embodiment;

FIGS. 26(A) and 26(B) are each a diagram of the Japanese syllabary input;

FIG. 27 is a diagram of the Japanese syllabary input;

FIG. 28 is a diagram of the input of the nasal sound, double consonant, punctuation marks and long sound;

FIG. 30 is a diagram of the simultaneously input example of the vowel and consonant sounds;

FIG. 31 is a diagram of the input example of the TWISTED-sound;

FIG. 32 is a diagram of the input example of the Chinese reading;

FIG. 34 is a diagram of the input example of the Chinese reading;

FIG. 35 is a diagram of the input example of the Japanese reading;

FIG. 36 is a diagram of the input example of the angular Japanese phonetic syllabary;

FIGS. 37(A) and 37(B) are each a diagram of the input example of the TWISTEDsound;

FIG. 38 is a diagram of the input example of the TWISTEDsound;

FIGS. 39(A) and 39(B) are each a diagram of the compound input example of the Japanese syllabary including the nasal sound;

FIG. 40 is a diagram of the compound input example of the Japanese syllabary including the nasal sound;

FIGS. 41(A) and 41(B) are each a diagram of the compound input example of the diphthong;

FIG. 42 is a diagram of the compound input example of the diphthong;

FIGS. 43(A) and 43(B) are each a diagram of the compound input example of the diphthong;

FIG. 44 is a diagram of the compound input example of the diphthong;

FIG. 45 is a flowchart of the explanation for the compound input the keyboard-type input apparatus related to the foregoing embodiment;

FIG. 47 is a diagram of the compound input example of the two letter unit in English;

FIG. 48 is a diagram of the compound input example of the three letter unit in English;

FIG. 49 is a diagram of the compound input example of the irregular movement of fingers;

FIG. 50 is a diagram of the compound input example of the finger movement in the special operation;

FIGS. 52(A), 52(B) and 52(C) are each illustrations of the fast input in Japanese;

FIGS. 53(A), 53(B) and 53(C) are each illustrations of the fast input in Japanese;

FIGS. 54(A), 54(B), 54(C) and 54(D) are each illustrations of the fast input in Japanese;

FIG. 55 is a diagram of the input example of the compound space;

FIG. 56 is a diagram of the input example of the capital letter for the first letter of the word;

FIGS. 57(A), 57(B) and 57(C) are each illustrations of the fast input in English;

FIGS. 58(A), 58(B) and 58(C) are each illustrations of the fast input in English;

FIGS. 59(A), 59(B), 59(C) and 59(D) are each illustrations of the fast input in English;

PREFERRED EMBODIMENTS OF THE INVENTION

The preferred embodiments of the present invention will now be described with reference to the drawings. An applied example of "a horizontal type" connecting a liquid crystal screen with a word-processor body by hinges, an applied example of "a vertical type" integrating the liquid crystal screen with the body of the word-processor, and a simple substance example of a key input respectively explained and two types of "a keyboard for the word-processor (Japanese)" and "a keyboard for a personal computer" will be explained as arrangements of the keyboard-type input apparatus.

Figure 7:
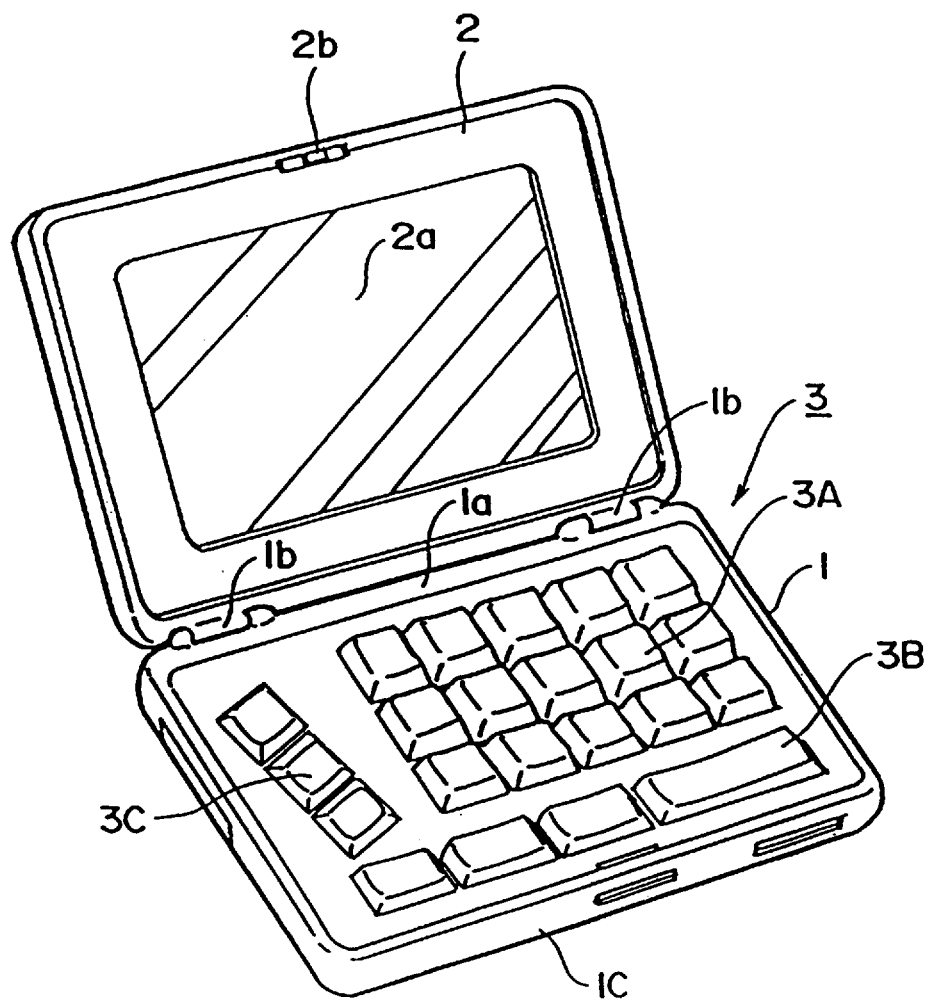
FIG. 7 is a perspective view of the keyboard-type input apparatus in the first embodiment of the present invention.
Figure 8:
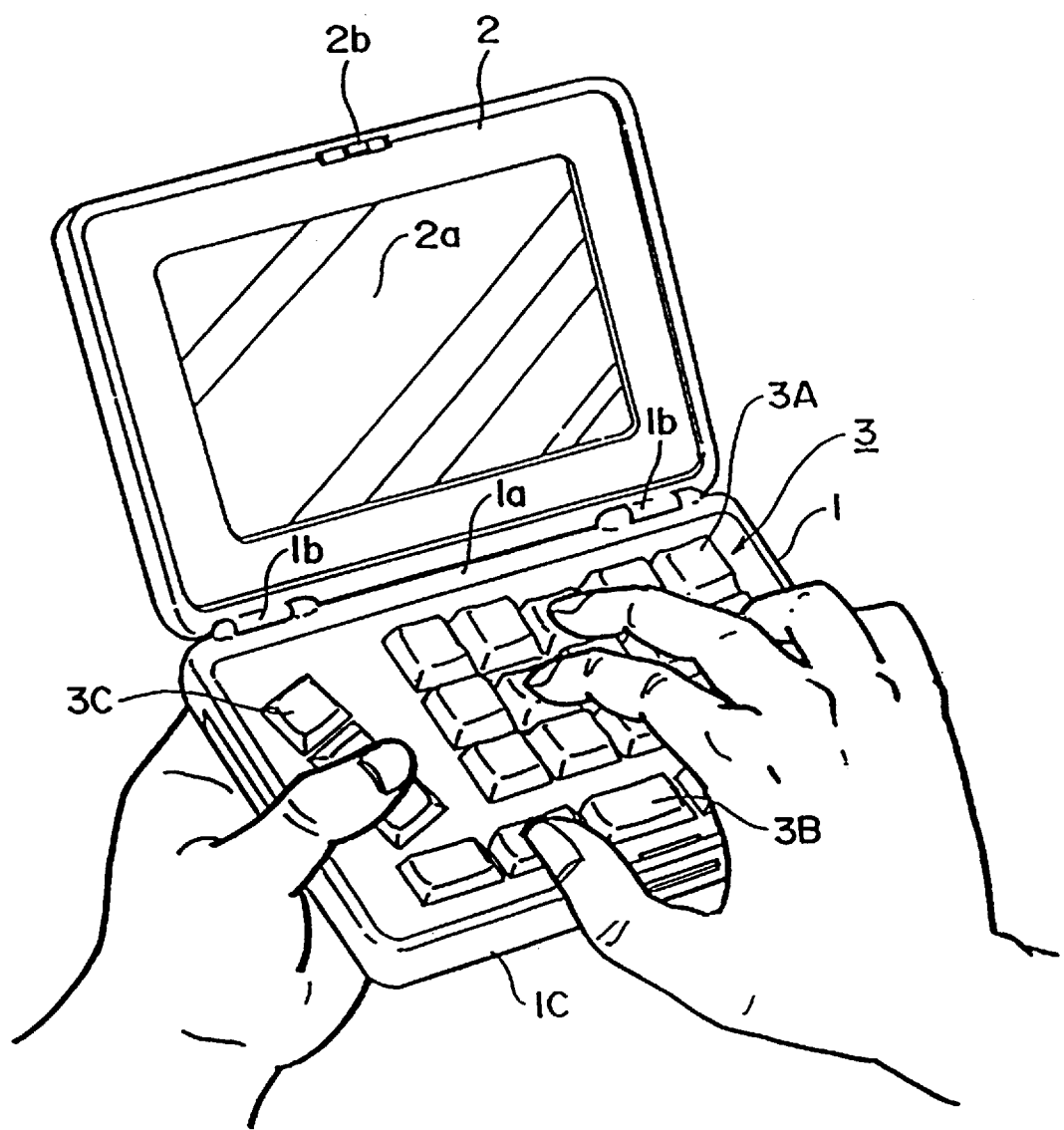
FIG. 8 is one perspective view of the keyboard-type input apparatus when used in the foregoing embodiment.
Figure 9:
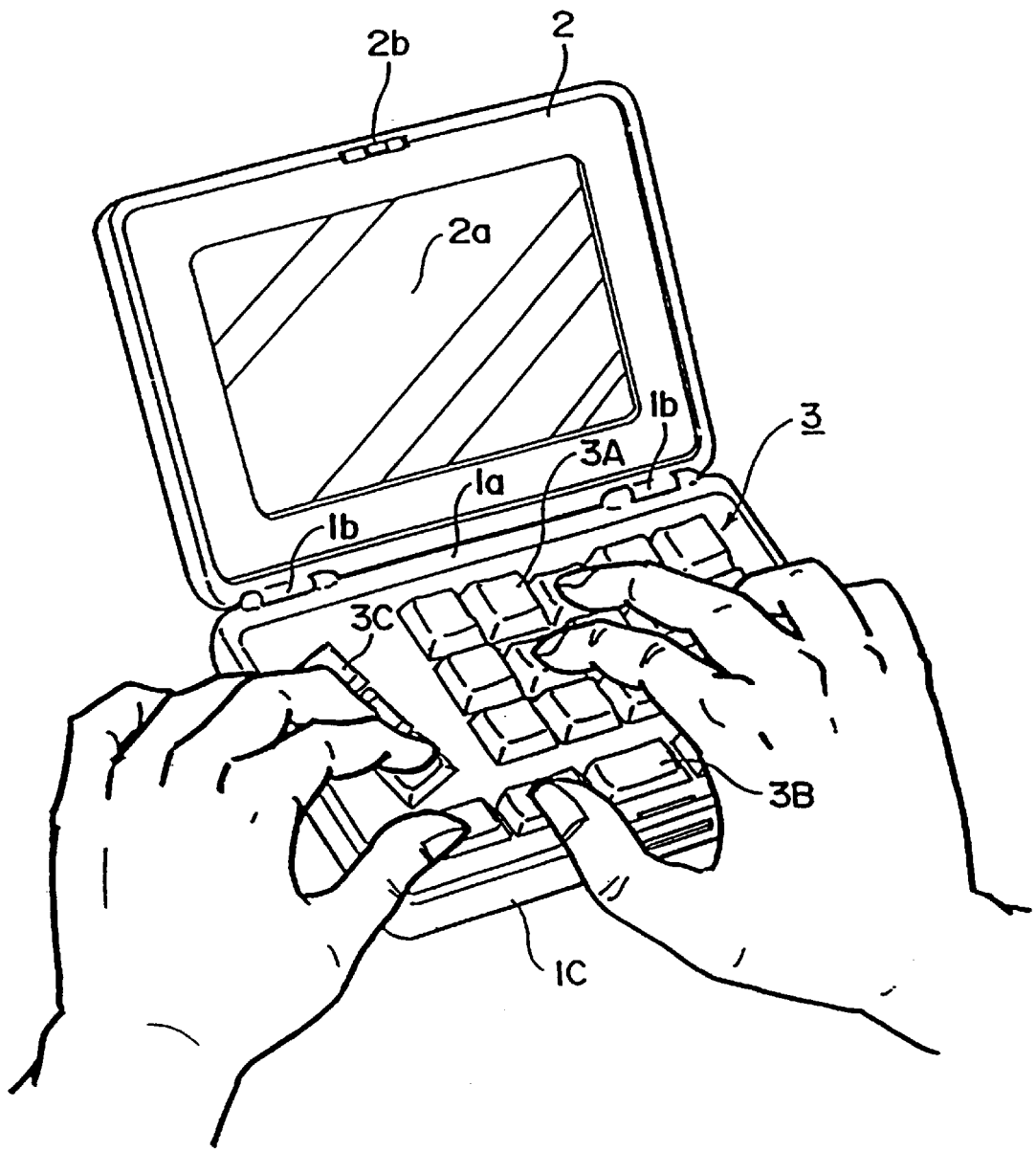
FIG. 9 is the other perspective view of the keyboard-type input apparatus when used in the foregoing embodiment.

FIGS. 7–9 show "the horizontal type" (notebook type) keyboard for the word-processor into which a keyboard-type input apparatus according to the present invention is applied as the first embodiment, in which the reference numeral 1 is a word-processor body, 2 is a cover body with the liquid crystal screen 2a arranged rotatably relatively to a back wall side 1a of the word-processor body 1 by hinges 1b, this cover body 2 being fixed to the word-processor body 1 with a clip 2b attached on an opening side of the cover body 2.

The reference numeral 3 generally designates the keyboard-type input apparatus related to the present invention, the keyboard-type input apparatus 3 mainly comprising a main key area 3A located closer to the back wall side 1a of the word-processor body 1 and consisting of 15 keys arranged in vertical three-line and horizontal five-column state, a control key area 3B located on a front wall side 1c of the word-processor body 1, in which keys are arranged in one line at the lower side of the main key area 3A, and a subkey area 3C located alongside the above-mentioned main key area 3A, of which arrangement being in one column and three lines state on the left side of the word-processor body 1.

FIGS. 8 and 9 show a practical usage of this word-processor. FIG. 8 shows a "COMPOUND INPUT" style in which the left hand holds the word-processor itself, the right fingers presses the keys at the main key area 3A and the control key area 3B, and the left thumb presses the keys in the subkey area 3C at the same time. In this case, two neighbor subkeys can be pressed by the left thumb's cushion in one motion.

FIG. 9 shows the smooth "COMPOUND INPUT" which can be performed with index and middle fingers of the left hand touching the keys in the subkey area 3C of the keyboard-type input apparatus settled on a desk. In the case of using the apparatus on the desk, it will be available that the index and middle fingers of the left hand control the subkeys and the thumb of the left hand can control the control keys optionally.

As can be seen from FIGS. 7–9 the apparatus was invented in consideration of a human engineering when keeping the keyboard by hand or putting it on the desk without any inconvenient. Namely, in this embodiment, the keys in the subkey area 3C are arranged slantingly, whereby especially in the case of using it on the desk, both hands can posture with room to one another compared with generally known keyboard naturally imposing a tight state on fingers. Even if the left hand is occupied or difficult to use, all letters, figures, symbols, functions and modes can be inputted easily.

Figure 10:
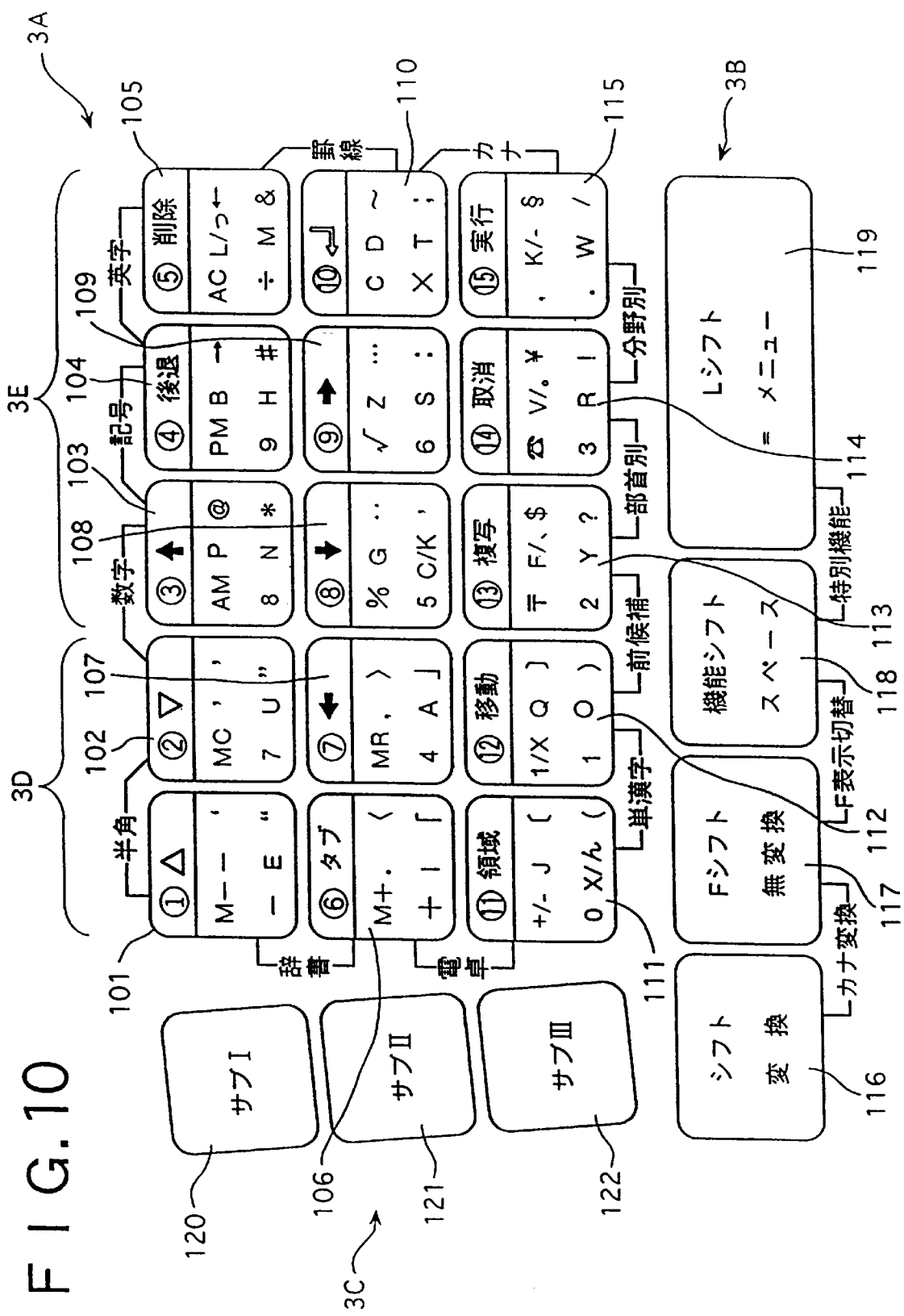
FIG. 10 is a plan view showing the principal section of the keyboard-type input apparatus in the foregoing embodiment.

FIG. 10 is a layout example of "WORD-PROCESSOR ARRANGEMENT" considered to input Japanese mainly with keys arranged in vertical three-line and horizontal five-column state constituting the main key area 3A, four keys in one line defining the control key area 3B, and three keys of the subkey area 3C, so that both Japanese and English can be inputted with a common arrangement of the keys by pressing Roman-letter keys when inputting.

In FIG. 10, as shown clearly in the drawing, figures, symbols, functions and modes are also arranged on the fifteen letter keys arranged in a vertical three-line and horizontal five-column state composing the main key area 3A so as to be assorted independently in association with four keys in one line of the control key area 3B and three keys in the subkey area 3C, whereby it is an advantage to input without carrying fingers so much and without watching the hands to input these figure, symbols, functions and modes.

Figure 1:
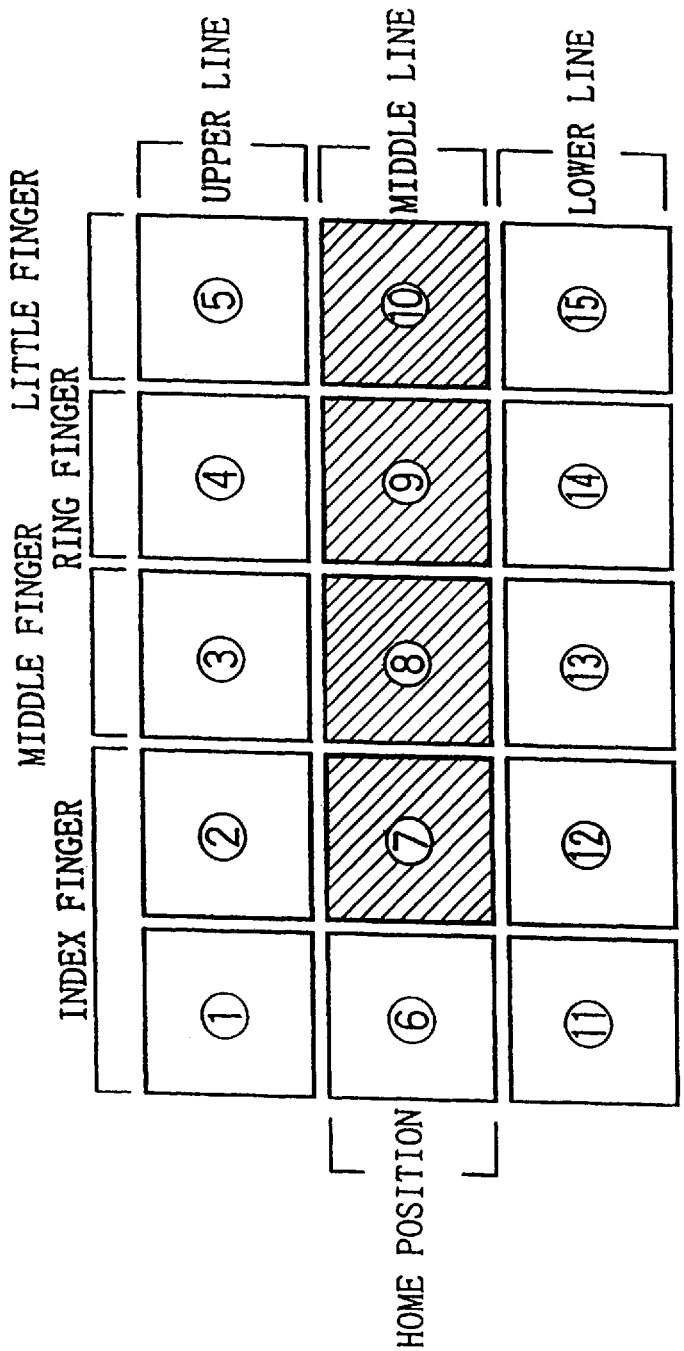
FIG. 1 is an explanatory plan view showing a key-finger-correspondence state on a key input apparatus according to the present invention having a three-line and five-column latwistedt using right fingers.
Figure 2:
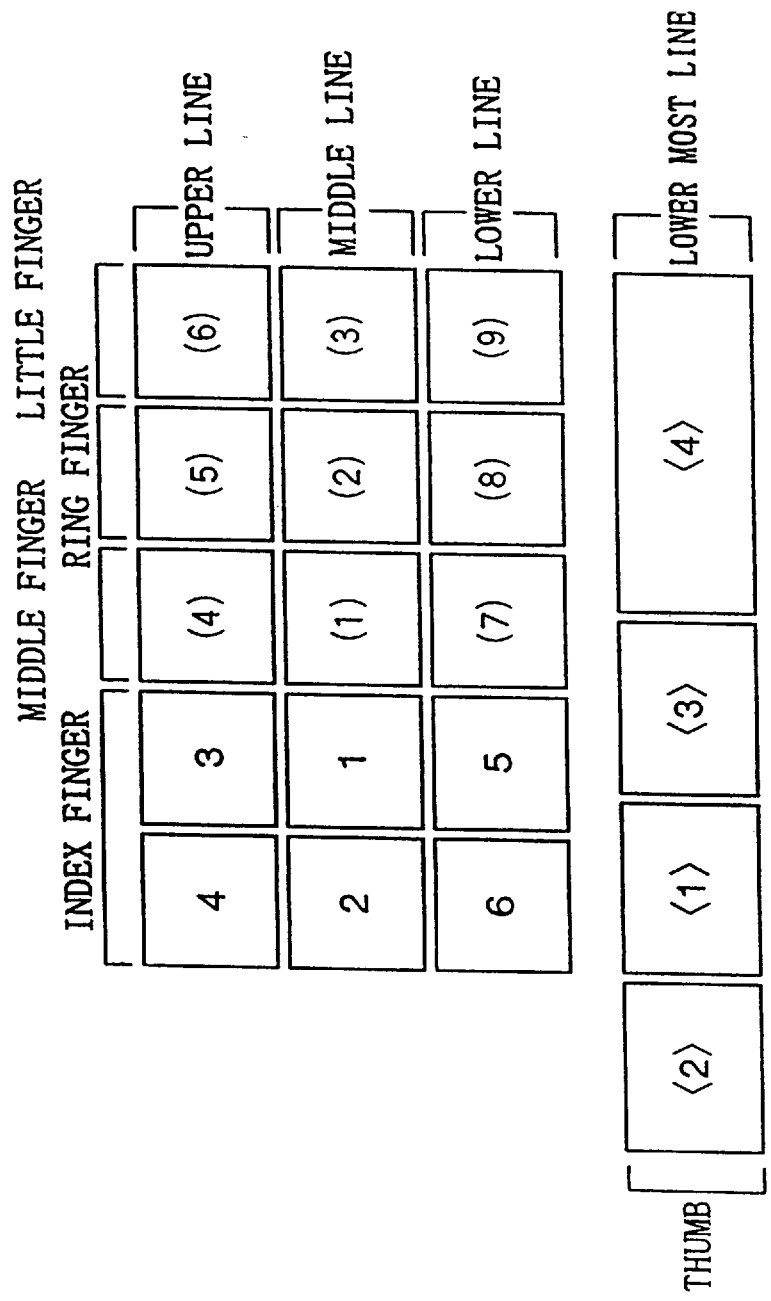
FIG. 2 is an explanatory plan view of the keyboard-type input apparatus showing an easy-typing key order in main key area and control key area.
Figure 4:
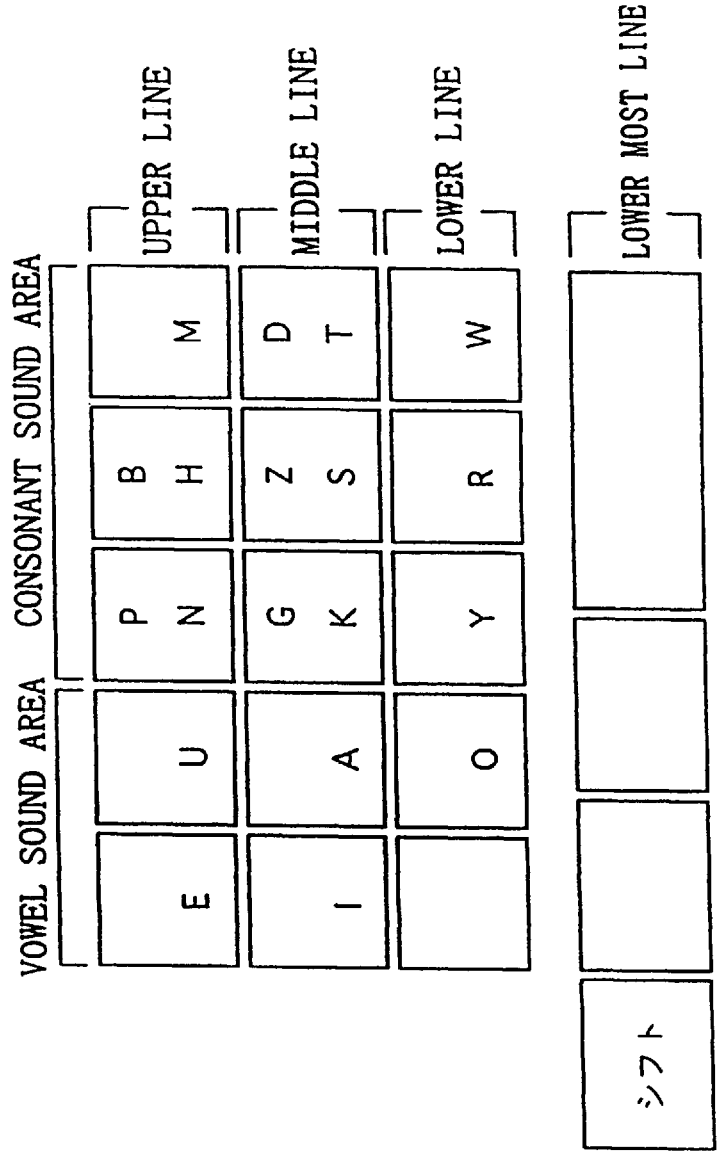
FIG. 4 is a plan view of the key arrangement of Roman letters according to the keyboard-type input apparatus.
Figure 6A:
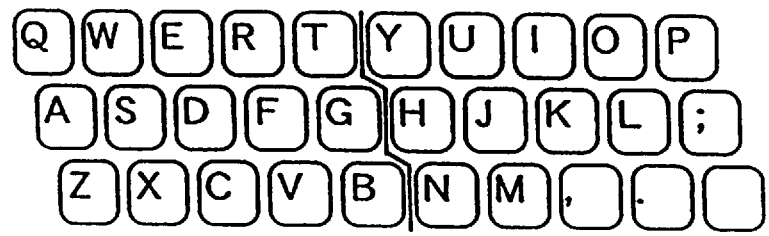
FIGS. 6(A) and 6(B) are plan views for explanation of "QWERTY" arrangement and "Dvorak" arrangement.
Figure 6B:
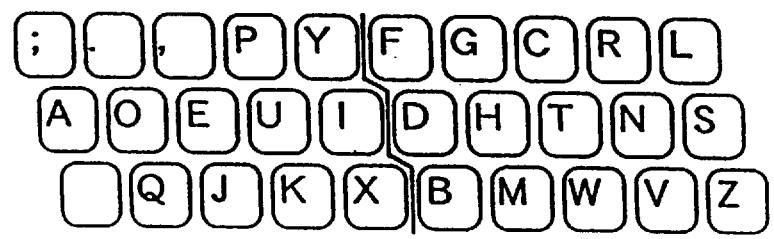

Furthermore, the arrangement of the letter keys in the above-mentioned main key area is arranged in conformity with an easy order for pressing each key in the main key area (see FIG. 1) and a frequency in use of alphabetic vowel and consonant sounds in the Roman letter input (see FIG. 3). The vowel and consonant sounds are arranged on the keys, which are organized in three or middle, upper, and lower lines in this order and which are lined up from the basic side to an opposite side.

Yet, the three keys, 120, 121, 122 in the subkey area 3C arranged alongside the above-mentioned main key area 3A are mainly used to control convert functions prepared in word-processor (functions of abbreviation convert, short convert and others), general symbols, ten-key and others. These three keys function will be explained later, but the combination of these three key should be understood to be necessary for operating the word-processor.

Next, an arrangement of the main key area 3A which is the distinctive feature regarding the key arrangement in accordance with the present invention will be explained more in detail.

In the illustration of FIG. 10, several general symbols and ten keys are arranged with letter keys used in a standard input of Japanese and English, however, these respective character arrangement will be explained from the letter keys for the standard input of Japanese, the general symbols and the ten-key.

LETTER KEY ARRANGEMENT IN STANDARD INPUT OF JAPANESE AND ENGLISH

Figure 11:
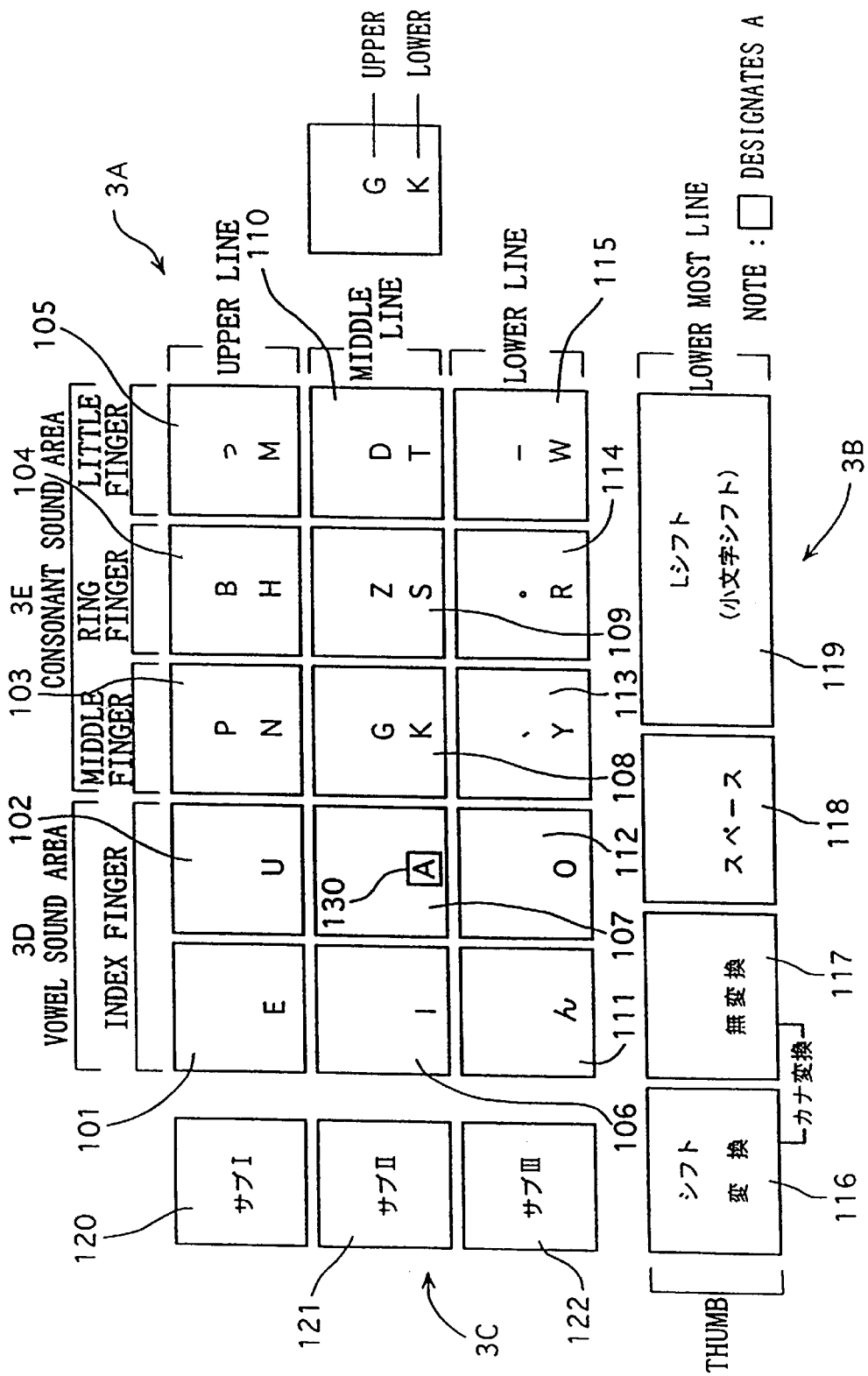
FIG. 11 is a plan view of respective letters latwistedt under Roman letter input mode by the keyboard-type input apparatus in the foregoing embodiment.

FIG. 11 is an explanatory illustration showing that letters appearing in the case of the Roman letter input after picking out the key arrangement in the Roman letter input for Japanese are arranged in the main key area 3A with a total fifteen keys arranged in a horizontal three-line and vertical five-column state. The keys in the main key area 3A in this embodiment are intended to be pressed by the right hand.

Namely, one side (the left side in the drawing) of the main key area 3A is considered as the basic side meaning a home position of the index finger. There are provided at the basic side a vowel sound area 3D composed by the keys in two columns to input vowel sounds and the remaining three columns are allocated as a consonant sound area 3E to input consonant sounds.

The vowel area 3D defined by 2 lines at the basic side has six keys 101, 102, 106, 107, 111 and 112, on which "A", "I", "U", "E" and "O" representing the vowel sounds are respectively assigned as follows.

Particularly, the press keys "A" and "I" are named on keys 107 and 106 in the middle line, the press keys "U" and "E" arranged on respective keys 102 and 101 in the upper line, and the press key "O" and a syllabic nasal ん /n/ sound are arranged on keys 112 and 111 in the lower column.

This arrangement is based on a consideration of the index finger posture of the right hand to be at a home position within the vowel sound area. In this embodiment, the home position is decided to be the key 107 meaning the letter "A" frequently used. The side key 106 is assigned as "I", and on the upper line and lower line of the keys, "U", "E" and "O" are respectively arranged upon frequency in use.

As may be noticed, the arrangement in the vowel sound area in the drawing example is not always met with the order of frequency in use of letters as shown FIG. 3. This is due to the belief that "A", "I", "U", "E" and "O" are to be arranged in consideration of easy memorization for keys on the middle, upper and bottom lines.

As shown in the drawing, the key 107 is provided with a home position instruction means 130 to notify an operator of the home position. A quadrilateral substance having a projection inside is formed as one example of the home position instruction means 130 to surround the letter "A" on the key 107 to be recognized by touching with the finger. However, such an example should not be limitedly used only in the present invention, but it will be possible for other methods (for example, changing colures of the key 107 or using a flash lamp such as LED) to recognize the key 107.

Now referring to the consonant sound area 3E having 3 lines at right side in the drawing, there are allocated the consonant sound keys, "K", "S", "T", "N", "H", "M", "Y", "R" and "W" expressing the Japanese consonants. More specifically, it is an essential arrangement that "K", "S" and "T" are respectively assigned on the keys 108, 109 and 110 in the middle line, "N", "H" and "M" are respectively assigned on the keys 103, 104 and 105 in the upper line, and "Y", "R" and "W" are respectively assigned on the keys 113, 114 and 115 in the lower line from the left side. The above-mentioned arrangement is structured in consideration that Japanese consonants such as "か" /ka/ (Ka group), "さ" /sa/ (Sa group), "た" /t/ (Ta group), "な" /na/ (Na group), "は" /ha/ (Ha group), "ま" /ma/ (Ma group), "や" /ya/ (Ya group), "ら" /ra/ (Ra group), "わ" /wa are arranged on the keys in the middle, upper and lower lines from the basic side to the opposite side in conformity with Japanese syllabary, "ア, カ, サ, タ" and "ナ" /a, ka, sa, ta, na/.

This arrangement is also established in consideration of an easy-typing order and an order of the frequency in use of Roman letter like the already-explained vowel arrangement, so providing that the home position of the index finger of the right hand is in the vowel sound area, a key of the highest frequency in use, "K" is intentionally arranged at a key 108 in the middle line to be a home position of the middle finger.

A key 109 with "S" is provided next to the key 108 of the above-mentioned middle finger's position and a key "T" is arranged at the next key 110. In the similar way, "N" is arranged at a key 103, "H" at a key 104, "M" at a key 105, "Y" at a key 113, "R" at a key 114, and "W" at a key 115 respectively according to the order of the frequency in use from the upper to lower line and from the basic to opposed side.

By the way, when the above-mentioned consonant sound keys are in their shift condition (a condition operated by a shift key 116 provided in the control key area 3B to change each key in the above-mentioned main key area into shift condition or non-shift condition), "P", "B", "G", "Z" and "D" composing P-sound and a voiced consonant can be expressed by combining a comma " 、", a period " 。", a long sound " —", a double consonant " っ" /t/ and a vowel sound.

To put it concretely, "P", "B" and " っ" /t/ are arranged at the press keys, 103, 104 and 105 respectively in correspondence with "N", "H" and "M" in the upper line, "G", "Z" and "D" are arranged at the press keys 108, 109 and 110 in correspondence with "K", "S" and "T" in the middle line and furthermore a comma " 、", a period " 。" and the long vowel " —" arranged at the press keys 113, 114 and 115 in correspondence with "Y", "R" and "W" in the lower line.

In this embodiment, the key arrangement is considered when operating by the right hand but if it will be operated by the left hand, the basic side should be shifted to the opposite side in the drawing and the keys are arranged in bilateral reverse.

For further explanation of the keys in the control key area 3B, four keys 116, 117, 118 and 119 arranged in the control key area 3B have functions of convert, non-convert, shift and others to carry out various functions and internal features of the present keyboard-type input apparatus having fifteen keys arranged in the main key area 3A.

As has been explained above, this embodiment is provided with "シフト" (shift) key 116 having functions of a shift and a conversion from the rounded Japanese phonetic syllabary to Chinese character, "F シフト" (F shift) key 117 having functions of a F(function) shift and a non-convert between the rounded Japanese phonetic syllabary and Chinese character, "機能シフト" (function shift) key 118 having a function to shift operation of the keys belonging in the main key area and a function providing a space and "L シフト" (L shift) key 119 having an input function of the rounded Japanese phonetic syllabary small letters and a function invoking a menu each key arranged from the basic side (left side), and this "L シフト" 119, has the width is bigger twice as large as the other keys 116, 117 and 118 so as to be pressed easily.

The key-arrangement shown in FIG. 10 also has the advantage of operating English input as mentioned above of which arrangement will be explained more referring to FIG. 12.

Figure 12:
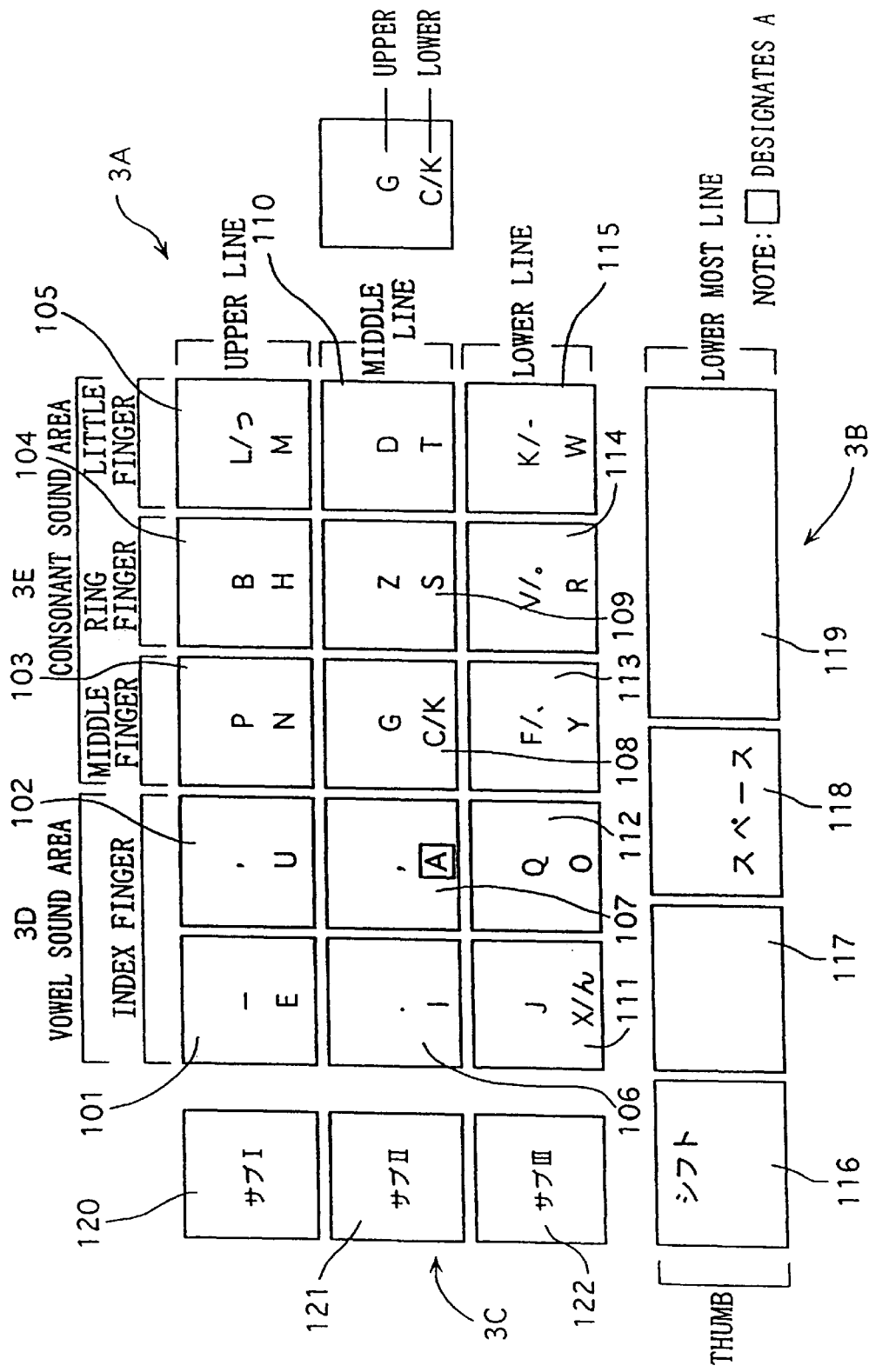
FIG. 12 is a plan view of respective letters latwistedt under English input mode by the keyboard-type input apparatus in the foregoing embodiment.

FIG. 12 shows an arrangement for the English standard input by the right hand, which has the same arrangement as in the Japanese standard input already shown in FIG. 11.

Incidentally, a means 150 (will be described later) for changing between an English input mode (English mode) and a Japanese input mode (Japanese input mode by Roman letters) can be changed by calling a mode change provided in the word-processor function changing the mode on the screen or providing any key in the function control key area with a function of the mode change and pressing the key. As the mode change means 150 is operated, the Japanese input mode shown in FIG. 11 is changed to operate keys under the English input mode shown in FIG. 12.

In the English input mode, "A", "I", "U", "E" and "O" designating vowel sounds are respectively arranged at 101, 102, 106, 107, 111 and 112 in the vowel sound area 3D consisting of two columns at the basic side as in the Japanese mode and consonant sound keys, "C", "S", "T", "N", "H", "M", "Y", "R" and "W" designating respectively consonant sounds are arranged in a consonant area 3A consisting of the remaining three columns.

The above-mentioned vowel sounds, "A", "I", "U", "E" and "O" are arranged such that "A" and "I" are arranged at 107 and 106 in the middle line, "U" and "E" at 102 and 101, and "O" and "X" at 112 and 111.

On the other hand, the consonant sound keys, "C", "S", "T", "N", "H", "M", "Y", "R" and "W" are arranged in the consonant area 3E of three lines on the right side under the non-shift condition and more particularly, "C", "S" and "T" are served at 108, 109 and 110 in the middle line, "N", "H" and "M" are served at 103, 104 and 105 in the upper line, and "Y", "R" and "W" are served at 113, 114 and 115 in the lower line from the left, which is a basic structure.

The key 108 as the home position of the middle finger, in the foregoing description, is considered as the key "K" in Japanese but it operates as the key "C" in the English mode, hence the key "K" in English is prepared at the key "W" in the shift condition. This is because the frequency in use of "C" in English is higher than letter "K" (see FIG. 5), so that in the present embodiment the key 108 as the home position of the middle finger is printed as a combination letter of "K/C" of which key is set up to be "K" in Japanese or an alphabet "C" in the English mode.

The above-mentioned main key area 3A in the shift condition of respective keys includes a key 101 as a hyphen symbol "-", a key 102 as the apostrophe "'", a key 103 as a letter "P", a key 104 as a letter "B", and a key 105 as a letter "L" in the upper line spaced from the basic side, a key 106 as a period ".", a key 107 as a comma ",", a key 108 as a letter "G", a key 109 as a letter Z, and a key 110 as a letter "D" in the middle line from the basic side, furthermore a key 111 as a letter "J", a key 112 as a letter "Q", a key 113 as a letter "F", a key 114 as a letter "V", and a key 115 as a letter "K" in the lower line from the basic side.

Specifically, the hyphen symbol "-", apostrophe "'", "P", "B" and "L" are arranged at respective press keys 101, 102, 103, 104 and 105 corresponding to "E", "U", "N", "H" and "M" in the upper line, the period ".", comma ",", "G", "Z" and "D" are arranged at respective press keys 106, 107, 108, 109 and 110 corresponding to "I", "A", "C", "S" and "T" in the middle line, and "J", "Q", "F", "V" and "K" are arranged at respective press keys 111, 112, 113, 114 and 115 corresponding to "X", "O", "Y", "R" and "W" in the lower line.

In the above-mentioned shift condition, three keys 113, 114 and 115 of which letters are different from one in a Japanese shift condition in the lower column respectively correspond to "F/ 丶", "V 。" and "K/-" and each key of "F/ 丶", "V/ 。" and "K/-" become " 丶", " 。" and "-" in the case of the Japanese mode by the mode change means 150 and otherwise become alphabetic "F", "V" and "k" in the English mode.

Next, an arrangement for selecting functions of the keyboard-type input apparatus shown in FIG. 10 will be explained more with reference to FIGS. 13 and 14. An arrangement of the function keys which was slightly explained will be explained in detail according to FIG. 13. The function keys should be understood such that when a function shift key 181 as a key input part 140 is pushed and simultaneously the key in the main key area 3A is pushed, one of the fifteen keys in the main key area 3A operate as the function keys by the thumb or others by an operation of a function control part 151 described later.

The practical arrangement of the function keys in the main key area 3A composing the key group of horizontal three-line and vertical five-column is designed as follows.

The press keys, 101, 102, 103, 104 and 105 corresponding to "E", "U", "N", "H" and "M" in the upper line have functions respectively such as "SENTENCE HEAD MOVEMENT" (a white triangle facing up in the drawing) functioning to shift a cursor at a sentence head, "SENTENCE END MOVEMENT" (a white triangle facing down in the drawing) functioning to shift a cursor at a sentence end, "UPWARD MOVEMENT CURSOR" (a thick arrow facing up in the drawing) which is a cursor key moving a cursor at the beginning of a page, " 後退 " /kotai/ as a retreat key, and " 削除 " /sakujo/ as a delete key. The press keys, 106, 107, 108, 109 and 110 corresponding to "I", "A", "C", "S" and "T" in the middle line have functions respectively such as " タブ " /tabu/ as a tab key, "LEFT MOVEMENT CURSOR" (a thick arrow facing to the left in the drawing) as a key to move a curser to the left, "DOWNWARD MOVEMENT CURSOR" (a thick arrow facing to the right in the drawing) as a key to move a cursor right, and "NEW LINE FUNCTION" (a return mark in the drawing). Furthermore, the press keys, 111, 112, 113, 114 and 115 corresponding to "X", "O", "Y", "R" and "W" in the lower line have functions respectively such as " 領域 " which is a region designation key, " 移動 " which is a movement key, " 複写 " which is a copy function key, " 取消 " which is an cancel key, and " 実行 " which is an enter key.

Figure 13:
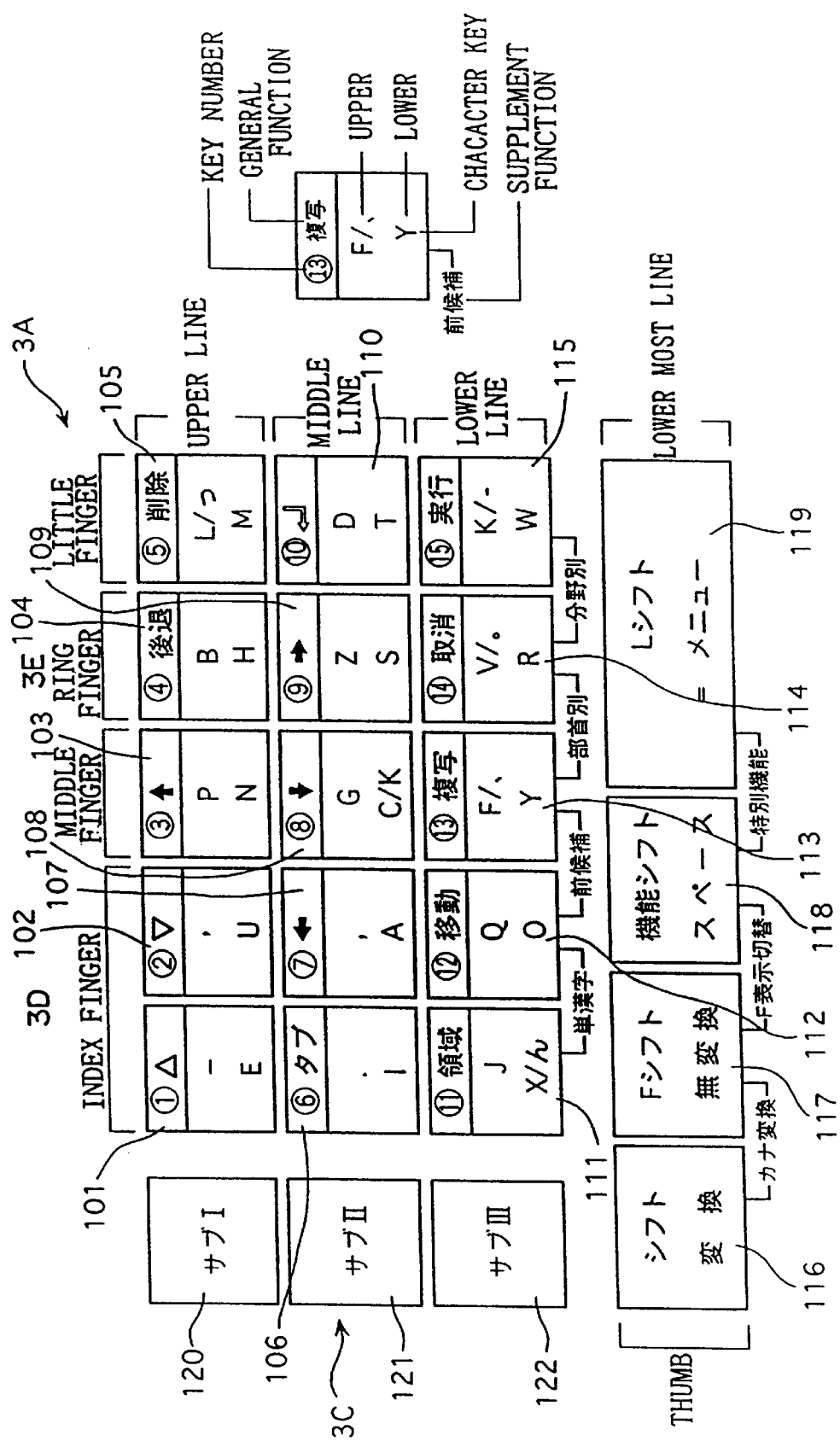
FIG. 13 is a plan view showing a key composed state when the function key working on in the keyboard-type input apparatus in the foregoing embodiment.

In the example shown in FIG. 13, there are arranged between side-by-side keys at the lower area of the main key area 3A and at the lower area of the function control key area 3B to execute supplement functions of word-processor several letters such as " 単漢字 " (single Chinese character), " 前候補 " (former selection), " 部 首 別 " (A standard common part composing the Chinese character), " 分野別 " (field separation), " 集 中 " (Japanese syllabary conversion), " 商 業 " (F-indication conversion) and " 特別機能 " (special function), so that when the two keys designated by these letters are pressed at the same time, a supplement function control section 152 described later becomes operational and the expected supplement function of the wordprocessor is carried out on the screen.

FIG. 14 shows a way of the compound input for respective function keys, that is, the general function assigned to respective function keys can be used individually in the 24 ways from (A) to (X) shown in FIG. 14(A) to FIG. 14(C). Respective function keys for deleting (M)~(U) are settled upon pressing " 実行 " (enter key) after inputting them in order to avoid a mis-input.

To explain the detail manner of the compound input of the function key, while the function shift key is pressed by the thumb of the right hand, respective press keys corresponding to respective functions are pressed by the index finger, middle finger and little finger of the right hand as shown in FIG. 14, so that the 24 ways of functions from (A) to (X) can be used upon necessity.

According to this embodiment, "BASIC FUNCTION" such as "常用機" "能" (general function) or "就業能" (supplement function) stay together in the main-key area 3A consisting of fifteen keys, pressing the function shift key 118 selectively with the thumb and especially keys of cursor keys are arranged at each key of 103, 107, 108 and 109 in the central portion of the right hand, whereby it is an advantage to type easily by the touch-typing without arms moving.

Namely, since independent function keys such as "後退" (retreat), "削除" (deletion), "改行" (return), "実行" (enter), "取消" (cancel), and "タブ" (tab) in the conventional word-processor are arranged dispersively around the letter keys and especially frequently used cursor keys are driven away to the right side, so that the operator is required to watch hands each time, extend fingers farther, or move arms to strike keys. Additionally, each finger is not preliminary expected which independent function key should be pressed and the operator may puzzle over the operation each time, however, in this embodiment, as described above, the "BASIC FUNCTION" such as "常用機能" (general function) or "就業能" (supplement function) stay together in the main key area 3A consisting of fifteen keys, pressing the function shift key 118 with the thumb and arranging the cursor keys in the ceneteral portion of the right hand which is advantageous to type easily by touch typing without arms moving completely.

In general a word-processor and personal computer have the function key such as "F1, F2, F3, . . . " in an upper space on the keyboard to select "機能" (function) shown at the lower area on the screen or the like but in the embodiment the keys figured from [1] to [15] (figures surrounded by circle in the drawing) are assigned together the indication of the general function on the fifteen keys of the main key area 3A, so that the function keys can be operated by the simultaneous compound input with the "F シフト" (function shift) key 117. The function is adapted to be controlled by a function control section 153 described later to control the screen.

The above-mentioned function, menu input and special function input will be explained additionally as follows.

FUNCTION INPUT

Concerning a selection of the function indicated in the lower section on the screen in this embodiment, it can be selected by pressing a key figure in the main key area 3A corresponding to the function figure on the screen and "F シフト" (F shift) key 117 simultaneously.

A display change of the function can be performed by striking "F シフト" (F shift) key 117 with the thumb and "機能シフト" (function shift) key 118 with the index finger simultaneously.

MENU INPUT

To select the function or operation displayed on an initial screen of the word-processor, the menu key 119 is pressed simply with a little finger to call a list of "MENU" on the screen to press a necessary key figure solely. The menu control should be understood as to be performed in the supplement function control section 152.

SPECIAL FUNCTION INPUT

In the case operating "特別機能" (special function) provided in the word-processor, "機能シフト" (function shift) key 118 and "L シフト" (L shift) key 119 are pressed simultaneously to display the special function on, the list screen, so that the operator can select by pressing solely the key figure in the main key area 3A corresponding to the figure of the list screen. Incidentally, a control of the special function is performed by the supplement function control section 152.

A change of standard modes such as "HALF SIZE MODE", "FIGURE MODE", "SYMBOL MODE", "ENGLISH MODE", "LINE MODE", "ROUNDED JAPANESE PHONETIC SYLLABARY MODE" and others in the present embodiment will be explained hereunder.

Figure 15:
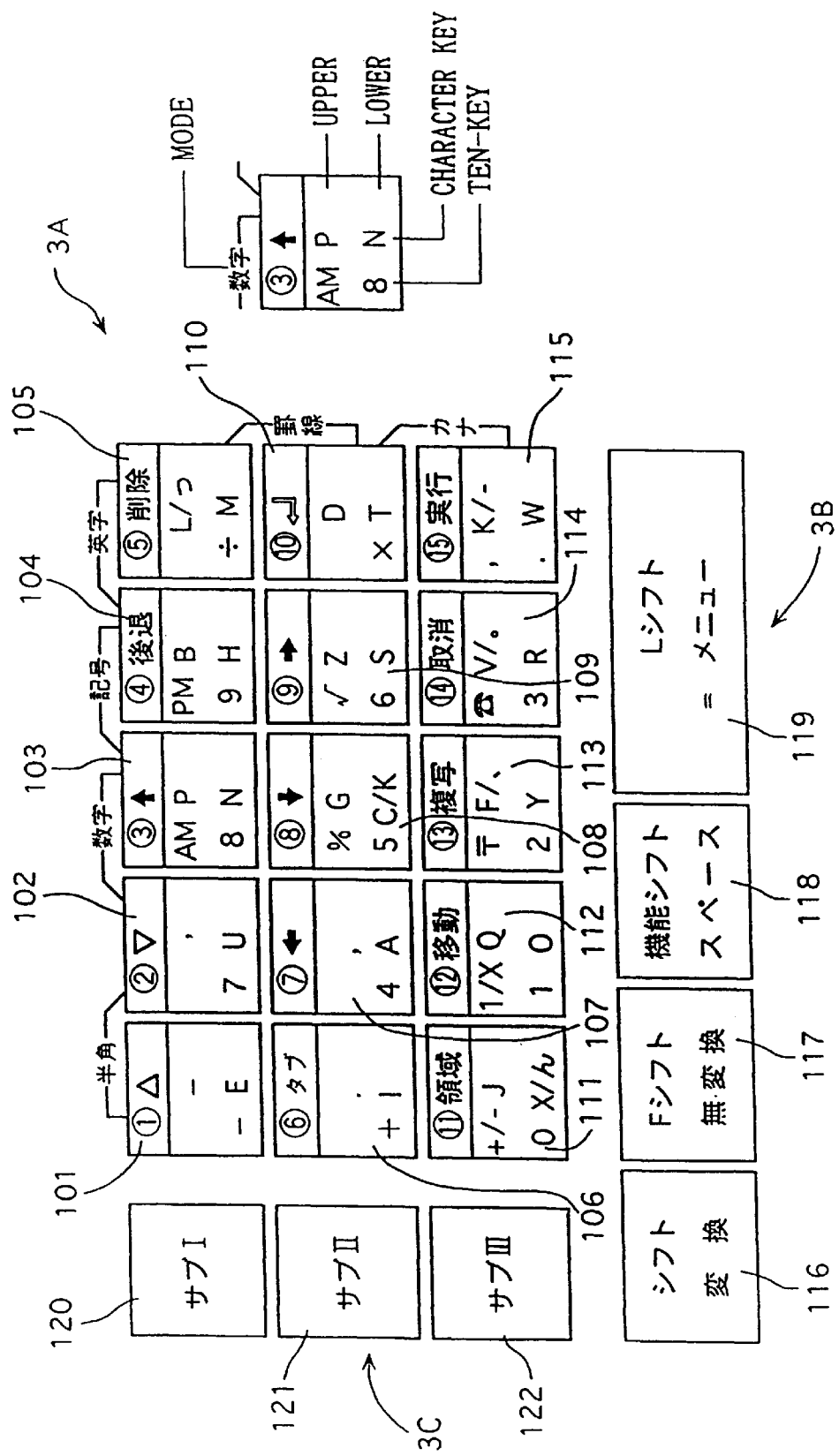
FIG. 15 is a plan view showing a key composed state under Roman letter input mode by the keyboard-type input apparatus in the foregoing embodiment.

FIG. 15 shows a layout of the keyboard-type input apparatus added with the change function among the above-mentioned standard modes. There are arranged straddling over side-by-side two keys both at an upper area of the upper line and the right side area of the right most column (right most column at the opposite side of the basic side) in the main key area 3A, letters carrying out the standard modes of the word-processor such as "半角" (half size), "数字" (figure), "記号" (symbol), "英字" (English), "罫線" (line) and "カナ" (rounded Japanese phonetic syllabary). When pressing two keys (described later) corresponding to these letters simultaneously, a standard mode control part 154 operates and the standard mode of the word-processor works on the screen.

FIG. 16 shows a manner for changing the above-mentioned standard modes and the standard mode change allocated to each function key will be available in six ways from (A) to (F) in FIG. 16(A) and FIG. 16(B).

For example, in the case of "FULL SIZE CHANGE", while two keys combined by lines designating each mode such as a "数字" (figure), "記号" (symbol), "英字" (English), "罫線" (line), "カナ" (rounded Japanese phonetic syllabary) are pressed simultaneously, "機能シフト" (function shift) key is pressed with the thumb.

"HALF SIZE CHANGE" can be conducted by pressing the function shift key by the thumb at the same time when pressing a key either right below each mode notation or on the left side and a key right below "機能" (half size) notation.

In the case of "FIGURE CHANGE", "半角シフト" (function shift) key 118 is pressed together with both keys 102 and 103, in the case of "SYMBOL CHANGE", "機能シフト" (function shift) key 118 is pressed together with both keys 103 and 104, and in the case of "ENGLISH CHANGE", "機能シフト" (function shift) key 118 is pressed together with both keys 104 and 105.

Furthermore, in the case of "LINE CHANGE", "機能シフト" (function shift) key 118 is pressed together with both keys 105 and 110 and in the case of "JAPANESE SYLLABARY", "機能シフト" (function shift) key 118 is pressed together with both keys 110 and 115.

Incidentally, in FIG. 16(B), a small letter is changed to a capital letter by repeating an operation of "MODE CHANGE" under "ENGLISH MODE" (D).

A recovery of each "STANDARD MODE CHANGE" can be performed by repeating the same operation as the "MODE CHANGE" in principle. The same manner as the change to "STANDARD MODE CHANGE", that is the recovery of "HALF SIZE" mode can be carried out by pressing "機能シフト" (the function shift key) 118 together with both 101 and 102 and a deletion of "NUMBER MODE" can be done by pressing "機能シフト" (function shift) key 118 together with both keys 102 and 103.

A recovery of "SYMBOL MODE" can be performed by pressing "機能シフト" (function shift) key 118 together with keys 103 and 104 and a recovery of "ENGLISH MODE" can be carried out by pressing "機能シフト" (function shift) key 118 together with keys 104 and 105.

Furthermore, a recovery of "LINE MODE" can be done by pressing "機能シフト" (function shift) key 118 together with both keys 105 and 110 and a recovery of "ROUNDED JAPANESE PHONETIC SYLLABARY" can be done by pressing "機能シフト" (function shift) key 118 together with both keys 110 and 115.

However, it should be noted that each mode of "数字" (figure), "英字" (English), "カナ" (the rounded Japanese phonetic syllabary) can be recovered upon pressing the non-conversion key 117 solely. Yet, in FIG. 16(A), when a symbol is inputted under "SYMBOL MODE" (C), a symbol list on the screen disappears and the mode is recovered automatically.

An input of figures and English letters by "STANDARD MODE CHANGE" will be effective when many letters are pressed successively. However, an input of number and English letters may be more effective when the change operation is carried out by the left hand using the subkey under "DRAFT MODE CHANGE" which will be described later.

The present embodiment is structured such that "MODE CHANGE" equipped with "半角" (half size) control is carried out by pressing simultaneously both of the two keys inscribed around the main key area 3A on the keyboard and the function shift key, so that the "MODE CHANGE" can be smoothly operated in touch-typing with the right hand.

Since "MODE CHANGE" key on general keyboard is located at the side on the keyboard it is hard to type, and since especially not only "全角" (full size) but also "数字" (figure), "記号" (symbol) and "罫線" (line) in "半角" (half size) are frequently used in Japanese sentence, "MODE CHANGE" needs to be operated on and off frequently and tiresome operations are required repeatedly. In the present embodiment based on the above recognition, various "MODE CHANGE" composed of "全角" (full size) and "半角" (half size) can be smoothly converted by one pressing operation of the touch-typing with the right hand and "MODE CHANGE" including "HALF SIZE" control can be operated by pressing simultaneously both of two keys inscribed around the main key area 3A and "機能シフト" (function shift) key, so that "MODE CHANGE" can be simply executed in the touch-typing by the right hand.

[ARRANGEMENT FOR GENERAL SYMBOLS AND TEN-KEY]

An arrangement and input process of the general symbols and of the ten-key will be explained with reference to FIGS. 17 and 18.

The general symbols, ten-key and so on can be inputted by using the assortment of three subkeys; "サブ" (subkey-I) 120, "サブII" (subkey-II) 121, and "サブIII" (subkey-III) 122 arranged at the left side of the main key area 3A.

Following is the arrangement of the general symbols. As FIG. 17 shows, the general symbols are assigned at the right side on respective letter keys such as the above-mentioned vowel sounds, consonant sounds and others in the main key area 3A. In the shift condition, single quotation marks """, single quotation marks """, qualifying symbol "@", right direction arrow symbol "→" and left direction arrow symbol "←" are respectively arranged at the press key 101, 102, 103, 104 and 105 corresponding to "E", "U", "N", "H" and "M" from the basic side in the upper line, angle bracket symbol "<", angle bracket symbol ">", two dots symbol ". .", three dots symbol ". . ." wand swung dash symbol "~" are respectively arranged at the press key 106, 107, 108, 109 and 110 corresponding to "I", "A", "C", "S" and "T" from the basic side in the middle line and square bracket symbol "[", square bracket "]", dollar symbol "$", yen symbol "¥" and qualifying symbol "§" are respectively arranged at the press key 111, 112, 113, 114 and 115 corresponding to "X", "O", "Y", "R" and "W" in the lower line from the basic side.

A double quotation mark """, double quotation mark """, asterisk symbol "*", figure symbol "#" and and symbol "&" are respectively arranged at the press keys 101, 102, 103, 104 and 105 corresponding to "E", "U", "N", "H" and "M" in the upper line from the basic side when the press keys are in a non-shift condition, bracket symbol "[", bracket symbol "]", point symbol ".", colon symbol ":", and semicolon symbol ";" are respectively arranged at the press key 106, 107, 108, 109 and 110 corresponding to "I", "A", "C", "S" and "T" in the middle line from the basic side when the press keys are in the non-shift condition, and parenthesis symbol "(", parenthesis symbol ")", question symbol "?", qualifying symbol "!" and slant symbol "/" are respectively arranged at the press key 111, 112, 113, 114 and 115 corresponding to "X", "O", "Y", "R" and "W" in the lower line from the basic side when the press keys are in the non-shift condition.

The manner of inputting the general symbol is that the general symbols arranged in the main key area 3A can be inputted by pressing a key of the main key area 3A with pressing the above-mentioned "サブI" (subkey I) 120, and if the "サブII" (subkey II) 121 is simultaneously pressed at that time, the symbol for "半角" (half size) can be inputted. The symbols arranged in the shift condition of the general symbols can be inputted by pressing "シフト" (shift) key 116.

Following is referred to the ten-key arrangement. The ten-key is arranged at the left side of the letter arrangement of the above-mentioned vowel sounds, consonant sounds and so on in the main key area 3A, when the press keys 103 and 104 corresponding to "N" and "H" are in the sift condition, symbols "AM" and "PM" are adapted to be allocated on the press keys 103 and 104 in the upper line from the basic side, when the press keys 108 and 109 corresponding to "C" and "S" are in the shift condition, symbols "%" and "√" are adapted to be allocated on the press keys 108 and 109 in the middle line from the basic sides and when the press keys 111, 112, 113, 114 and 115 corresponding to "X", "O", "Y", "R" and "W" are in the shift condition, symbol "+/−", symbol "l/x", zip code symbol "T̄", telephone symbol "(" and comma "," are arranged on the press keys in the lower line from the basic side.

Symbol "-", figure "7", figure "8", figure "9" and symbol "÷" are arranged at the press keys 101, 102, 103, 104 and 105 corresponding to "E", "U", "N", "H" and "M" in the upper line of the main key area 3A in the non-shift condition from the basic side, symbol "+", symbol "4", symbol "5", symbol "6" and symbol "X" are arranged at the press keys 106, 107, 108, 109 and 110 corresponding to "I", "A", "C", "S" and "T" in the middle line in the non-shift condition from the basic side, and each key of figure "0", figure "1", figure "2", figure "3" and symbol "." are arranged at the press keys 111, 112, 113, 114 and 115 corresponding to "X", "O", "Y", "R" and "W" in the non-shift condition from the basic side.

The figure mode can be taken place pressing the function shift key 118 together with keys 102 and 103, so that figure is inputted from the main key area 3A which became ten-key function, by which the input and computation for figures through ten-key can be performed.

In the present embodiment, it is possible to input the general symbol and the ten-key by "サブI" (subkey-I) 120, "サブII" (subkey-II) 121 and "サブIII" (subkey-III) 122 in association with a control block which will be described later.

Namely, in the case of inputting the general symbol by using the subkey, general symbol in the above-mentioned arrangement of the main key area is pressed with pressing the subkey I 120 by the left finger or others. In this case, when the subkey II 121 is pressed simultaneously, the symbol under "半角" (half size) can be inputted.

The ten-key will be available by pressing the above-explained ten-key arranged in the main key area during pressing "サブIII" (subkey III) 122 by the left finger. In this case, when "サブII" (subkey II) 121 is pressed simultaneously, the ten-key of "半角" (half size) can be inputted. The ten-key in the shift condition can be inputted by pressing "シフト" (shift) key 116 with the thumb.

English capital letters can be inputted by pressing the letter keys arranged in the main key area one by one with pressing "サブII" (subkey II) 121 by the left finger or others.

Figure 18:
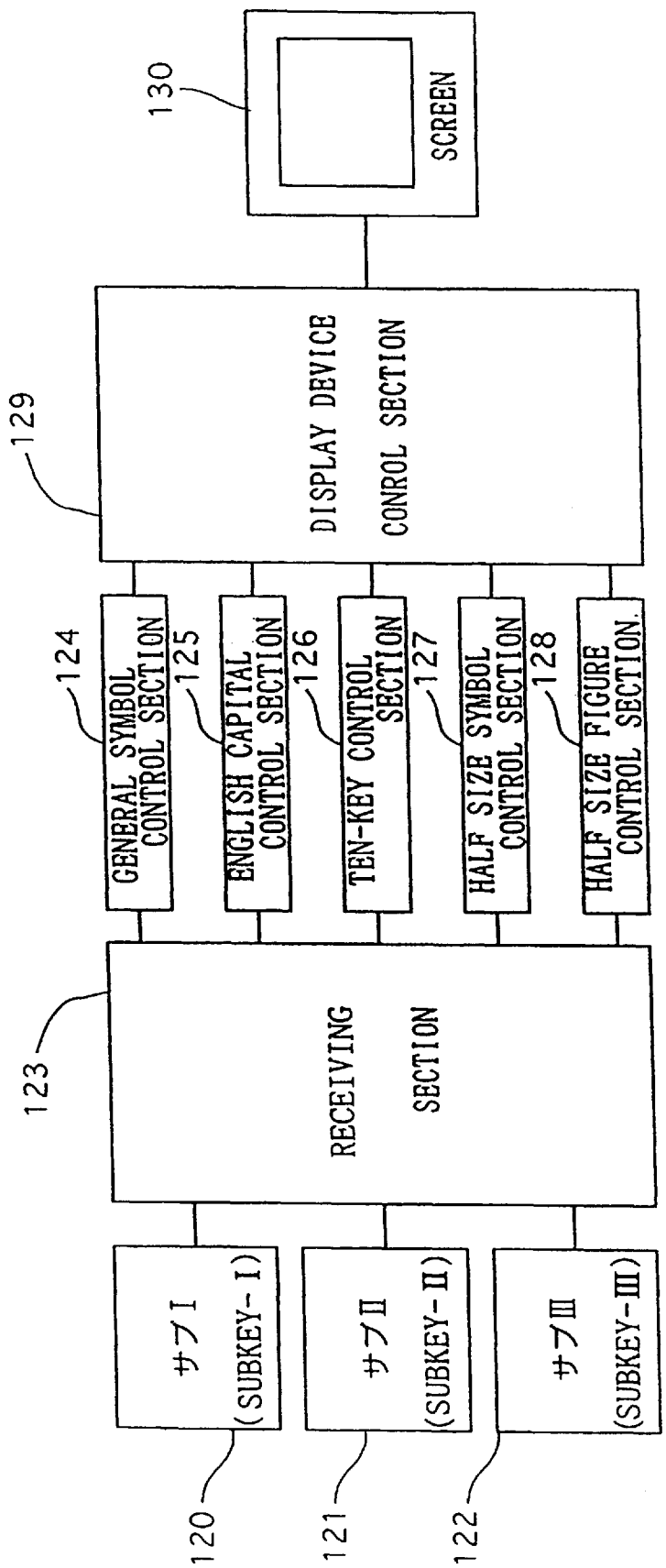
FIG. 18 is a block diagram explaining a subkey function.

FIG. 18 shows the control block diagram for inputting the above-mentioned general symbol and ten-key, which is mainly comprising "サブI" (subkey I) 120, "サブII" (subkey II) 121, "サブIII" (subkey III) 122, receiving section 123 receiving signals from the subkeys, general symbol control section 124 outputting the general symbols, English capital control section 125 outputting English capital letters, ten-key control section 126 controlling the ten-key function, half size signal control section 127 outputting the general symbols in half size, half size figure control section 128 outputting the figures in half size, and display device control section 129 controlling the screen (monitor) 130.

In the present embodiment, after subkey I 120, subkey II 121 and subkey III 122 are pressed, the receiving section 123 receives these signals. These signals are therefore sent to the general symbol control section 124, the English capital letter control section 125, the ten-key control section 126, the half size symbol control section 127 and the half size figure control section 128 through the receiving section 123 and the letters inputted from the general symbol and ten-key can be monitored on the screen 130 through the display device control section 129 in conjunction with keys in the main key area 3A.

According to the inputs for the general symbol, English capital letter and ten-key inputted by a combination of three keys in the above-mentioned subkey area 3C, the inputs of the general symbol, English capital letter and ten-key can be smoothly performed by the mode change using a combination of three subkeys, 120, 121 and 122 different from the keys in the main key area 3A.

Accordingly, the general symbol, English capital letter and figure input by ten-key in a sentence can be easily carried out by combining three keys in the subkey area 3C for "JAPANESE SENTENCE COMPOSED WITH CHINESE CHARACTER, ROUNDED JAPANESE PHONETIC SYLLABARY, HALF AND FULL-SIZED FIGURE, HALF AND FULL-SIZED SYMBOL, AND ENGLISH CAPITAL LETTER" and "FULL SIZE OF FIGURE", "FULL SIZE OF SYMBOL" and "ENGLISH CAPITAL LETTER" of which letters are few but frequency thereof is high can be easily pressed occasionary.

These advantages will be explained examplary as follows. That is, the figure is frequently used in Japanese sentences, for example, the figure is used with Chinese characters both before and after it in a short letters and the full and half sizes are also required therein. Taking for instance, such as "第3回", "21世紀", "1998年", and "6月10日". The symbol like slant "/" or parenthesis "「", "」" is used for combining letters with figures regardless of the half and full size as the figures described in Japanese, for example, "6/10 (月)·11 (火)" and "14:00~16:00". Furthermore, capital letters of alphabet are frequently used in abbreviated words such as borrowed words, group names and special words, for example "TV", "NTT", "JIS" and "VAN" (these capital letters of alphabet can be considered as a part of Japanese).

However, since small letters of alphabet are used less frequently and fixed abbreviations such as "mm, cm, km and kg" are treated as parts of symbol, it is not necessary for these small letters to be provided like English capital letters.

Consequently, one to four letters consisting with "FIGURE IN FULL AND HALF SIZE", "SYMBOL IN FULL AND HALF SIZE" and "ENGLISH CAPITAL LETTER IN FULL SIZE" are used frequently besides Chinese character, rounded Japanese phonetic syllabary and angular Japanese phonetic syllabary and these are intermingled in Japanese.

Japanese sentences should be called "SENTENCE MIXED WITH CHINESE CHARACTER, ROUNDED JAPANESE PHONETIC SYLLABARY, FIGURE IN FULL AND HALF SIZE, SYMBOL IN FULL AND HALF SIZE, AND ENGLISH CAPITAL LETTER" rather than "SENTENCE MIXED CHINESE CHARACTER AND ROUNDED JAPANESE PHONETIC SYLLABARY", therefore in the present embodiment "FIGURE IN FULL AND HALF SIZE", "SYMBOL IN FULL AND HALF SIZE", and "ENGLISH CAPITAL LETTER" of which letters are few but used frequently can be pressed easily as the general symbol, English capital letter and ten-key are inputted by changing easily the modes by using the three subkeys 120, 121 and 122 which are different from the keys in the main key area 3A.

The above-mentioned "STANDARD MODE CHANGE" operates effectively when a lot of figures or English letters are inputted successively and it would be very convenient if "MODE CHANGE" could be performed smoothly and easily when full and half size ten-key of which frequency is but and letter figure is few and full size English capital letter are inputted. In the present embodiment, "DRAFT MODE CHANGE" with the left thumb is also performed using the subkeys arranged in the present embodiment as follows.

Namely,
1. INPUT OF GENERAL SYMBOL

General symbols of the main key are pressed and inputted while "サブI" (subkey I) is pressed with the left finger. At that time, if "サブII" (subkey II) is simultaneously pressed, the symbol in half size can be inputted. (the symbol in the shift condition should be inputted by the thumb shift.)
2. INPUT OF ENGLISH CAPITAL LETTER English capital letters are inputted by pressing letter keys of the main key one by one while "サブII" (subkey II) is pressed with the left finger.

3. INPUT OF TEN-KEY

The ten-key of the main key is inputted one by one while "サブIII" (subkey III) is pressed with the left finger. At that time, if "サブII" (subkey II) is simultaneously pressed, the symbol in half size can be inputted. (the symbol in the shift condition should be inputted by the thumb shift.)

The subkeys 120, 121 and 122 in the present embodiment are pressed with the left thumb when typing with the keyboard held in the left hand and with the left index finger and middle finger when typing with the keyboard put on some place. "サブI (subkey-I)+サブII (subkey-II)" and "サブII (subkey-II)+サブIII (subkey-III)" are inputted by pressing simultaneously both of the two keys with the left thumb cushion when typing with the keyboard held in the hand.

While the subkey is pressed, the mode continues to be effective until the finger will be away from the keys. A so-called time difference input of "PREFIX" can be carried out by pressing the subkey with the right index finger first and pressing the main key.

When the left hand is engaged with some reason, the subkey is pressed to be "PREFIX" with the right finger and thereafter the main key is pressed, so that "TIME DIFFERENCE INPUT" is carried out by operation with the only right hand every one time.

The inner structure operating a keyboard-type input apparatus according to the present invention with the arrangement of the press keys as the above-mentioned description will be explained referring to FIGS. 19 and 20.

In FIG. 19 showing a block diagram of the inner structure for the key input device, a reference numeral 140 is a key input section corresponding to the above-mentioned keys arranged in the above-mentioned key area 3A, 3B and 3C.

Designated by reference numeral 150 is a change means (mode change control section) changing the Japanese input mode by the Roman letters input and the English mode by the alphabet input to be changed into either the Japanese input condition or the English input condition depending on a signal from the key input section.

Designated by reference numeral 151 is a function key control section changing each key in the main key area 3A from the letter key condition to the function key condition, operates by pressing the function control key 118, and establishes each key in the main key area 3A into the function key condition such as "後退" (retreat), "削除" (delete), "改行" (return), "実行" (enter), "取消" (cancel), "タブ" (tab), "移動" (movement), "領域設定" (region designation), "単漢字" (single Chinese character), "前候補" (former selection), "部首別" (standard common part composing the Chinese character), "分野別" (field separation).

Designated by reference numeral 152 is the supplement function control section supplementing the above-mentioned function key control section 151 and operates the supplement functions of word-processor such as "単漢字" (single Chinese character), "前候補" (former selection), "部首別" (standard common part composing the Chinese character), "分野別" (field separation), "カナ変換表示切替" (rounded Japanese phonetic syllabary change), "F表示切替" (F display change) "特別機能" (special function) by pressing side-by-side two keys.

Furthermore, a reference numeral 153 is a control section for function keys to select "FUNCTION" provided in a general work-processor and personal computer, and to operate fifteen keys in the main key area 3A attached with key figures [1]–[15] (figures surrounded by circle in the drawing) next to the general function as selection keys of the function, which are substituted for the function keys such as "F1, F2, F3, and so on" arranged side by side at the most upper section of a general keyboard.

Designated by reference numeral 154 is a standard mode control section controlling a change of the standard mode change such as "HALF SIZE MODE", "FIGURE MODE", "SYMBOL MODE", "ENGLISH MODE", "LINE MODE" and "ANGULAR JAPANESE PHONETIC SYLLABARY MODE", which can be performed in the present embodiment by pressing the side-by-side two keys at the same time arranged at the upper line of the main key area 3A and at the right column (the most right column at the opposite side of the basic side) to carry the standard mode of the word-processor such as "半角" (half size), "数字" (figure), "記号" (symbol), "英字" (English), "罫線" (line), "カナ" (angular Japanese phonetic syllabary).

The keyboard-type input apparatus of the present invention includes a Roman letter change control section 155. in which letters occurs from Roman letter using consonant sounds after receiving a signal from a key input section 140, a key code change control section 156 in which the rounded Japanese phonetic syllabary such as diphthongs (for example, "AI", "UI", "EI" and "OU") when pressing plural press keys simultaneously, as explained later in an operation section, a shift function control section 157 changing each key in the main key area 3A into either the shift condition or the non-shift condition when "シフト" (shift) key 116 is pressed, and a side-by-side finger shift control section 158 producing a symbol code arranged at a shift position of one of neighbor consonant keys when they are pressed at the same time, and signals from each control section are transmitted to the display device control section 129 controlling the screen 130.

The above-mentioned Roman letter change function control section 155 is provided with a function for recognizing that plural press keys of Twisted sound (sounds consisting of consonants, /k/, /s/, /t/, /n/, /h/ and /m/ and diphthong, /i/, /iu/, /io/ after the above-mentioned consonants.) or diphthong are pressed simultaneously and producing code of Twisted sound or diphthong.

The above-mentioned side-by-side finger shift function control section 158 has a distinctive structure in the present invention and is a substituting shift condition change means for the thumb shift, which is shown in FIG. 20 more concretely.

Namely, the side-by-side finger shift function control section 158 carries out the shift function when Japanese voiced sounds, period and comma are pressed in the shift condition of these keys in the consonant sound area 3E and plural keys in a predetermined pair are pressed at the same time, that is as shown in FIG. 20, a key combined with a key, "シ" in the right or the left side by a line is pressed with a middle or index finger at the same time, which is substituted for a thumb shift.

The reason why the inventor created this shift control is as follows.

In the case of inputting letters in the shift condition using the keys normally, the input is carried out by pressing "シフト" (shift) key at the same time with a thumb, however, it is not easy to press "シフト" (shift) key by the shift operation by a thumb even though the smooth input could be improved if the keys in the consonant and vowel sound areas are pressed with a thumb like pressing a chord on the piano.

In the case of inputting Japanese sentences smoothly.

First, to input Twisted sounds such as Chinese reading word, Japanese reading word and angular Japanese phonetic word and two syllables simultaneously by one press operation in making most of Japanese characteristics.

Second, to change to the intended "SENTENCE MIXED WITH CHINESE CHARACTER AND ROUNDED JAPANESE PHONETIC SYLLABARY" smoothly in press times as few as possible by a device of improving an accuracy and efficiency of "ROUNDED JAPANESE PHONETIC SYLLABARY AND CHINESE CHARACTER CHANGE".

Third, to pre-register frequently used "DAILY WORD, POLITE WORD, TECHNICAL TERM, PROPER NOUN" and call them smoothly and easily by "ABBREVIATION" which can be remembered easily.

The above ways can be thought out.

To design the smooth input under the first way, the keys in the consonant and vowel sound area is pressed with a thumb as making a chord on the piano, which is the operation to press plural keys at the same time.

The above-mentioned syllable is the smallest unit divided in pronunciation, for example, "さ·く·ら" (/sa/, /ku/, /ra/), "う·め" (/u/, me/), all Japanese except a nasal sound "ん" (/n/) and a double consonant "っ" (/tu/) have VOWEL SOUND STOP syllable which a consonant sound is accompanied by a vowel sound, and words consist of approximately 100 syllables except special borlineed words, so that it is possible to input Chinese reading, Japanese reading and angular Japanese phonetic words, to say nothing of Twisted sounds of vowel sound stops such as "しゃ" (/sha/), "しゅ" (/shu/), "しょ" (/sho/) and the diphthong of vowel sound stops such as "AI", "UI", "EI", "UU" and "OU" by pressing plural keys simultaneously like pressing a chord on the piano with thumb using the characteristics which "CONSONANT SOUND STOP" has fewer syllables (in the case of the borlineed words, a combination of consonant and vowel sounds is complicating and it is said that plural consonants are put one after another and there are more syllables of "CONSONANT SOUND STOP" of which last sound is consonant, so that only standard Beijing language has 400 syllables in Chinese and English has more than three million syllables).

As a result, plural keys are pressed at the same time like pressing the keys in the consonant and vowel sound areas with a thumb like making a chord on the piano, so that the smooth input can be improved, however, the shift by the shift operation with a thumb can not be used (if a left thumb is used, the shift operation can be performed).

The above-mentioned smooth input is coped with by establishing the side-by-side finger shift function control section 158 as the shift operation function in the present invention.

A key input manner using this side-by-side finger shift will be explained in detail later.

To explain further the control of the inner keyboard-type input apparatus referring to FIG. 21, the drawing is a block diagram of the inner keyboard-type input apparatus controlling the conversion of alphabet when typing alphabets in the English mode, and the above-mentioned keys arranged in respective key areas 3A, 3B and 3C should be understood as to correspond to the key input section 140.

A reference numeral 160 in the drawing is a English word control section and produces the character code when high frequently English words such as "the, "you", "he", "she", "it", "to" and so on are pressed at one pressing.

A reference numeral 161 is a sentence head capital control section to change a small letter at the sentence head into a capital letter, that is, when plural English letters are pressed almost simultaneously, the first one of those letters pressed is outputted in a capital letter on the display screen.

Concerning changing only first letter of the beginning of sentence or proper noun into a capital in the present embodiment, an initial letter of a sentence head or a proper noun might be pressed while a "サブII" (subkey II) key 121 is pressed, and concerning changing all the letters of an abbreviated word or specific word into the capital letters, plural capital alphabets can be inputted by pressing the alphabets one by one while "サブII" (subkey II) key 121 is pressed.

At reference numeral 162 is a space control section controlling a space in English sentence, producing a code of space in order to put a space after the last letter, period and comma at the same of inputting a period, comma and letter after the last letter of a word, period and comma and the space is inputted after pressing "サブII" (subkey-II) 121 when doing the compound input of two or three letters unit or pressing the last letter of a word. In the present embodiment, "サブII" (subkey-II) 121 is pressed at the same time of pressing a comma (,) or period (.) and a space is inputted after a period and comma as well.

At reference numeral 163 is a compound input means producing a pre-established symbol code against a key combination pressed at the same time of pressing plural keys arranged in the main key area 3A, comprising mainly a pattern record means 164 recording the letter pattern corresponding to a combined pattern of plural keys and a letter line, a pattern comparing means 165 comparing the combination of the key pressed at the same time of pressing plural keys with a pattern recorded in the above-mentioned pattern record means 164, and a letter line selecting means 166 outputting by acquiring the above-mentioned letter line corresponding to the pattern from the above-mentioned pattern record means 164 in the case of discovering the pattern in the above-mentioned pattern comparing means 165.

The above-mentioned letter line selecting means 166 selects the above-mentioned plural letter lines by turns by the predetermined key operation (the key operation pressing the subkey-III 123 simultaneously) and establishes letters and different plural letter lines corresponding to the combination pattern of the above-mentioned key.

At reference numeral 167 is a vowel compound input means producing Japanese letter code of the above-mentioned Twisted sound or diphthong when pressing plural vowel sound keys establishing vowel sounds of the Twisted sound and diphthong simultaneously.

Fifteen English sentence patterns, shown in FIGS. 22 and 23, can be listed as patterns recorded in the above-mentioned pattern record means 164.

Followings are six patterns of two-letter unit, (A)–(F) shown in FIG. 22 and nine patterns of three-letter unit, (G)–(O) in FIG. 23 as English alphabetic spellings.

(A) consonant+vowel
(B) consonant+consonant
(C) vowel+vowel
(D) double consonants
(E) double vowels
(F) vowel+consonant
(G) consonant+vowel+consonant
(H) consonant+consonant+vowel
(I) consonant+consonant+consonant
(J) consonant+double vowel
(K) vowel+vowel+consonant
(L) vowel+consonant+consonant (M) vowel+double consonant
(N) consonant+vowel+consonant
(O) vowel+consonant+vowel The above-mentioned combination (A), (consonant+vowel) is usually a standard input of English and two-letter "simultaneous input" can be done by this combination. The reason why (B), (C), (D) and (E) are called "BASIC ORDER" is that these sounds are inputted in almost the same way as (A) and the reason why (F) is called "INVERTED ORDER" is that an order of consonant and vowel is converted from (A), so that it is necessary to input sounds with changing ways so as not to confuse with (A) in pressing.

When pressing (A), (B) and (C) patterns of two-letter "BASIC ORDER", these two letters are inputted with right fingers simultaneously, however, while a consonant of (D) and a vowel of (E) are pressed with a right finger. L shift key 119 is pressed with a thumb or little finger at the same time. In the case of inputting (F) pattern, while a vowel and consonant are pressed with right fingers simultaneously, "サブIII" (subkey-III) (INVERTED ORDER) 122 is pressed with a right thumb or left finger.

Three-letter patterns (G)–(N) are inputted as follows.

In the case of three-letter "BASIC ORDER" (G), (H) and (I), these three letters are inputted to be pressed with the right fingers at the same time, however, as far as (J) is concerned, while a consonant and vowel sounds are pressed with the right fingers at the same time, "Fシフト" (F shift) key is pressed with the right thumb or little finger.

In the patterns of three-letter "INVERTED ORDER" (K) and (L), these sounds are inputted by pressing three letters with the right fingers simultaneously while pressing "サブIII" (subkey III) (INVERTED ORDER) 122 with the left finger and in the pattern of (M), these sounds are inputted by pressing a vowel and consonants with the right finger simultaneously while "サブIII" (subkey III) (INVERTED ORDER) 122 is pressed with the left finger and "Fサブ" (F shift) key 117 is pressed with the right thumb or little finger at the same time.

In the patterns of three-letter "RECIPROCAL" (N) and (O), three letters are pressed with the right fingers simultaneously while SUBKEY-I "RECIPROCAL" 121 is pressed with the left finger.

A manner of such an alphabetic compound input will be explained later more in detail.

The patterns memorized in the above-mentioned pattern memory means 164 includes a pattern organizing Twisted sound group of "CONSONANT+Y+VOWEL" and other such as "しゃ/sya/", "Lゅ/syu/", "Lしょ/sho/" and so on, a pattern organizing the nasal sound group of "VOWEL+NASAL" such as "AN", "IN", "UN" and so on, and the nasal sound group of "CONSONANT+NASAL" such as "KAN", "KIN", "KUN" and so on in spelling with the Roman letters input for Japanese, and so on.

The short Twisted sounds such as "SYA", "SYU", "SYO" and so on can be inputted by pressing "Y" with the right thumb while the consonant sound and the vowel sound are pressed at the same time and the long Twisted sound such as "SYUU", "SYOU" and so on can be inputted by pressing simultaneously "Lシフト" (L-shift) key 119 with the right thumb while "CONSONANT+O" and "CONSONANT+U" are pressed in stead of pressing "CONSONANT+YUU" and "CONSONANT+YOU".

The manner of the above-mentioned compound input for Japanese will be explained in detail later.

Figure 24:
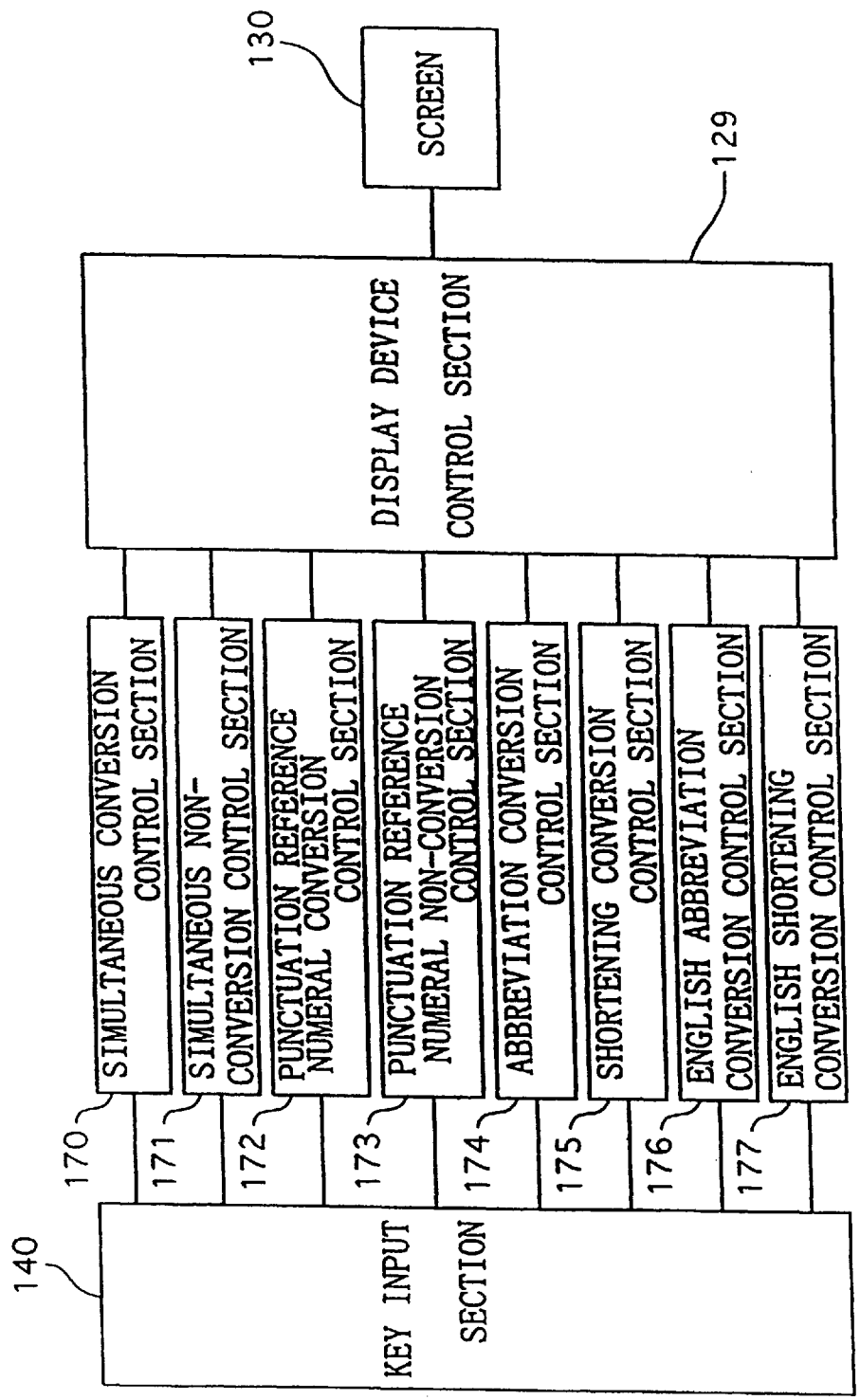
FIG. 24 is a block diagram of the inner structure of the keyboard-type input apparatus related to the foregoing embodiment.

FIG. 24 is a block diagram of the inner keyboard-type input apparatus controlling a fast conversion of English and Japanese. In FIG. 24 the keys arranged in the above-mentioned key areas 3A, 3B and 3C correspond to the key input section 140.

At reference numeral 170 in the drawing is a simultaneous conversion control section operating to convert a phrase (in Japanese sentence) when the conversion key 116 and a letter key of the last letter in the phrase required converting are simultaneously pressed. A reference numeral 171 is a simultaneous non-conversion control section operating to convert the bunsetu when the conversion key 117 and a letter key of the last letter in the bunsetu required converting are simultaneously pressed.

At reference numeral 172 is a punctuation reference numeral conversion control section operating to convert automatically sentences typed until then into "CONVERSION FOR JAPANESE SYLLABARY AND CHINESE CHARACTER" when the conversion key 116 is pressed with the right or left thumb while a comma and period are respectively pressed with "SIDE-BY-SIDE FINGERS SHIFT".

At reference numeral 173 is a punctuation reference numeral non-conversion control section operating to convert automatically sentences typed until then into "NON-CONVERSION INPUT" when the non-conversion key 117 is pressed with the right or left thumb while a comma and a period are respectively pressed with "SIDE-BY-SIDE FINGERS SHIFT".

At reference numeral 174 is an abbreviation conversion control section to call specific words or symbol registered by an initial letter of the abbreviated word when "サブI" (subkey I) 120 or "サブII" (subkey II) 121 is pressed with the left finger at the same time when "機能シフト" (function shift) key 118 is pressed with the right thumb with pressing the abbreviated word with the right finger.

At reference numeral 175 is a shortening conversion control section to call words registered for the abbreviation conversion when "サブIII" (subkey III) 122 is pressed with the left finger and "機能シフト" function shift) key 118 is simultaneously pressed with the right thumb while one or two of the initial letters are pressed with the right finger.

At reference numeral 176 is an English abbreviation conversion control section to call specific words or symbols registered with the abbreviated word when "サブI" (subkey I) 120 or "サブII" (subkey II) 121 is pressed with the left finger at the same time when "機能シフト" (function shift) key 118 is pressed with the right thumb while the abbreviated word is pressed with the right finger. The present embodiment is structured that idioms are registered in "サブI" (subkey I) 120 and the proper noun, figure and symbol are registered in "サブII" (subkey II) 121.

At reference numeral 177 is an English shortening conversion control section to call words used once and registered automatically when "サブIII" (subkey III) 122 is pressed with the left finger and "機能シフト" (function shift) key 118 is simultaneously pressed with the right thumb while more than one of short initial letter are pressed with the right finger.

FIG. 25 is a block diagram of the inner keyboard-type input apparatus to cause the keys of the keyboard-type input apparatus to have a cursor movement function. The keyboard-type input apparatus includes cursor movement key 103, 107, 108 and 109 assigned at the main key area, receiver 180 to sense that the above-mentioned cursor movement keys 103, 107, 108 and 109 are pressed, and cursor movement signal output means 181 to output a cursor movement signal to move the cursor indicated on the screen of the wordprocessor, personal computer and so on after delivering the signal from the receiver 180.

The above-mentioned receiver 180, for example, delivers the signal which the cursor movement key 103, 107, 108 and 109 are pressed for the definite time into the cursor movement signal output means 181, and the cursor movement signal output means 181 moves the cursor upward upon pressing the cursor movement key 103, moves the cursor leftward upon pressing the cursor movement key 107, moves the cursor rightward upon pressing the cursor movement key 109, and moves the cursor downward upon pressing the cursor movement key 108.

In the present embodiment, the above-mentioned cursor movement keys 103, 107, 108 and 109 are arranged at the upper and middle lines in the main key area but the present invention is not limited within the present embodiment.

Assuming that the above-mentioned cursor movement keys 103, 107, 108 and 109 are used for assorting each other, the cursor will be able to move to the right upper diagonal, left upper diagonal or so on.

The input of English and Japanese using the keyboard-type input apparatus structured like the above-mentioned description will be explained in detail.

STANDARD INPUT FOR JAPANESE

A manner of a standard input of Japanese with the right hand will be explained. The following explanation is about changing the Roman letters input into the Japanese input mode by means of the changing means of word-processor function.

INPUT LETTERS BY ONE FINGER OF ONE HAND OR BOTH HANDS

In the case of inputting letters one by one on the input screen after the word-processor is booted up, alphabets are inputted by pressing letters one by one as the general "ROMAN LETTERS INPUT". The input can be operated by pressing the keys with one index finger.

In the case of inputting with the index finger, the voiced sounds (a consonant sounds such as /g/, /z/ or /d/) and P-sound (a consonant sound such as /p/) are inputted by pressing "シフト" (shift) key 116 with the thumb or other and pressing the keys of main key area with the index finger. The input is not always operated by the index finger but can be operated using the thumbs and other fingers of both hands with the keyboard-type input apparatus on the palm.

Inputting Letters Using All Fingers of One Hand

When the compound input of vowel and consonant sounds is performed by all right-hand fingers, the right index finger is put on the key 107 in the vowel key area 3D and a middle, ring, and little fingers are respectively put on the keys 108, 109 and 110 in the consonant key area 3E. The right fingers are put on a home key position of the keyboard-type input apparatus in the present embodiment. The manner to input letter by using an index, middle, ring and little finger is as follows.

Namely, the right fingers are located on the middle line, that is an index finger is on "A", a middle finger on "K", a ring finger on "S", and a little finger on "T", whereby keys in the upper, middle and lower lines are pressed with each finger. Consonant sounds are inputted by pressing keys with a middle, ring or little finger and vowel sounds are inputted simultaneously by pressing keys by an index finger. Consonant sounds of Japanese voiced sounds and the P-sounds can be inputted by pressing "シフト" (shift) key with a thumb (herein after referred to as a thumb shift).

FIGS. 26 and 27 show an input diagram in the case of inputting fifty sounds like the above and fifty sounds are inputted by a finger press operation shown in the figure.

INPUTTING "TWISTED SOUND"

Consonant sound is pressed and thereafter "Y" key 113 is pressed at the same time of pressing a vowel sound with an index finger with each finger put in the home position, that is "TWISTED sound" is inputted by pressing a "CONSONANT+Y+VOWEL" twice. Japanese voiced sound and P-sound are inputted by the thumb shift. Needless to say, they can be inputted by pressing one letter by one.

INPUTTING NASAL, DOUBLE CONSONANT, PERIOD, AND COMMA

FIG. 28 shows positions of fingers of nasal sound "ん" /n/, double consonant "つ" /tu/, period "、", comma "。", and long sound symbol "ー" and as shown in this drawing, the nasal sound "ん" /n/ is inputted solely like a vowel. The operation is that the press key "ん" in the vowel area is pressed with an index finger.

Double consonant "つ" /tu/, period "、", comma "。", and long sound symbol "ー" are inputted by pressing "シフト" (shift) key 116 in the lowest line with each thumb (thumb shift) and also by pressing each key in the lower line in the consonant area with a finger.

INPUTTING ROUNDED JAPANESE PHONETIC SYLLABARY SMALL LETTER

Figure 29:
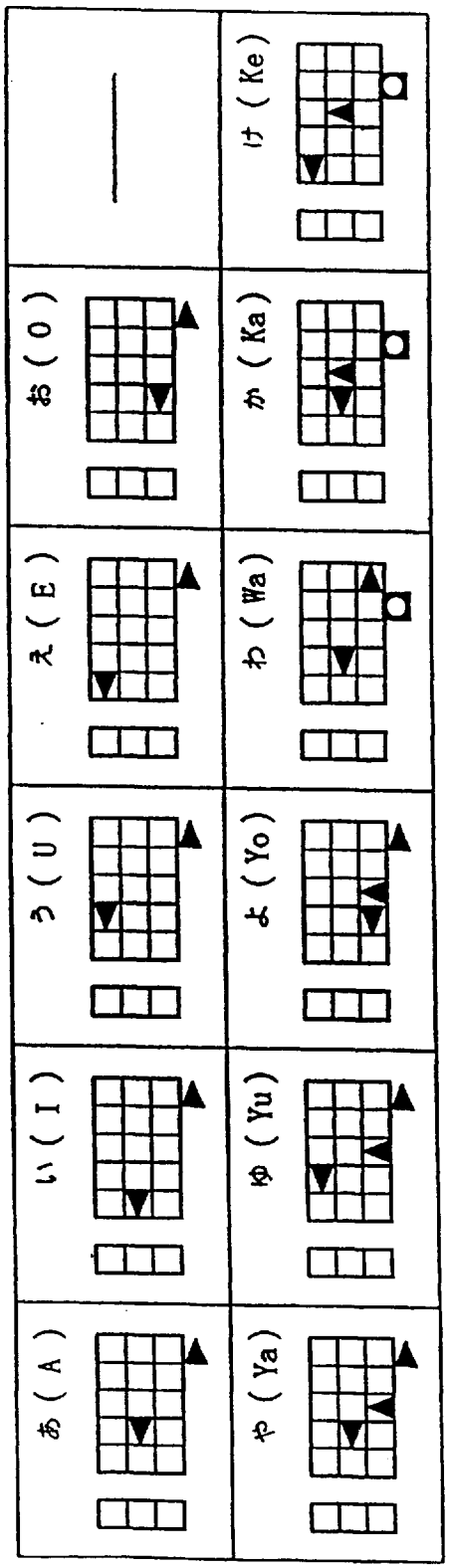
FIG. 29 is a diagram of the small letters input.

FIG. 29 shows an inputting manner of small letters and the rounded Japanese phonetic syllabary small letters "ぁ", "ぃ", "ぅ", "ぇ", "ぉ", "ゃ", "ゅ" and "ょ" are inputted by pressing "L わシフト" (L shift) key 119 in the lowest line with a thumb or little finger simultaneously.

INPUTTING CHINESE AND ANGULAR JAPANESE PHONETIC SYLLABARY

A "SENTENCE MIXED WITH CHINESE AND ROUNDED JAPANESE PHONETIC SYLLABARY" and the angular Japanese phonetic syllabary are converted from "READING JAPANESE SYLLABARY" by pressing "変換" (conversion) key 116 solely with a thumb like a general word-processor. After pressing the rounded Japanese phonetic syllabary in Roman letter, "変換" (conversion) key 116 is pressed with a thumb like a general word-processor. The angular Japanese phonetic syllabary can be converted by pressing "変換" (conversion) key 116 and "無変換" (non-conversion) key 117 with a right thumb and index finger simultaneously.

STANDARD INPUT OF ENGLISH

English standard input can be inputted with one hand easily like Japanese standard input. Needless to say, the following explanation can be used by changing Japanese input mode of Roman input to English input mode by a change means of a word-processor's function.

INPUTTING LETTERS BY USING ONE FINGER OF EITHER ONE HAND OR BOTH HANDS

To input alphabets on the input screen after booting up a word-processor on the screen, keys with alphabets on them are inputted by pressing one by one like QWERTY ARRANGEMENT. Consonants on each key in a shift condition are inputted by the thumb shift.

COMPOUND INPUT OF CONSONANT AND VOWEL SOUNDS

In the case of inputting letters in the order of "CONSONANT+VOWEL" as shown in FIG. 30, a right index finger is put on the key 107 in the vowel area 3D and a middle, ring and little finger are put respectively on the keys 108, 109 and 110 in the consonant area 3E, that is right fingers are located on the middle line and an index finger is on "A", a middle finger on "K", a ring finger "S" and a little finger on "T", and consonants are pressed by a middle, ring or little finger while vowel sound is pressed by an index finger. Consonant sounds located at the upper section of each key are inputted by the thumb shift.

In the present embodiment, fixed letters can be picked up from the alphabetic patterns recorded in the pattern record means 164 by an operation of the compound input means 163, so that frequently used two letters "he, me, we, do, so and to" besides the letters shown in FIG. 30 can be inputted smoothly by an operation of pressing two keys simultaneously.

For words having many letters therein such as "personal computer" or "word processor", for example, only underlined sections can be inputted as a SIMULTANEOUS INPUT OF CONSONANT AND VOWEL and the others can be inputted by pressing one letter by one.

INPUTTING PERIOD, COMMA AND OTHERS

Keys corresponding to comma ",", period ".", hyphen "-" and apostrophe "'" are pressed with an index finger and inputted by the thumb shift.

Next, a manner of fast input of Japanese and English using the keyboard-type input apparatus relating to the present embodiment will be explained.

A FAST INPUT OF JAPANESE

Fast input in Japanese is performed by a shift operation of a side-by-side finger shift in principle. As shown in FIG. 20, when letters on each key in a shift condition are pressed, "シ" marked key combined with the same key by a line in the right side or the upper left side is pressed with a ring or little finger, which is the shift operation manner substituted for a thumb, and following Japanese fast inputs (1) to (4) will be performed in this manner.

Except establishing "SIMULTANEOUS CHANGE MODE", conventional thumb shift can be used, so that when a period and comma are pressed, the fast input can be carried out by pressing "シフト" (shift) key with a left thumb.

(1) A compound input of "TWISTED sound"

"TWISTED sound" is frequently used in idioms of a phonetical reading, for example, "著書" (TYO SYO) (book)·"助手" (ZYO SYU) (helper)·集中 (SYUU TYUU) (concentration)·商業 (SYOU GYOU) (business) and so on, so that Japanese fast input can be improved if the compound input if "You ON" itself can be performed by the side-by-side finger shift.

Short "You ON" such as "SYA", "SYU" and "SYO" are composed like "consonant+Y+vowel", being used as one syllable, in which "Y" is inserted between and long "TWISTED sound" such as "SYUU", "SYOU" and others are especially and frequently used, being treated as two syllables, of which composition is "consonant+Y+vowel+vowel", and of which last two vowels are read "UU" or "OU" in a phonetic reading, having no exceptions.

Furthermore, on a keyboard of JIS JAPANESE SYLLABLE, "や (ya)·ゆ(yu)·よ(yo)" accompanying "TWISTED sound" are arranged at the most upper line in four lines' arrangement, so that while a little finger is pressing the shift key, the others need to extend to press and therefore it is difficult to operate.

All "TWISTED sound" are inputted by one press operation (an operation by a compound press using all fingers like pressing a chord on the piano) in the following way and the long "TWISTED sound" are inputted by using L shift key 119 at the lowest line.

"INPUT OF SHORT TWISTED SOUND"

The short TWISTED sound such as SYA, SYU, SYO and so on are inputted with being pressed simultaneously the vowel key and consonant key corresponding with respective sounds and pressing Y by the right thumb at the same.

"INPUT OF LONG TWISTED SOUND"

The long TWISTED sound such as SYUU, SYOU and so on are inputted with being pressed CONSONANT+U or CONSONANT+O instead of pressing CONSONANT+YUU or CONSONANT+YOU and being pressed the L-shift key 119 by the right thumb at the same time.

An example of the compound input for TWISTED sound as shown in FIG. 31 is structured to be inputted letters such as, "受領(receive) JURYOU", "駐車 (parking) CYUUSYA", "状況 (a situation) ZYOUKYOU", "供給 (supply) KYOUKYUU", "就業 (working) SYUUGYOU" by being put five fingers of the right thumb, right index finger, right middle finger, right ring finger and right little finger on respective positions as shown in the drawing.

(2) THE COMPOUND INPUT FOR ALL THE CHINESE READING WORDS

Explaining the compound input for the Chinese reading words to meet the fast input for Japanese, the key input device related the present invention utilizes for a rule of the Chinese reading words used frequently in Japanese, so that first the rule of the words of phonetical reading used frequently in Japanese will be simply explained and then the compound input for the Chinese reading words will be explained.

Japanese can be expressed by using the three ways, the Chinese reading words (resulted from Chinese), the Japanese reading words (as the original Japanese) and the Japanese phonetic syllabary words (as the borlineed words from foreign languages), in view of the derivation of Japanese. The large percentage of whole Japanese is occupied the phonetical reading, in sectionicular, the idiom of Chinese character is mostly read as the phonetical reading.

There are the following rules in the phonetical reading used frequently in Japanese from the interesting "INKU-TUKI METHOD (or TUKIICHIKUN METHOD)", the shorthand of Nakane method. (The arrangement of SKY ARRANGEMENT and M-TYPE are applied the same idea as the shorthand method.)

1.) All Chinese characters for Chinese reading are not composed of more than three syllables but are composed of one or two syllables.
2.) The second syllable in the Chinese character of the Chinese reading is certainly to be either "I, U", "KI, KU, TI, TU, small TU, N".

3.) The second syllable to be "I" is to be the diphthong "AI, UI, EI".
4.) The second syllable to be "U" is to be the diphthong "UU, OU".

For example, following are the idiom of Chinese character for two letters as the Chinese reading words.

1.) Examples of the Chinese character having "I" in the second syllable (the diphthong whether "AI, UI, EI"):

| 開催 | K<u>AI</u> S<u>AI</u> (open) | 内外 | N<u>AI</u> G<u>AI</u> (out and in) |
|---|---|---|---|
| 会計 | K<u>AI</u> K<u>EI</u> (finance) | 類推 | R<u>UI</u> S<u>UI</u> (analogy) |
| 推定 | S<u>UI</u> T<u>EI</u> (inference) | 累計 | R<u>UI</u> K<u>EI</u> (the total) |
| 経営 | K<u>EI</u> <u>EI</u> (management) | 経済 | K<u>EI</u> Z<u>AI</u> (economy) |

2.) Examples of the Chinese character having "U" in the second syllable (the double vowel wether "UU, OU"):

| 方法 | H<u>OU</u> H<u>OU</u> (a method) | 構造 | K<u>OU</u> Z<u>OU</u> (a construction) |
|---|---|---|---|
| 工場 | K<u>OU</u> ZY<u>OU</u> (a factoru) | 東京 | T<u>OU</u> KY<u>OU</u> (Tokyo) |
| 通風 | T<u>UU</u> F<u>UU</u> (ventilation) | 中央 | Y<u>UU</u> <u>OU</u> (the center) |
| 流通 | RY<u>UU</u> T<u>UU</u> (currency) | 共通 | KY<u>OU</u> T<u>UU</u> (common) |

3.) Examples of the Chinese character having "N" in the second syllable:

| 安全 | A<u>N</u> ZE<u>N</u> (safety) | 簡単 | KA<u>N</u> TA<u>N</u> (brevity) |
|---|---|---|---|
| 混沌 | KO<u>N</u> TO<u>N</u> (chaos) | 新聞 | SHI<u>N</u> BU<u>N</u> (a newspaper) |
| 単純 | TA<u>N</u> JU<u>N</u> (simplicity) | 判断 | HA<u>N</u> DA<u>N</u> (judgment) |
| 民間 | MI<u>N</u> KA<u>N</u> (a private citizen) | | |
| 人選 | ZI<u>N</u> SE<u>N</u> (selection of a suitable person) | | |

4.) Examples of the Chinese character having "KI, KU" in the second syllable:

| 辟易 | HE<u>KI</u> E<u>KI</u> (a flinch) | 的確 | TE<u>KI</u> KA<u>KU</u> (precision) |
|---|---|---|---|
| 画策 | KA<u>KU</u> SA<u>KU</u> (a scheme) | 迫力 | HA<u>KU</u> RYO<u>KU</u> (power) |
| 服役 | FU<u>KU</u> E<u>KI</u> (penal servitude) (extemporization) | 即席 | SO<u>KU</u> SE<u>KI</u> |
| 目的 | MO<u>KU</u> TE<u>KI</u> (a purpose) | 宿敵 | SYU<u>KU</u> TE<u>KI</u> (an old enemy) |

5.) Examples of the Chinese character having "TI, TU, small TU(つ)" in the second syllable:

| 日日 | I<u>TI</u> NI<u>TI</u> (a day) | 吉日 | KI<u>TI</u> ZI<u>TU</u> (a lucky day) |
|---|---|---|---|
| 質実 | SI<u>TU</u> ZI<u>TU</u> (simplicity and seriousness) | | |
| 切実 | SE<u>TU</u> ZI<u>TU</u> (urgency) | 活発 | KA<u>つ</u> PA<u>TU</u> (activity) |
| 実質 | ZI<u>つ</u> SI<u>TU</u> (substance) (desectionure) | 出発 | SYU<u>つ</u> PA<u>TU</u> |

The idiom of Chinese character as the above-mentioned some examples are used frequently for making sentences in general. The rules show the syllable with the underline in the above-mentioned some examples, however, has no exception to rule but has commonality with case of the above-mentioned You On and all the Chinese reading words.

There are two reasons why the Chinese reading has the clear rules as the foregoing description, one of them is the rules of original Chinese character as Chinese languages and another is that the complicated pronunciation having intonation peculiar to Chinese had been simplification to meet the monotonous pronunciation in Japanese. Therefore contemporary Japanese has a lot of homonym in the idiom and Chinese character of the Chinese reading. Upon utilizing the specific characteristic, all the Chinese reading characters will be able to be inputted the letters by the pressing operation with one compound input.

For example, the second syllable in the Chinese reading words can be inputted by COMPOUND INPUT in the following method with using SIDE-BY-SIDE FINGER SHIFT in the key input device of the present embodiment.

The Chinese reading character having "I, U, N" in the second syllable is inputted by COMPOUND INPUT in the following method with the operation by the only right hand.

1.) The compound input of I in the second syllable (the compound input of the diphthong of AI, UI or EI).

The compound input of the diphthong of AI, UI, EI is inputted by pressing I by the thumb at the same time while one of A, U, E is pressed by the index finger.

2.) The compound input of U in the second syllable (the compound input of the diphthong of UU or OU).

The compound input of OU of the diphthong is inputted by pressing U by the index finger at the same time while O is pressed by the thumb. Upon following the consonant sound before the letter, the consonant sound is simultaneously pressed by the middle finger, ring finger or little finger.

The compound input of UU of the diphthong is used in the case of only CONSONANT+UU, so that the such compound input is inputted by pressing N instead of UU by the thumb or index finger at the same time while the consonant sound is pressed by the middle finger, ring finger of little finger.

3.) The compound input of N in the second syllable (the compound sound of AN, IN, UN, EN or ON).

N is inputted by pressing by a thumb at the same time while CONSONANT+VOWEL or VOWEL in the first syllable. (the case is not confused with the above-mentioned 2) CONSONANT+UU because of different way of pressing.)

FIG. 32 illustrates an example of the compound input of I, U, N in the second syllable, for example, the right hand can typed the letter such as 該当 GAITOU (correspondence), 雄大 KOUTUU (traffic), 雄大 YUUDAI (the sublime), 永遠 EIEN (forever), 水準 SUIZYUN (a level), 人類 JINRUI (the human race) and so on by the way of pressing as the drawing shown.

The Chinese reading character of KI, KU, TI, TU, small TU in the second syllable can be inputted by COMPOUND INPUT as the following description with using the subkey by the left hand.

4.) The compound input of KI, KU, TI, TU, small TU in the second syllable.

The case of CONSONANT+VOWEL in the first syllable is inputted by pressing one of KI, KU, TI, TU, small TU in the second syllable arranged in the subkey by the right thumb or left finger while the right finger is pressing the key of the consonant sound or vowel sound.

And the case of ONLY VOWEL without the consonant sound in the first syllable might be inputted by pressing one of KI, KU, TI, TU, small TU in the second syllable by the right thumb or left finger at the same time while the right index finger is pressing the key of the vowel sound and also by pressing the L-shift key by the right little finger to prevent from confusing with DRAFT MODE CHANGE.

Figure 33:
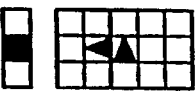
FIG. 33 is a diagram of the input example of the Chinese reading.

FIG. 33 illustrates an example of the compound input of KI, KU, TI, TU, small TU in the second syllable, for example, upon pressing by both hands with the form of the fingers position on the keyboard as shown in the drawing, the Chinese character such as 確実 KAKUJITU (sureness), 錯覚SAつKAKU (an illusion), 圧力ATURYOKU (pressure), 圧迫AつPAKU (oppression), 出席 SYUSつSEKI (presence), 一撃ICHIGEKI (a hit) and so on can be inputted.

FIG. 34 illustrates an example of the compound input of the Chinese reading words, for example, the letters such as 経済 KEIZAI (an economy), 交通KOUTUU (traffic), 推薦SUISEN (recommendation), 圧縮 AつSYUKU (compression), 出発SHUつPATU (desectionure), 一撃 ICHIGEKI (a hit) and so on can be inputted by the five fingers of the right thumb, index finger, middle finger, ring finger and little finger used at respective positions on the keyboard as shown in the drawing.

Pronunciation form of Japanese reading word is completely different from Chinese reading words and almost all fifty sounds are used, so that fixed rules cannot be found. A range of the THE ANGULAR JAPANESE PHONETIC SYLLABARY's origin is wide and its rule cannot be specified, however, the THE ANGULAR JAPANESE PHONETIC SYLLABARY having many borlineed words, its pronunciation has a tendency close to that of phonetic reading words.

Since Japanese reading word represents original Japanese by the rounded Japanese phonetic syllabary or applied to Chinese characters, there are many homonyms having the same readings and different nuances, for example, "みる (the rounded Japanese phonetic syllabary pronouncing [miru] used for the following words), 見る (watch), 視る (inspect), 観る (observe), 看る (look after), 診る (examine)" and it is more difficult to use them properly than to use Chinese reading words.

Almost all fifty sounds are used for Japanese reading words, which does not have rules like the phonetic reading words. Accordingly, all Japanese reading words cannot be inputted by every two syllables, however, in this embodiment, combinations of two-syllable units having adopted for Chinese reading words are used, diphthongs, "AU, AE, AO, OI and OE" which can be pressed in the vowel area and long sounds, "AA, II, UU, EE and OO" which can be pressed by the subkey are added and a section of Chinese reading words can be inputted by COMPOUND INPUT in the following way.

1) Compound Input of Diphthongs Such As "AU, AE, AO, OI and OE"

In the case of a compound input of diphthongs such as "AU, AE, AO, OI and OE", diphthongs "A+U, A+E, A+O, O+I and O+E" are inputted by being pressed by an index finger and a thumb simultaneously.

2) Compound Input of Long Vowel Such As "AA, II, UU, EE and OO"

In the case of a compound input of long vowels such as "AA, II, UU, EE and OO", while a right finger presses the first syllable of fifty sounds, a left finger presses the subkey-I 120, and a left finger or a right thumb presses the subkey-III 121 simultaneously, whereby the long vowel is inputted.

FIG. 35 shows examples of the compound input of Japanese reading word and letters of "考え" (thought), "商い" (business), "大声" (big voice), "小さい" (small), "間違う" (mistake), and "恋しい" (love) can be inputted by using positions of five fingers, a right thumb, index, middle, ring and little finger, shown in the figure.

(4) Compound Input of the angular section THE ANGULAR JAPANESE PHONETIC SYLLABARY The angular section of THE ANGULAR JAPANESE PHONETIC SYLLABARY occupies modern Japanese at a high rate. Not only borlineed words but plants and animals' names, onomatopoeias, child word, emphasized word and others are expressed by the Japanese angular phonetic syllabaries. Since the angular section of THE ANGULAR JAPANESE PHONETIC SYLLABARY has its wide range, its rule can not be specialized, however, a TWISTED sound, a nasal sound /n/ "ん", a double sound /t/ "っ", and a long sound "—" have a high frequent use and has a similar tendency to Chinese reading words.

A combination of two-syllable unit adopted for Japanese and Chinese reading words is used for inputting Japanese-phonetic syllabaries, furthermore special TWISTED sound (one syllable) and long sound (two syllables) which are peculiar to Japanese phonetic syllabaries are added and COMPOUND INPUT is performed by the following way.

1) Input of Special TWISTED sound

When inputting special TWISTED sound among the angular section of THE ANGULAR JAPANESE PHONETIC SYLLABARY inputs, "ファ・ヴァ" is pressed by "F+A·V+A", "シェ・ジェ" is pressed by "S+Y+E·Z+Y+E·T+Y+E", and "ティ・ディ" is pressed by "T+Y+I·D+Y+E".

2) Input of Long Sound Symbol

Long sound symbols are inputted by pressing one of fifty sounds by a right finger, when the SUBKEY-I 120 and SUBKEY-III 122 are pressed as the continuing long sound symbols "-".

FIG. 36 shows examples of the compound input of THE ANGULAR JAPANESE PHONETIC SYLLABARY and "ビュッフェ" (buffe), "ハイファイ" (hi-fi), "チェッカー" (checker), "ディーラー" (dealer), "アクション" (action) and "ジャンケン" (the game of stone, paper and scissors) can be inputted by using the positions of five fingers a right thumb, index, middle, ring and little finger in the figure.

FIGS. 37 and 38 show examples of the compound input of various TWISTED sounds such as "Ka group", "Sa group", "Ta group", "Na group", "Ha group", "Ma group", "Ra group", "Ga group", "Za group", "Da group", "Ba group" and "Pa group" can be inputted by using the positions of five fingers, a right thumb, index, middle, ring and little finger in the figure.

FIGS. 39 and 40 show examples of the fifty sounds compound input including the nasal sounds as concerns "A group", "Ka group", "Sa group", "Ta group", "Na group", "Ha group", "Ma group", "Ra group", "Ga group", "Za group", "Da group", "Ba group" and "Pa group" and the nasal sounds in the fifty sounds can be inputted by using the positions of five fingers, a right thumb, index, middle, ring and little finger in the figure.

FIGS. 41 and 44 show examples of diphthong compound input as concerns "A group", "Ka group", "Sa group", "Ta group", "Na group", "Ha group", "Ma group", "Ra group", "Ga group", "Za group", "Da group", "Ba group" and "Pa group" and the diphthongs can be inputted by using the positions of five fingers, a right thumb, index, middle, ring and little finger in the figure.

Figure 46:
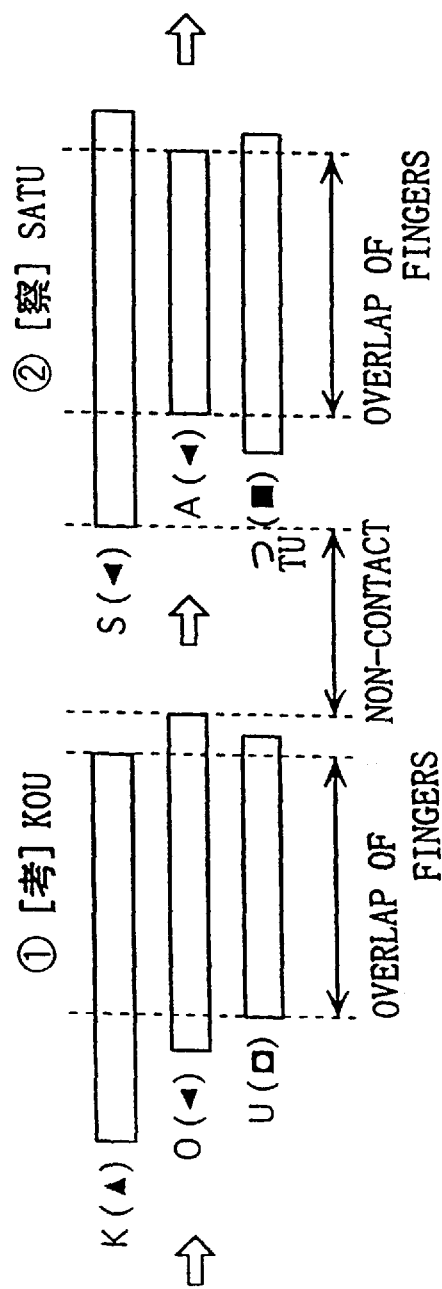
FIG. 46 is a diagram of the press key timing for explaining the compound input of the keyboard-type input apparatus related to the foregoing embodiment.
Figure 51:
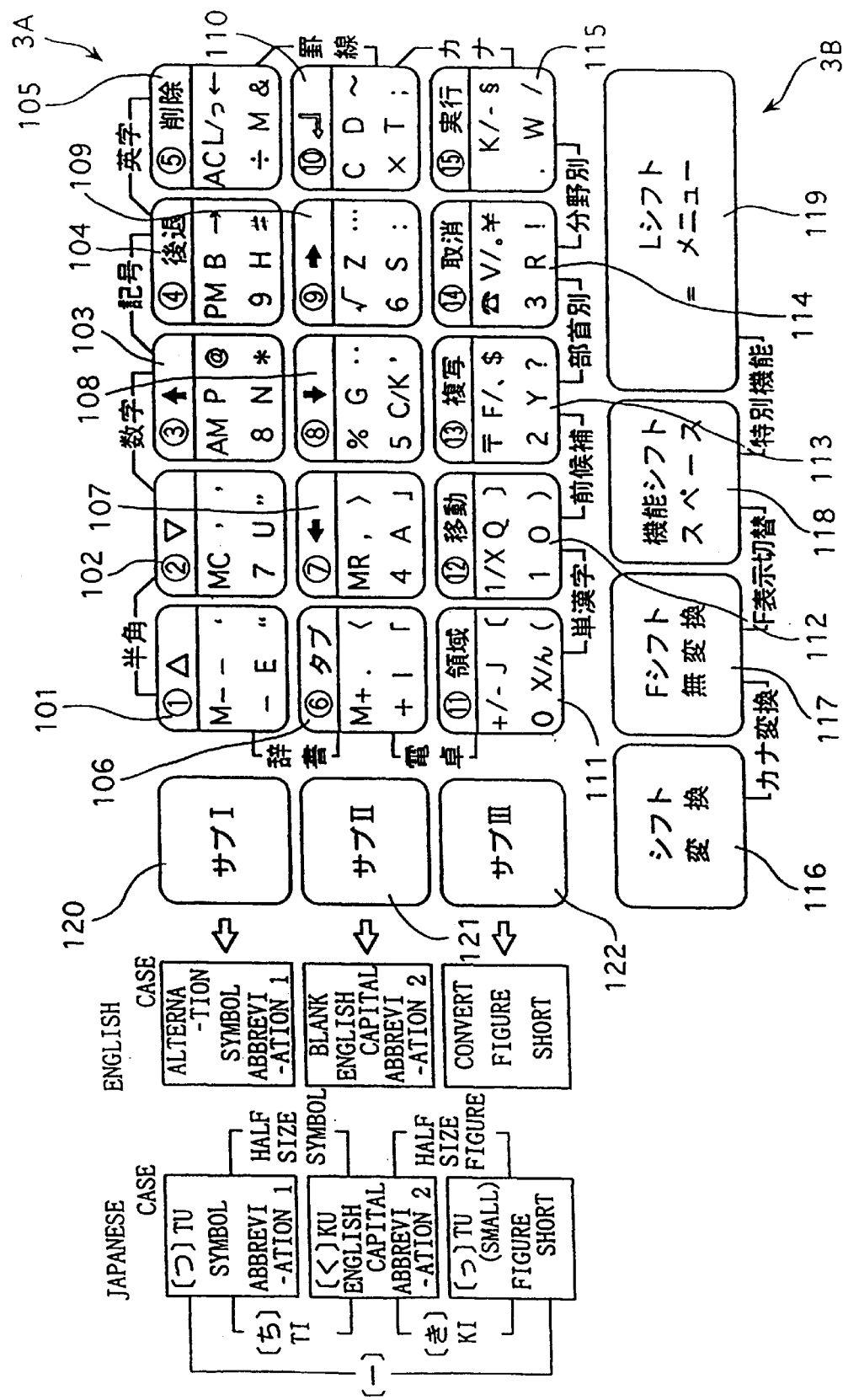
FIG. 51 is a plane view explaining function of subkey.

The input examples shown in the above-mentioned FIGS. 37 and 44 show examples of the simultaneous compound input like a chord of the piano by using plural fingers of one hand, however, FIGS. 45 and 46 show whether the compound input is performed by pressing by one finger or by plural fingers simultaneously.

As shown in FIG. 45,

Step 1 (S 1)

A key is pressed by operating the key input section 40 (a key in the main key area) of the keyboard-type input apparatus.

Step 2 (S 2)

The side-by-side finger shift function control section 158 and the compound input means 163 judge whether the input is a one-press-key input, simultaneous two-press-key one, simultaneous three-press-key one, or simultaneous four-press-key one.

Step 3 (S 3)

The display device control section 129 displays letters by a combination of pressed keys on the screen 130 (when it does not display any letters, it means an error).

Step 4 (S 4)

If the inputted letters are correct, the enter key 115 is pressed and letters are fixed.

In this embodiment, the side-by-side finger shift function control 158 and the compound input means 163 judge electronically and read automatically whether the input is a one-press-key or plural-press-key and a time when fingers are overlapping each other, for example, when 考察"KOU SA つ" (consideration) is inputted by the Roman letter input as shown in FIG. 46, the finger's overlapping time when "K", "O", "U", "S", "A" and "つ" are pressed is caught and if the finger's overlapping time reaches the predetermined time, the letters in accordance with the compound input are displayed on the screen 130 after the key input operation and the compound input judge.

The fast input with English will be explained.

FAST INPUT WITH ENGLISH

English language can be expressed by the English alphabet composed of 26 letters and punctuation reference numerals for writing and is not needed to carry out the bother operation as the conversion when Japanese is typed. English words, however, have a mountain of the combination with the sort of syllable because of the possible pronunciation of English in several ways with the 21 consonant sounds and 5 vowel sounds and because a lot of English words take "ENDING WITH CONSONANT" or the plural continuous consonants and do not always took the vowel sound followed the consonant sound as Japanese words do.

For example, "本HO-N (a book)" or "空 SO-RA (the sky)" is respectively composed of two syllables with the 2 ROUNDED JAPANESE PHONTIC SYLLABARY, so that the pronunciation and writing expression accord for the simple syllable, while BOOK in English is composed of one syllable with the 4 letter and SKY is composed of one syllable with the 3 letter, so that the pronunciation and writing expression do not accord for the complicated syllable.

Such the distinctive feature of English word is not suitable for Compound INPUT of the unit of 2 syllable like Japanese. The key input device of the present invention does not stick to the form of the syllable or pronunciation and will be able to be operated in the fast input because the definite rules are found out from English spell for taking all words asection to the unit of 2 letter or 3 letter.

Supplementing the explanation of the above-mentioned point, 1-letter words in English words composed of the 26 letter are Indefinite Article "a" and Personal Pronoun "I". A easy 2-letter word as following description is frequently used even in a difficult sentence and most of words are made of four or five letters. A long difficult word is composed of the combination of the section of comparative easy stem and the prefix or suffix in the pattern.

The standard input in English can be operated COMPOUND INPUT the 2-letter word composed in order of CONSONANT+VOWEL by one pressing operation. It will be exceeding convenient if COMPOUND INPUT can be smoothly operated for the 2-letter word including other cases such as the order of VOWEL+CONSONANT or combination of CONSONANT+CONSONANT. Following enumeration is three groups of the 2-letter word divided from frequency in use.

1. be, do, go, he, me, <u>no</u>, so, to, we CONSONANT+VOWEL
2. by, me CONSONANT+CONSONANT
3. am, an, as, at, if, in, is, it, of, <u>on</u>, or, up, us VOWEL+CONSONANT

There are not many CONSONANT+CONSONANT in the above-mentioned words and the foregoing 1. and 3. have the converse order of the consonant sound and vowel sound each other. Assuming that the above-mentioned three ways are operated to carry out COMPOUND INPUT for the 2-letter by the same method, "<u>no</u>" and "<u>on</u>" with a underline exactly as they are will not be able to be distinguished from other because of the combination of the same letters but a different order of letters, while other words are not able to be confused because of the different combination of all letters.

Upon COMPOUND INPUT for only the 2-letter word, the complicated rules are not needed but some means is needed to operate COMPOUND INPUT with sectioning off a section of the word having plural letters into every two letters as the standard input.

The case of at the converse of the consonant sound and vowel sound such as "<u>on</u>" is distinguished from others with operating SUB-III KEY pressed simultaneously by one left finger as INVERTED ORDER KEY.

It is possible to operate smoothly COMPOUND INPUT with respective one pressing operation for a 3-letter words of the frequency in use, such as "the, she, you, <u>who</u>, <u>how</u>" as the case of the 2-letter words. "<u>Who</u>" and "<u>how</u>" cannot be distinguished each other upon inputting both of the words with the same way because of the combination of the same letters and a different spell. The 3-letter word composed alternately of consonant sound and vowel sound such as "<u>how</u>" is distinguished from others with operating SUB-I KEY pressed simultaneously by one left finger as RECIPROCAL KEY.

The use of SUB-I KEY and SUB-III KEY in COMPOUND INPUT for the above-mentioned 2-letter word and 3-letter word is similar to the input method by pressing simultaneously the subkey and mainkey one by one as described in DRAFT MODE CHANGE. Therefore, DRAFT MODE CHAGE can be operated in the fast input.

It is difficult for a word having more than four letters to input with one pressing operation, but it is possible to operate easier the fast input upon sectionitioning off the word into a unit of 2-letter or 3-letter, which is different from the sectionition of syllable. COMPOUND INPUT for the unit of 2-letter and 3-letter is needed to be distinguished in the rules defined in order of the spell as the above-mentioned "<u>on</u>" and "<u>no</u>", "<u>who</u>" and "<u>how</u>". Therefore, the unit of 2-letter and 3-letter will be classified as following description.

1. Classification of basic order

"BASIC ORDER" includes a word having the vowel sound following the consonant sound in the 2-letter or 3-letter unit such as "he" and "you" and a word composed of only the consonant sound (or only the vowel sound) such as "sky".

2. Classification of inverted order

"INVERTED ORDER" includes a word having the consonant sound following the vowel sound in the 2-letter or 3-letter unit such as "as" and "and" and is distinguished from other with SUB-III KEY.

3. Classification of reciprocal

"RECIPROCAL" includes a word arranged alternately the consonant sound and vowel sound in the 3-letter unit such as "him" and "one" and is distinguished from other with SUB-I KEY.

FIGS. 22(A), (B) and FIGS. 23(A), (B) are charts of classifing English words into the fifteen pattern of how to spell in English alphabet.

Sections overlapping with the same of consonant sound or vowel sound and illustrated in the chart of the pattern of FIGS. 22(A), (B) and FIGS. 23(A), (B), are inputted by L-shift key and the consonant sound in the shift condition of respective keys is inputted the shift key or F-shift key.

In this embodiment, fifteen English sentence patterns (patterns (A)–(O)) are recorded in the pattern record means 164 of the compound input means 163, the patterns of the keys' combination are compared by the pattern comparing means 165 when operating plural keys by one press and a word in accordance with the patterns is outputted by the means from the above-mentioned pattern record means 164 to the letter line selection means 166 when the corresponding pattern is discovered by the pattern comparing means 165, so that all words can be inputted in a fast speed by the COMPOUND INPUT of the two-letter unit or three-letter unit.

In FIG. 22, when (A), (B) and (C) patterns of two-letter BASIC ORDER are inputted, a target two letters are pressed by right fingers simultaneously, however, while one consonant of (D) and one vowel of (E) are pressed by a right finger, L shift key 119 is pressed respectively by the right thumb or little finger at the same time.

When inputting (F) pattern, a vowel and consonant are pressed by right fingers at the same time of pressing SUBKEY-III (INVERTED ORDER) 122 by the right thumb or left finger.

Consonants of each key in the shift condition are inputted by the thumb shift. If the underlined first consonant in two continuing consonants of COMPOUND INPUT like "by" is in the shift position, the shift key is pressed by the right or left thumb simultaneously and if the second consonant is in the shift condition like "slow", the shift key is pressed by the right thumb simultaneously.

If the underlined two consonants are in the shift condition like "blue", the shift key and F shift key are pressed by both right and left thumbs simultaneously.

The order of consonants are decided approximately in the COMPOUND INPUT of two continuing consonants, however, the order of consonants has two kinds of combinations, for example "most" and "nuts, of which underlined sections are converted each other, so that the compound input means 163 checks a relation of two letters and the spelling automatically and selects an appropriate order mechanically.

When letters coming before the underlined section are the same and the underlined letters are converted like "cast" and "cats", frequently used "st" has its priority and when "ts" needs to be inputted, SUBKEY-III (INVERTED ORDER) 121 is pressed by the left finger simultaneously or the conversion key is pressed by the right or left thumb after inputting "st".

"Ea" takes precedence for two continuing vowels such as "each" and "aero" and these vowels are pressed in the same way as the above-mentioned consonants.

FIG. 47 shows examples of two-letter unit's compound input in English input and English words of east ⌐, "gets", "jump", "help", "pass" and "also" shown in the figure can be inputted by using the positions of five fingers, the right thumb, index, middle, ring and little fingers shown in the figure.

(G)–(N) patterns of three-letter units shown in FIG. 23 are inputted in the following way.

That is, in the case of (G), (H) and (I) patterns of three-letter's BASIC ORDER", the target three letters are inputted by the right fingers simultaneously, however, L shift key is pressed by the right thumb or little finger while a consonant and vowel sounds are pressed by the right finger simultaneously in (J) pattern.

Three letters are pressed simultaneously by the right fingers at the same time of pressing SUBKEY-III 122 by the left finger for (K) and (L) patterns of three-letter's INVERTED ORDER, however, a vowel and consonant are pressed simultaneously by the right fingers at the same time of pressing SUBKEY-III 122 by the left finger and L shift key 117 by the right thumb or little finger for (M) pattern.

Furthermore, for (N) and (0) patterns of three-letter's RECIPROCAL, SUBKEY-I (RECIPROCAL) 121 is pressed by the left finger while three letters are pressed by the right fingers simultaneously.

If the first letter is in the shift condition like "dry" in three-letter's COMPOUND INPUT, these consonants are inputted by pressing the shift key by the right or left thumb and if the second consonant is in the shift condition like "and", these consonants are inputted by pressing F shift key by the right thumb.

If both two consonants are in the shift position like "dig", these are inputted by pressing the shift key and F shift key by the right and left thumbs simultaneously. And yet, since three consonants do not become in the shift condition at the same time, the explanation will be omitted.

When the completely same three letters are replaced each other for a combination like "ten" and "net", though it is a rare case, frequently used "ten" is inputted as it is and for "net, SUBKEY-III (INVERTED ORDER) 121 is pressed while three letters are inputted or after inputting "ten", "ten" is converted to "net" by pressing the conversion key.

FIG. 48 shows examples of three-letter unit's compound input in English input and English words of "sketch", "weight", "prefer", "degree", "offend" and "outage" shown in the figure can be inputted by using the positions of five fingers, the right thumb, index, middle, ring and little fingers in the figure.

FIG. 49 shows examples of the compound input of irregular finger use by the English input and English words such as "shadow", "outlaw", "quarts", "twenty", "paying", "bring" and others shown in the figure can be inputted by using the positions of five fingers, the right thumb, index, middle, ring and little fingers in the figure.

A usage of the fingers in the Compound input is that each position of the middle, ring and little fingers is moved by one line or the thumb is added to press when pressing keys in the same vertical line in the CONSONANT SOUND AREA simultaneously with the fingers' position kept in principle, as shown in FIG. 47, though one section becomes the irregular press.

Similarly, when two or three keys in the same vertical line in the VOWEL SOUND AREA are pressed, the thumb or middle finger is added to the index finger for pressing.

The keyboard-type input apparatus of this embodiment considers that COMPOUND INPUT can be performed by a combination of different keys, letters of the same keys in the shift and non-shift positions are avoided to appear simultaneously, and for example, as far as the combination of "fy" or "lm" which is underlined section of "defy", "film"

or others is concerned, the letters of the same keys in the shift and non-shift positions need to be inputted by the COMPOUND INPUT.

In this case, while "Y" and "L" are pressed, these letters can be inputted by pressing the shift key and F shift key by the thumb simultaneously.

Concerning three letters, the underlined section of "pantry" and "every" need to be inputted by pressing the same key alternately and in this case these letters are inputted by the COMPOUND INPUT by pressing SUBKEY-I (RECIPROCAL) and SUBKEY-III (INVERTED ORDER) by the thumb simultaneously while "P+A" and "E+V" are pressed.

Since "x" in "mix", "oxen" and others are frequently used at the end of a syllable, it is such arranged at the left end of the lower line that it can be pressed easily and when "x" is inputted by pressing a vowel coming before it and "a consonant+a vowel" simultaneously, the COMPOUND INPUT can be performed without using SUBKEY-I (RECIPROCAL) and SUBKEY-III (INVERTED ORDER).

FIG. 50 shows examples of the compound input of a special operation and words can be inputted by using the left fingers, thumb, index, middle, ring and little fingers in the figure.

There is no special rules for assorting words by one to three-letter units in the above-mentioned COMPOUND INPUT and they can be assorted by unit by which words can be pressed easily without concerning syllable pause.

For example, four-letter words, "give" or "fish" can be pressed easily if they are divided into two letters and two letters and "this", "when" or "next" can be pressed easily if they are divided into three letters and one letter.

Five-letter words, "field" or "grass" are divided into three letters and two letters and "fight" or "basic" are divided into two letters and three letters, so that they can be pressed easily.

It has already been mentioned above, however, most high frequent English words are comparatively easy and have a few figures of letters. Two-letter words are "he, me, we, do, go, no, so, to, by, my" and the words of the inverted order are "an, it, us, am, is, at, in, on, as". Three-letter words are "the, she, you, why" for the basic order, "and, him, for" for the inverted order and reciprocal, and "-ing, -ght, -teh" added to a word's end. Furthermore, four-letter words are "this, they, them, come, have" and "-tion, -ough" added to a word's end. These combinations of words and letters can be pressed easily by the above-mentioned COMPOUND INPUT.

It seems difficult to press plural keys simultaneously by distinguishing fifteen patterns immediately without any experiences to some degrees. However, in order to perform COMPOUND INPUT for all words here, rare cases were explained with the examples of complicating and difficult pressing ways.

Accordingly, you do not need to try all pressing ways, it is sufficiently effective if you try the words which are easy to be pressed, and it is comparatively easy to begin if you phase in easy words and difficult words gradually. Three-letter combination in which the fingers can not be handled easily is inputted by assorting three letters into two letters and one letter.

The same thing can be said in Japanese, however, you become skillful in typing by fingers after mastering the rule and practicing words without remembering for this COMPOUND INPUT and you can acquire the smooth fast input if you get used to returning the finger to the home position after typing.

In this embodiment, three subkeys 120, 121 and 122 are arranged on the basic side of the main key area and various inputs by the subkeys become possible by putting each subkey to its proper use in Japanese and English, and the usage of these subkeys will be explained for both Japanese and English cases later.

FIG. 49 shows examples of functions in the case of Japanese and English of these subkeys and the general symbols can be inputted by pressing the subkey-I 120 solely for the Japanese case, English capital letters can be inputted by pressing the subkey-II 121 solely and the ten-key can be inputted by pressing the subkey-III 122 solely.

The subkey-I 120 and subkey-II 121 can operate as an ABBREVIATION CONVERSION key registered to call easily frequently used words or symbols by the abbreviation such as an initial letter and more specifically idiom expressions of Chinese characters and the rounded THE ANGULAR JAPANESE PHONETIC SYLLABARY is registered in the subkey-I 120 and proper nouns, borlineed words, figures, symbols and others are registered in the subkey-II 121.

On the other hand, the subkey-III 122 registers words converted once automatically by turns and operates as a, SHORTENING CONVERSION key calling by an initial first or two letters, that is letters converted in short are called by pressing the initial first or two letters by the right fingers, pressing the subkey-III 122 by the left finger, and pressing the function shift key by the right thumb simultaneously. In this case, a next selection is called by the conversion key and a former selection is called by the non-conversion key solely like the general word-processor function.

The combinations of the above-mentioned three keys, subkey-I 120, subkey-II 121 and subkey-III 122 are as follows.

Namely, when pressing the subkey-I 120 and subkey-II 121 simultaneously, an input of half size symbol is possible and when pressing the subkey-II 121 and subkey-III 122 simultaneously, an input of half size figure is possible.

Furthermore, the combinations of three subkey-I 120, subkey-II 121 and subkey-III 122 produce the letter code of "き/ki/·く/ku/·ち/ti/·つ/tu/·つ/t/·"–", by which sentence input of which second syllable becomes "き/ki/·く/ku/·ち/ti/·つ/tu/·つ/t/·＿" becomes effective.

More specifically, "つ/tu/" is arranged at the subkey-III 122, "く/ku/" is at the subkey-II 121, and "つ/t/" is at the subkey-III 122 and the letter code of "ち/ti/" is produced by the press operation of the subkey-I 120 and subkey-II 121 combination and the letter code of "き/ki/" is produced by the press operation of the subkey-II 121 and subkey-III 122 combination, and the letter code of "＿" is produced by the subkey-I 120 and subkey-III 122 combination.

On the other hand, the subkey-I 120 operates as the RECIPROCAL key changing an English letters' order when being pressed solely, an English BLANK can be inputted by pressing the subkey-II 121 solely, and the subkey-III 122 operates as the INVERTED ORDER key changing the English letters' order when being pressed solely.

Next, the fast conversion method of Japanese and English using the above-mentioned three keys, subkey-I 120, subkey-II 121 and subkey-III 122 will be explained.

In this embodiment, Japanese fast conversion control section is comprising a simultaneous conversion control section 170 changing a sentence clause when a letter key at the end of the sentence clause which is to be changed and the conversion key 116 are pressed simultaneously, a simultaneous non-conversion control section 171 changing the sentence clause when the letter key at the end of the sentence clause which is to be changed and the conversion key 116 are pressed simultaneously, a period and comma conversion control section 172 changing sentences which have been typed so far by the ROUNDED THE ANGULAR JAPANESE PHONETIC SYLLABARY AND CHINESE CHARACTER CONVERSION automatically when the conversion key 116 is pressed by the right or left thumb while pressing the periods or commas by the SIDE-BY-SIDE FINGER SHIFT, a period and comma non-conversion control section 172 changing sentences which have been typed so far by NON-CONVERSION automatically when the non-conversion key 117 is pressed by the right or left thumb while the periods or commas are pressed by the SIDE-BY-SIDE FINGER SHIFT, so that the following fast input is possible.

For example, when 「あすはいしゃにいく。」 [asuwa isyani iku] "I am going to see a doctor tomorline." is to be converted once, a user cannot decide which to choose immediately, because there are four ways to express, such as 「①明日歯医者に行く。②あす歯医者に行く。③明日は医者に行く。④あすは医者に行く。」, however, in this embodiment when a letter at the end of the sentence clause, that is "す/su/" of "あす/asu/" and "は/wa/" of "あすは/asuwa/" in the above example are pressed simultaneously, the simultaneous conversion control section and simultaneous non-conversion control section operate and the sentence clause is converted. Accordingly, the conventional apparatuses need to press the conversion key and non-conversion key when changing the sentence clause, however, the fast input is possible without pressing these keys.

As foregoing description of the present embodiment, the subkey-I 120 and subkey-II 121 are respectively operated as ABBREVIATION CONNVERSION KEY registered the frequency in use of words and phrases and symbols to call smoothly such the words and phrases and symbols with its abbreviation such as its initials, in concrete, the subkey-I 120 is registered the Chinese character, idioms of THE ROUNDED JAPANESE PHONETIC SYLLABARY and others, the subkey-II 121 is registered the proper noun, borlineed words from foreign languages, figures, symbols and so on, and further the subkey-III is operated as SHORTENING CONVERSION KEY registered automatically words and phrases converted one time in sequence to call such the words and phrases with pressing one or two letters of its initials, that is, the letters converted in shorten would be called by the subkey-III 122 is pressed by one left finger and at the same time the function key is pressed by the right thumb while the one or two letters of the initials are pressed by one right finger, so that the fast input function can be progressed for calling the function of ABBREVIATION CONVERSION and SHORTENING CONVERSION as required.

Figure 54D:
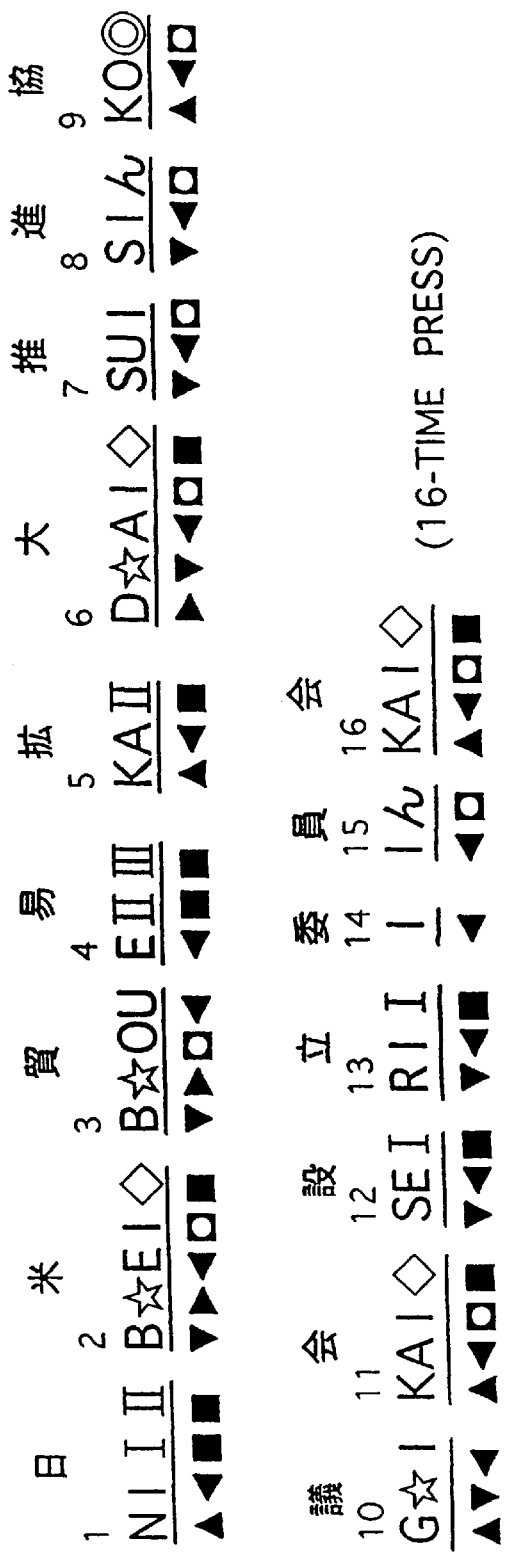

Some example of Japanese sentences by the fast input are illustrated by the relation with the movement of fingers in FIGS. 52(A), (B), (C) to FIGS. 54(A), (B), (C), (D) in which the sentences wrote as the model sentence 1 to 10 are able to be inputted fewer times of pressing keys.

Following is the method of fast conversion in English with the three keys of the subkey-I 120, subkey-II 121 and subkey-III 122.

COMPOUND SPACE for letters or punctuation reference numerals and a space is operated by the subkey-II 121 as the following description.

1.) Compound with a last letter of a word

A compound with a last letter of a word is that a space after the last letter of word is inputted by pressing the subkey-II 121 by one left finger at the same time while the compound input for the 2–3 letters units or the last letter of the word is pressed.

2.) Compound with the punctuation reference numerals

A compound with the punctuation reference numerals is that a space after the punctuation reference numerals is inputted by pressing the subkey-II 121 by one left finger at the-same time while the comma or period is pressed by the thumb shift.

The compound space illustrated some example of method for inputting the compound space in FIG. 55 is inputted by pressing with the five finger of the right thumb, index finger, middle finger, ring finger and little finger arranged respectively positions as shown the drawing.

As shown in FIG. 55, a space following a word composed of more than two letters can be inputted by pressing the subkey-II 121 at the same time while COMPOUND INPUT of the 2–3 letter units or the last letter of the word is pressed.

A space following Indenfinite Article "a" as a word made of a letter, however, is inputted by pressing the subkey-II 121 at the same time while a letter of alphabet "A" and the L-shift key are simultaneously pressed by the right little finger in order to prevent from confusing with an input of the capital A.

The key input device of the present embodiment is structured to include the abbreviation conversion control section 174 to call special words and phrases and symbols registered with the initials of abbreviation as the fast input control section, the shortening conversion control section 175 to call the words and phrases registered for the abbreviation conversion, and the English abbreviation conversion control section 176 to call special words and phrases and symbols registered with the abbreviation, so that it will be able to be easy to change an initial letter of a first of sentence or a proper noun and the whole letters of an abbreviated word or specified word to the capital letter or letters and further the letter input will be effectively operated because English idiom, proper noun, figures, symbols and so on are registered into the subkey-I 120, subkey-II 121 or other as upon inputting Japanese.

The explanation of the ten-key input is omitted here because the ten-key input in the English input is the same as the Japanese input in the embodiments.

FIG. 56 shows input example of initial capital letters and the initial capital letters in the figure can be inputted by using the position of five fingers, the right thumb, index, middle, ring and little fingers.

Since a capital letter of an indefinite article "a", capital letters and a personal pronoun "I" which are one letter of a word are inputted with a blank coming after these, these one-letters are pressed at the same time of pressing the subkey-II 121 and the L shift key and the function shift key are pressed simultaneously.

The same SUBKEY-II 121 is used for inputting the INITIAL CAPITAL LETTER and COMPOUND SPACE coming after the above-mentioned letters, however, a contradiction on the program does not arise, because the capital letters are always inputted after a period and comma or space.

Figure 57B:
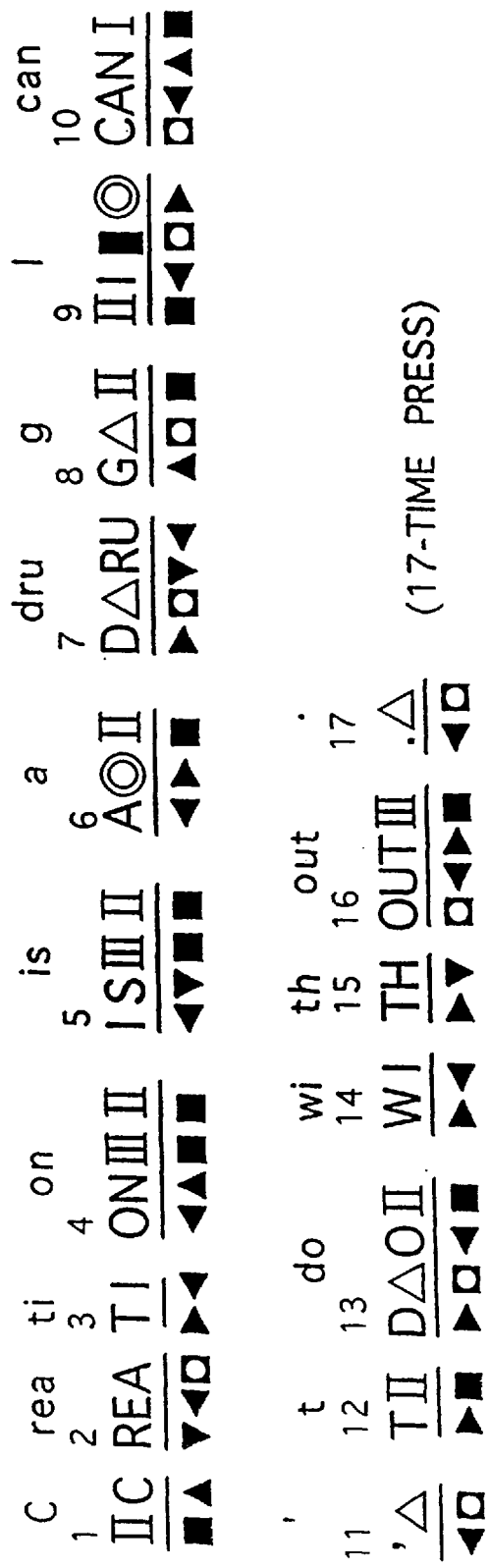

FIGS. 57 and 59 show a relation between the examples of the English fast input and according to this embodiment, the sentence examples 1 to 10 in the figures can be inputted by a few press times.

Figure 60:
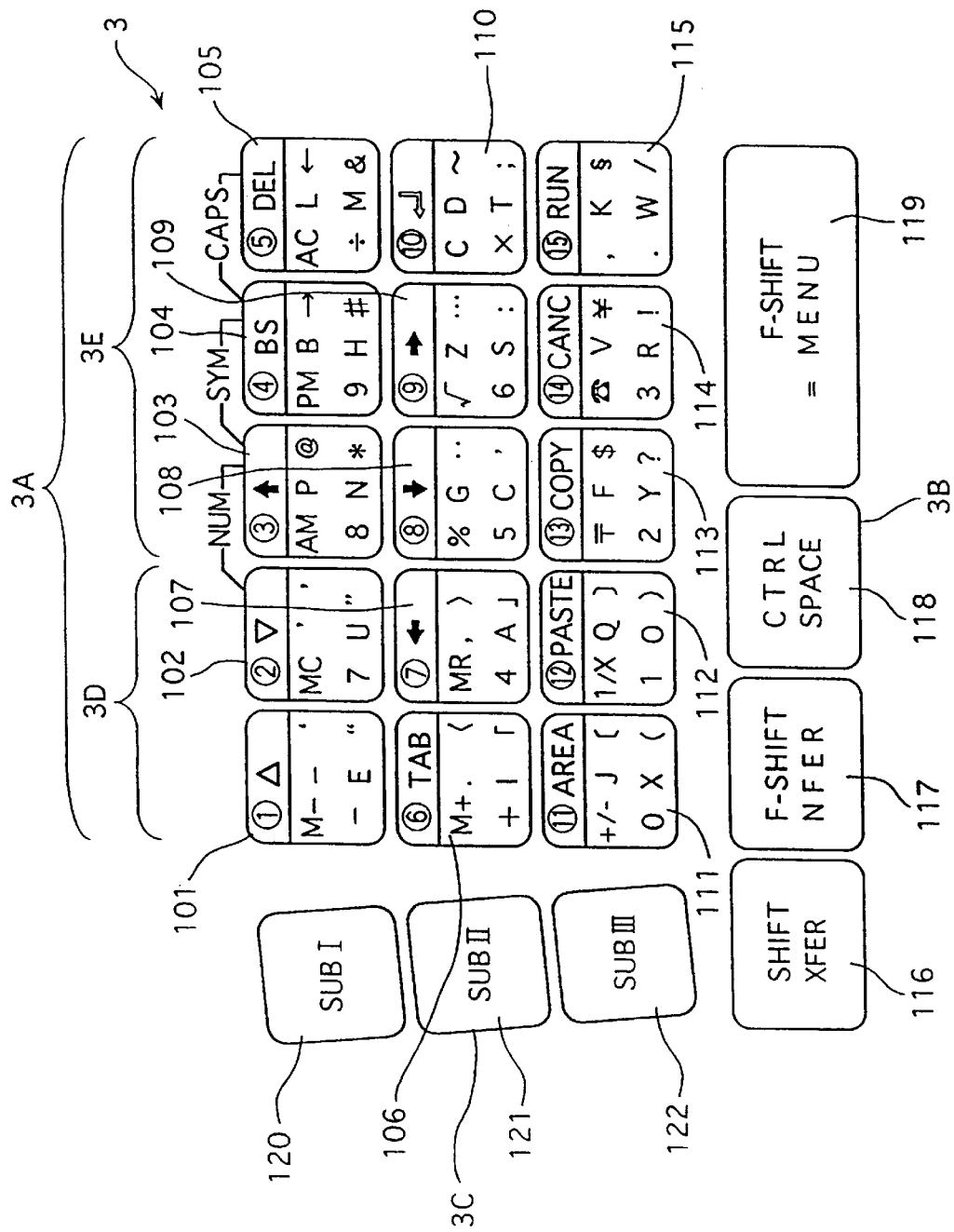
FIG. 60 is a plan view of the letter latwistedt on the keyboard-type input apparatus used as a personal computer related to the second embodiment of the present invention.

FIG. 60 shows the second embodiment of the keyboard-type input apparatus devised in a consideration of an application for a keyboard of personal computer, being substituted for the above-mentioned arrangement of the word-processor's function and this arrangement is almost similar to that of the above-mentioned embodiment except display letters which are English and in the description of this figure, the same reference numerals are used to designate the same or similar components as those in the first embodiment, so that the description will be omitted.

Figure 61:
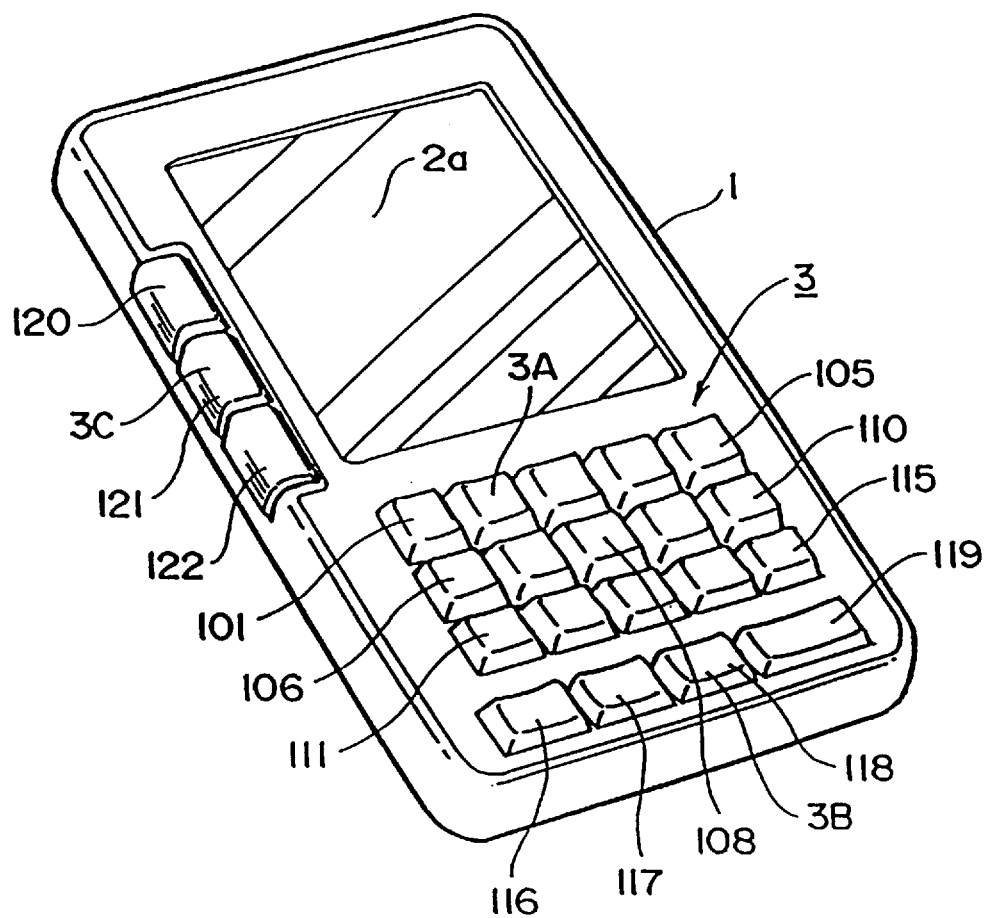
FIG. 61 is a perspective view of the third embodiment of the present invention.
Figure 63:
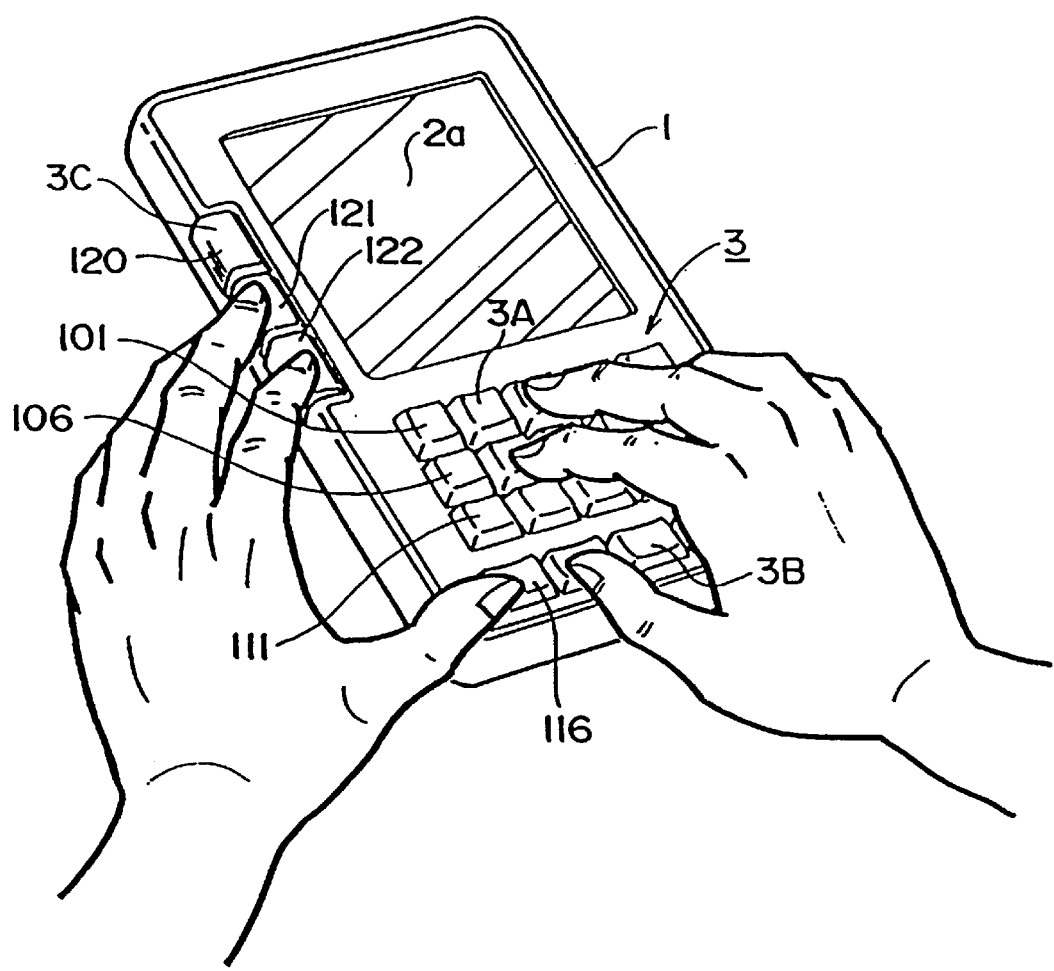
FIG. 63 is a perspective view of the using state of the third embodiment of the present invention.

FIGS. 61 and 63 show examples of the third embodiment of the keyboard-type input apparatus relating to this invention and examples in which this invention is applied to a VERTICAL TYPE integrated with a liquid crystal screen and the word-processor body 1. The VERTICAL TYPE is used in the same way as a HORIZONTAL TYPE, that is when holding it by the left hand, the right fingers presses the main key and the control key and the left thumb presses the subkey simultaneously, and in this case, the left thumb's cushion can press the side-by-side two keys.

The third embodiment is basically similar to the first embodiment and the same reference numerals are used to designate the same or similar components as those in the first embodiment, so that the explanation is omitted.

Figure 62:
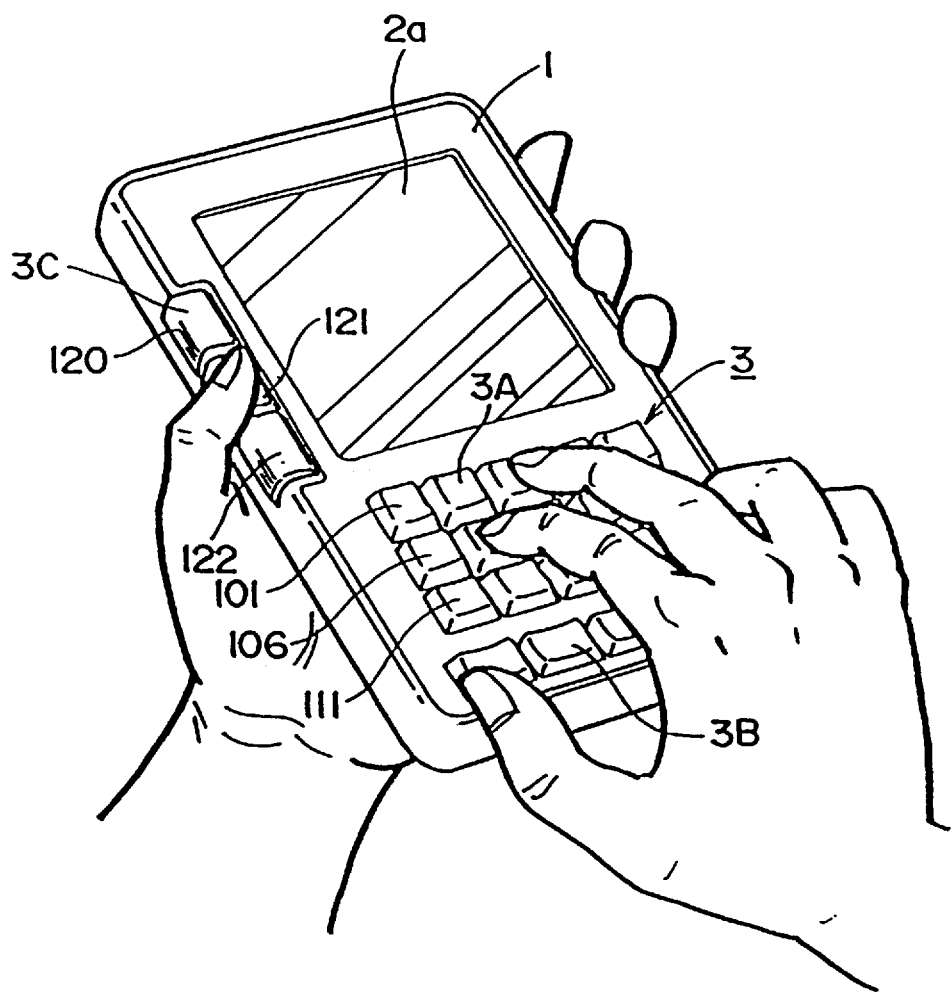
FIG. 62 is a perspective view of the using state of the third embodiment of the present invention.

FIGS. 62 and 63 show how to use this word-processor and FIG. 62 shows the COMPOUND INPUT in which the left hand holds it and the right fingers press the keys in the main key area 3A and in the control key area 3B, when the left thumb presses the key in the subkey area 3C simultaneously. FIG. 63 shows how to use it on the desk, that is the left index and middle fingers are put on the keys in the subkey area 3C and the left thumb presses one section of the control key, whereby various COMPOUND INPUT is being done.

This VERTICAL TYPE considers that the fingers and hands are not used unnaturally in the view of the human engineering like the HORIZONTAL TYPE. When it is held, the left thumb can operate the subkey in a natural position and when it is used on the desk, you can always operate it in an easy posture with both hands opening comfortably. When the left hand is occupied, you can easily operate all letters, figures, symbols, functions and modes by only the right fingers.

Figure 64:
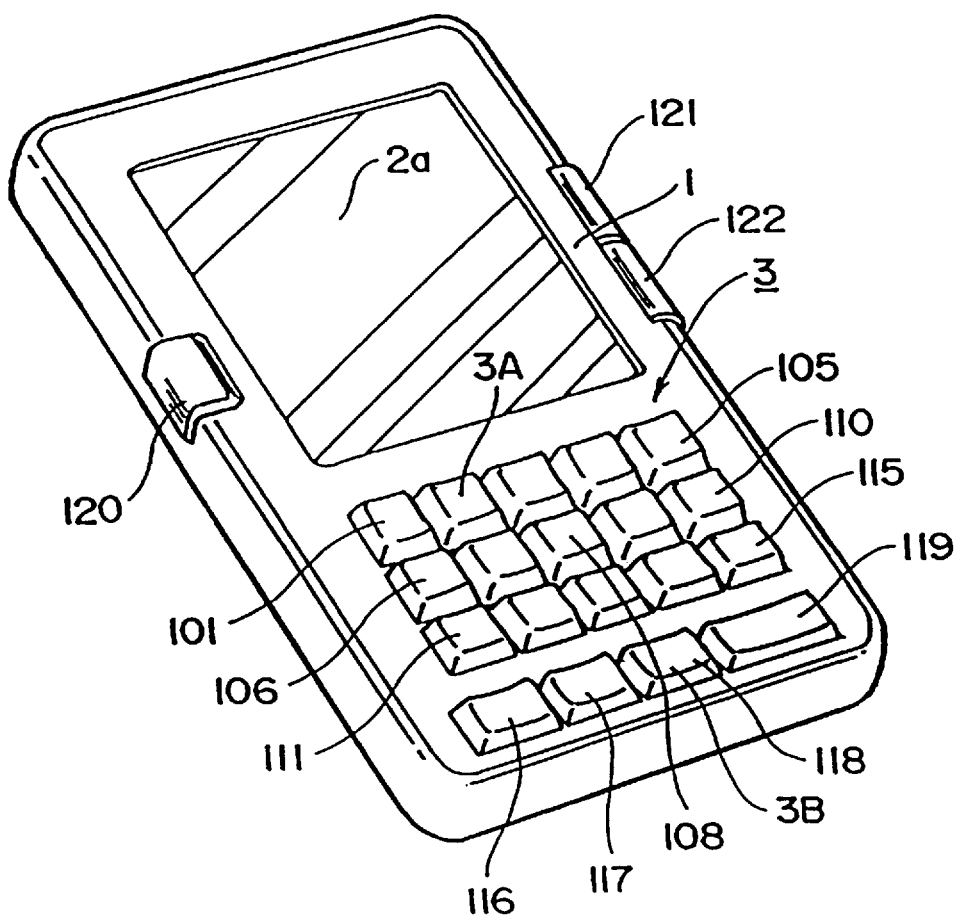
FIG. 64 is a perspective view of the forth embodiment of the present invention.

FIG. 64 shows the fourth embodiment in this invention and the subkey-II 121 and subkey-III 122 are arranged on the right side of the word-processor's body 1, which considers that the left index and middle finger can easily operate the subkey-II 121 and subkey-III 122 when the word-processor's body is held by the left hand.

Figure 65:
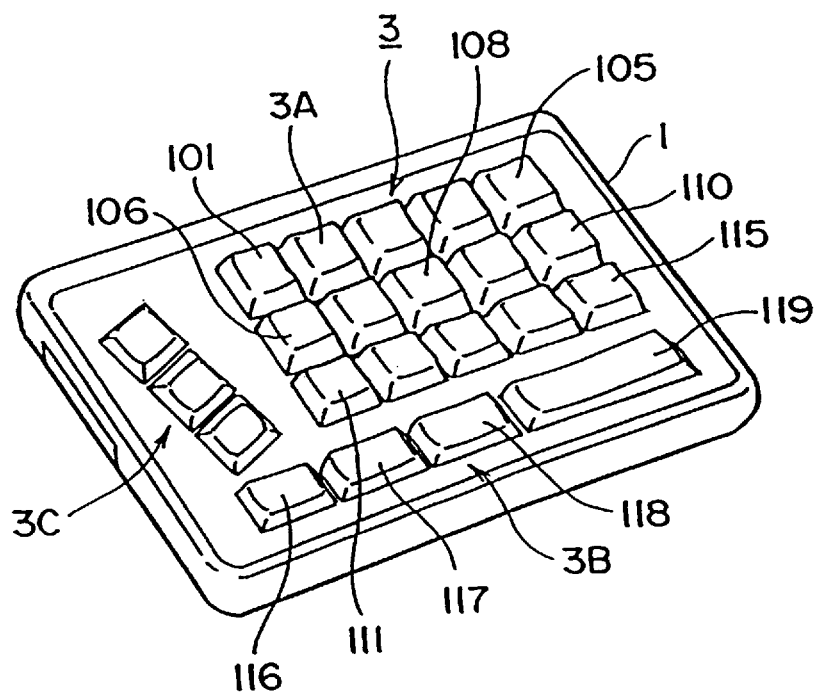
FIG. 65 is a perspective view of the fifth embodiment of the present invention.

FIG. 65 shows the fifth embodiment in this invention and in this embodiment the body of word-processor and the screen are made up separately, only the keyboard-type input apparatus consist of the whole body, and information is sent from the keyboard-type input apparatus to the body of word-processor by a so-called remote control operation.

The apparatus consisted of this keyboard-type input apparatus is capable of applying to an usual desktop model word-processor. The invention is not limited to the above-described embodiments, and various changes may be made therein without desectioning from the spirit of the present invention. Such changes are also included in the scope of the present invention.

INDUSTRIAL AVAILABILITY

The following exceeding effectiveness can be achieved by the present invention as described above.

According to the invention mentioned in claim 1, it is basic characteristic of a keyboard-type input apparatus to comprise a main key area consisting of at least fifteen keys in vertical three lines and horizontal five lines and including a basic side on either right or left side of the line, a vowel sound area consisting of two lines of keys in the basic side in the main key area and inputting vowel sounds, and a consonant sound area consisting of the remained three line of keys the main key area and inputting consonant sounds, so that frequently used vowel sounds can be inputted by actively used index fingers because the vowel sound area is assigned as a position of index fingers and the consonant sound area is assigned as a position of middle fingers, ring fingers and little fingers upon inputting keys by hands stood by on the keys arranged with three lines and five lines for typing.

According to the invention mentioned in claim 2, it is characteristics of the keyboard-type input apparatus that a home position instruction means indicating a home position on the keys at the middle line, arranged in the main key area is formed, so that respective positions placed fingers in the main key area composed of the fifteen key in vertical three lines and horizontal five lines are easily distinguished It is characteristics of the keyboard-type input apparatus that vowel and/or consonant sound are arranged at each key in the vowel and/or consonant sound area in a predetermined high frequent order depending on an easy-pressing order in accordance with the invention mentioned in claim 3 and that the easy-pressing order starts from the basic side of the middle line to the opposite side, from the basic side of the upper line to the opposite side, and from the basic side of the lower line to the opposite side in accordance with the invention mentioned in claim 4, so that the operation on the key input can be elevated by allotting the most actively used index fingers in whole fingers for high frequency used letters and middle fingers, ring fingers and little fingers to other letters in order of using frequently.

Since vowel keys inputting Japanese vowels, "A", "I", "U", "E" and "O" are arranged in the vowel sound area and consonant keys inputting voiceless sounds, making Japanese "Ka group" to "Wa group" by a combination of the vowel keys are arranged in the consonant sound area according to the keyboard-type input mentioned in claim 5, the operation of the Japanese input needed to press alternately the consonant sound and vowel sound can be elevated by allotting the frequently used vowel sound in Japanese, "A", "I", "U", "E" and "O", for the area managed by the index fingers and the consonant sound, "K", "S", "T", "N", "H", "M", "Y", "R" and "W", for the middle fingers, ring fingers and little finger.

Since keys of "I" and "A" are arranged from the basic side at the middle line, keys of "E" and "U" are arranged from the basic side at the upper line, and "O" is arranged on either key at the lower line in the vowel sound area according to the keyboard-type input apparatus mentioned in claim 6, letters of "I" and "A" used most frequently in Roman letters are arranged at the middle line as the home position and vowel keys of "E", "U" and "O" are arranged at the upper line and lower line in frequent order. It could be possible to memorize easily the key positions because the vowel key arrangement in the vowel sound area depends on "A", "I", "U", "E", "O" in an easy-pressing order of keys (the middle line, upper line and lower line).

According to the keyboard-type input apparatus mentioned in claim 7, in the keyboard-type input apparatus mentioned in claim 5, "K", "S" and "T" are arranged from the basic side at the middle line, "N", "H" and "M" are arranged from the basic side at the upper line, and "Y", "R" and "W" are arranged from the basic side at the lower line in said consonant sounds area, so that it could be easy to memorize the positions of respective keys in the consonant sound area because the key arrangement in the consonant sound area is arranged with "Ka", "Sa", "Ta", "Na", "Ha", "Ma", "Ya", "Ra" and "Wa" in frequent order.

In the keyboard-type input apparatus mentioned in claim 8, a shift key changing each key in the main key area to either a shift condition or non-shift condition is included and "G", "Z", "P" and "B" inputting Japanese voiced consonants and P-sound by a combination of vowels "A", "I", "U", "E" and "O" in the shift condition of each "K", "S", "T", "N" and "H" are arranged in the consonant sound area, so that it is easy to memorize the key positions of a voiced consonant and P-sound because "Ga", "Za" and "Da" are arranged at input positions corresponding to "Ka", "Sa" and "Ta" and "Pa" and "Ba" are arranged at input positions corresponding to "Na" and "Ha".

According to the keyboard-type input apparatus mentioned in claim 9 and claim 10, it is characteristic of the keyboard-type input apparatus mentioned in claim 5 that keys inputting a nasal sound " ん ", a double consonant " っ ", a period " ､ ", a comma " ｡ " and a long sound " ─ " are arranged in the main key area and a key " ん " is arranged at the end of the lower line in said vowel sound area, so that the nasal sound " ん " can be easily inputted by being able to be pressed the nasal sound " ん ", the double consonant " っ ", the period " ､ ", the comma " ｡ " and the long sound " ─ " at one time in case of few keys arranged on a keyboard, in sectionicular, and by arranging the nasal sound " ん " key at the key of the lower line in the vowel sound area.

Since the keyboard-type input apparatus mentioned in claim 11 includes the shift key changing each key in the main key area to either the shift condition or non-shift condition and establishes, one index finger can smoothly input the comma ",", the period ".", the hyphen "-" and the apostrophe "'" while the sentence input.

According to the keyboard-type input apparatus mentioned in claim 12, the keyboard-type input apparatus mentioned in claim 1 has change means for changing Japanese input mode by Roman letter input and English mode by alphabet input, so that change of English input and Japanese input and input of English and Japanese in the same key arrangement. According to the keyboard-type input apparatus mentioned in claim 13, since "O" and "X" are arranged at the lower line in the vowel sound area, "X" used almost never in the Japanese input and scarcely as alphabet is effectively arranged in the key arrangement with few keys.

According to the keyboard-type input apparatus mentioned in claim 14, the keyboard-type input apparatus mentioned in claim 12 arranges "K/C" keys at the home position keys of the middle finger at the middle line in said consonant sound area and "K/C" keys becoming a consonant sound "K" in the case of Japanese mode and becoming an alphabet "C" in the case of English mode, so that "K" used frequently in Japanese and used scarcely in -English is separately arranged from a "K" key of English.

According to the keyboard-type input apparatus mentioned in claim 15, it is characteristic of the keyboard-type input apparatus mentioned in claim 12 that the shift key changing each key of the main key area to either the shift condition or non-shift condition is included and a hyphen symbol "-", an apostrophe symbol "'", "P", "B" and "L" are arranged from the basic side at the upper line in the shift condition, a period ".", a comma ",", "G", "Z" and "D" are arranged from the basic side at the middle line in the shift condition, and "J", "Q", "F", "V" and "K" are arranged from the basic side at the lower line in the shift condition in said main key area, so that English standard input for the punctuation reference numerals of the period ".", the comma ",", the hyphen symbol "-" and the apostrophe symbol "'" and the consonant sound of "P", "B", "L", "J", "Q", "F", "V" and "K" can be operated by the shift operation.

According to the keyboard-type input apparatus mentioned in claim 16, the keyboard-type input apparatus mentioned in claim 1 includes a function control key changing each key in the main key area from a letter key condition to the function key condition and establishes functions such as, so that respective keys of the main key area are in a function condition by the operation of the function control key and functions such as "RETREAT, NEW LINE, ENTER, DELETE, TAB, MOVEMENT, REGION SETUP, SINGLE CHINESE CHARACTER, FORMER SELECTION, BUSHU SEPARATION, FIELD SEPARATION" are able to be operated with receptive fifteen keys in vertical three lines and horizontal five lines.

In the keyboard-type input apparatus of claim 17, the keyboard-type input apparatus mentioned in claim 16, the function control key is arranged at the place where the thumb can press when the middle line becomes a home position of an index, middle, ring and little fingers, so that the key operation can become easier by the combination of five fingers of one hand, the thumb, index, middle, ring and little fingers.

In the keyboard-type input apparatus described in claim 16, the keyboard-type input apparatus of claim 18 is that the function control key includes plural subkeys arranged at the basic side of the main key area and plural control keys arranged at the lower line in the main key area, so that the function operation can become easier by adding combinations of plural subkeys.

According to the keyboard-type input apparatus mentioned in claim 19, the keyboard-type input apparatus mentioned in claim 1 includes the shift key changing each key of the main key area to either the shift condition or non-shift condition and a side-by-side finger shift input means for producing a symbol code established in the shift condition of one of keys pressed simultaneously when plural keys pressed by a predetermined combination simultaneously, so that letters in the shift position can be inputted even though the shift operation of the shift key is not carried out.

Since the keyboard-type input apparatus mentioned in claim 20 includes the function shift input means for entering a predetermined function when pressing plural keys by the predetermined combination, it is possible of the function operation and more kinds of function selection in independence of the operation of the function control key.

According to the keyboard-type input apparatus mentioned in claim 21, it is characteristic of the keyboard-type input apparatus mentioned in claim 19 that the predetermined combination is a combination of two side-by-side keys at the same line, so that letters in the shift positions are inputted by the shift operation with using adjoining fingers such as the index finger and middle finger, the middle finger and ring finger, and the ring finger and little finger.

According to the keyboard-type input apparatus mentioned in claim 22, the keyboard-type input apparatus mentioned in claim 19 has the predetermined combination which is a combination of keys at the upper, middle and lower lines in the opposite side of the basic side, and the key operation in a lower key position is always operated by one shorter finger of the adjoining fingers such as the index finger and middle finger, the middle finger and ring finger and the ring finger and little finger, so that letters in the shift position can be inputted by the shift operation of the keys in the inborn moving condition of finger.

According to the keyboard-type input apparatus mentioned in claim 23, the keyboard-type input apparatus mentioned in claim 1 has a structure that a compound input means for producing the preestablished symbol code against a combination of keys pressed simultaneously when plural keys arranged in the main key area are pressed simultaneously, so that COMPOUND INPUT is carried out the operation of letters, figures, symbols, functions and modes as a chord played the piano by using the combination of plural keys.

In the keyboard-type input apparatus mentioned in claim 24, the compound input means includes a vowel compound input means for producing Japanese letter codes of a TWISTED sound and diphthong when pressing plural vowel keys establishing vowel sounds which become a TWISTED sound and diphthong simultaneously, so that the key operation operated as the chord played the piano enable the input of the TWISTED sound such as "sya", "syu", "syo" and so on and the diphthong word such as "AI", "UI", "EI", "UU", "OU" and so on to carry out at one pressing operation, for example a word of "会計 KAIKEI" is typed by one pressing operation of KAI and one pressing operation of KEI.

Since it is characteristic of the compound input means of the keyboard-type mentioned in claim 25 to includes a pattern record means for recording letter lines in correspondence with a combination pattern and the pattern of plural keys, a pattern comparing means for comparing a key combination pressed simultaneously when plural keys are pressed simultaneously with the pattern recorded in the pattern record means, and a letter selection means for outputting by acquiring the letter line in correspondence with the pattern from the pattern record means when an applied pattern is discovered by the pattern comparing means, the pattern of the letter combination in the operation by the pressing plural keys at one time is compared by the pattern comparing means and the applied pattern in correspondence with the above pattern is discovered in the pattern comparing means, from which the above-mentioned letter line in correspondence with the applied pattern is selected and outputted by the letter selection means.

According to the keyboard-type input apparatus mentioned in claim 26, a structure of the keyboard-type input apparatus mentioned in claim 25 is that the letters in correspondence with the combination patterns by the keys and different letter lines are established and the letter line selection means is composed in order to select the plural letter lines in turns by the key operation, so that even though the letter line composed of different pattern is selected, the order of letters line could be changed by the predetermined key operation, for example, in the case of free from order of the vowel sound and consonant sound such as "on" and "no", the letters are exactly displayed by pressing the function key on inputting the letter order.

According to the keyboard-type input apparatus mentioned in claim 27, the keyboard-type input apparatus mentioned in claim 25 causes the above-mentioned patterns to have totally fifteen patterns such as six patterns of (A) consonant+vowel, (B) consonant+consonant (C) vowel+vowel (D) diphthong consonants (E) diphthong vowels (F) vowel+consonant for two-letter unit and nine patterns of (G) consonant+vowel+consonant (H) consonant+consonant+vowel (I) consonant+consonant+consonant (J) consonant+diphthong vowels (K) vowel+vowel+consonant (L) vowel+consonant+consonant (M) vowel+diphthong consonants (N) consonant+vowel+consonant (O) vowel+consonant+vowel for three-letter unit, so that in sectionicular it is possible for the English input to be operated by the fast input with retrieving a word inputted by the compound input at one pressing from the fifteen patterns.

According to the keyboard-type input apparatus mentioned in claim 28, the keyboard-type input apparatus mentioned in claim 25 causes the above-mentioned patterns to have the TWISTED sounds' patterns of "consonant+Y+vowel" such as "しゃ" /sha/, "しゅ" /shu/ and "しょ" sho/ concerning the spelling of Japanese Roman input, so that it is possible that the simultaneous input of the vowel sound and consonant sound, and also the fast input of the TWISTED sound by one press are operated.

According to the keyboard-type input apparatus mentioned in claim 29, the keyboard-type input apparatus mentioned in claim 25 causes the above-mentioned patterns to have the patterns including nasal sounds like "vowel+nasal" such as "あん" /an" いん" /in/ and "うん" /un/ and "consonant+nasal" such as "かん" /kan/, "きん" /kin/, and "くん" /kun/ at the end concerning the spelling of Japanese Roman input, so that it is possible that the fast input of letters line including nasal sound at the end such as "consonant+nasal" and so on is operated.

According to the keyboard-type input apparatus mentioned in claim 30, it is characteristic of the keyboard-type input apparatus mentioned in claim 1 that a cursor movement key established in said main key area and a cursor movement signal output means for outputting a cursor movement signal moving the cursor displayed by a monitor of a word-processor and personal computer when the cursor movement key is pressed are included, so that upon pressing the cursor movement key by a finger placed on the cursor movement key established in the main key area, the key operation could operate the cursor with the cursor movement signal inputted from the cursor movement signal output means.

As the forgoing description about the present invention, the vowel sound area of the two lines in the left or right side of the keyboard is assigned as the pressing area for one index finger and the consonant sound area of the other three lines in the left or right is assigned as the pressing area for the middle finger, ring finger and little finger from the left of the lines in order, or seeing that the assigned area is effective in the smooth movement of the finger on the keyboard, the position charged by index finger is assigned at the two lines of the left or right side in vertical three lines and horizontal five lines and the position charged by the meddle finger, ring finger and little finger is assigned at the other three lines of the left or right side.

The twice line to fifth line in the middle line are home positions for four fingers standing ready for typing to type effectively even with using only the right hand, whereby keys of "letters, symbols, functions, modes" are arranged in compound in order of easy typing and memorizing the positions of keys on the keyboard more than the conventional keyboard in order to be able to input fast and always by touch-typing with pressing simultaneously the combination of plural keys.

The present invention has the advantage of establishing the keyboard into a word-processor of portable notebook model or palm-tpp model, a personal computer or so on in the no-changing convenience of operation because the figure of keys on the keyboard is decreased from the conventional key figure of keyboard to under half of the figure.

We claim:

1. A keyboard-type input apparatus, comprising a main key area consisting of at least fifteen keys arranged in a three-line and five-column state to include a basic side either on a right or left side of the column, of which two-column belongs to the basic side being provided as a vowel sound area to input vowel sounds and other columns composed of three-column being provided as a consonant sound area to input consonant sounds.

2. The keyboard-type input apparatus according to claim 1, wherein the keys arranged in said main key area includes a home position instruction means for indicating a home position at the middle of the column.

3. The keyboard-type input apparatus according to claim 1, wherein the keys in the vowel and/or consonant sounds area are lined up in conformity with an easy-pressing order and a frequency of use.

4. The keyboard-type input apparatus according to claim 3, wherein the easy-pressing order starts from the basic side to the opposite side in middle line first, in the upper line second and in the lower line third.

5. The keyboard-type input apparatus according to claim 1, wherein the keys in the vowel sound area are assigned as vowel sound keys of "A", "I", "U", "E" and "O" respectively to input Japanese vowels, and wherein the keys in the consonant sound area are assigned as voiceless sound keys of "K", "S", "T", "N", "H", "M", "Y", "R" and "W" respectively to input Japanese voiceless sound of "か行" (Ka group), "さ行" (Sa group), "た行" (Ta group), "な行" (Na group), "は行" (Ha group), "ま行" (Ma group), "や行" (Ya group), "ら行" (Ra group) and "わ行" (Wa group) in conjunction with the vowel sound keys.

6. The keyboard-type input apparatus according to claim 5, wherein the keys' assignment in the vowel sound area is such that keys for inputting "I" and "A" are arranged in this order from the basic side on the middle line, keys for inputting "E" and "U" are arranged in this order from the basic side on the upper line, and key for inputting "O" is arranged on either key on the lower line.

7. The keyboard-type input apparatus according to claim 5, wherein the keys' assignment in the consonant sound area is such that keys for inputting "K", "S" and "T" are arranged in this order from the basic side on the middle line, keys for inputting "N", "H" and "M" are arranged in this order from the basic side on the upper line, and keys for inputting "Y", "R" and "W" are arranged in this order from the basic side on the lower line.

8. The keyboard-type input apparatus according to claim 7, further comprising a shift key changing each key arranged in said main key area either in a shift condition or non-shift condition thereof, and wherein the respective keys of "K", "S", "T", "N" and "H" in the consonant sound area are also provided to be as keys of "G", "Z", "D", "P" and "B" inputting Japanese voiced consonants and P-sound in conjunction with the vowel sound keys of "A", "I", "U", "E" and "O".

9. The keyboard-type input apparatus according to claim 5, wherein some of the keys in said main key area are also provided to input a nasal sound "ん" /n/, a double consonant "っ" /t/, a period "、", a comma "。" and a long sound "ー" arranged in said main key area.

10. The keyboard-type input apparatus according to claim 9, wherein one key on the lower line in the vowel sound area is assigned as a key of "ん" /n/.

11. The keyboard-type input apparatus according to claim 1, further comprising a shift key changing each key arranged in said main key area either in a shift condition or non-shift condition thereof, and wherein the keys in the vowel sound area under the shift condition are adapted to input a comma ",", a period ".", a hyphen "-" and an apostrophe "'".

12. The keyboard-type input apparatus according to claim 1, further comprising a change means for alternating a Japanese input mode by means of Roman letter input and English input mode by Alphabet input.

13. The keyboard-type input apparatus according to claim 12, wherein the keys on the lower line in the vowel sound area are assigned as "O" and "X".

14. The keyboard-type input apparatus according to claim 12, wherein the key at a home position for the middle finger on the middle line and on the one column in the consonant sound area is provided as a key of "C/K" to input the consonant sound "K" in the Japanese input mode and to input an alpabet "C" in the English input mode.

15. The keyboard-type input apparatus according to claim 12, further comprising a shift key changing each key arranged in said main key area either in a shift condition or non-shift condition thereof, and wherein the keys arranged in said main key area are arranged such that the keys on the upper line under the shift condition are assigned respectively from the basic side as a hyphen symbol "-", an apostrophe symbol "'", "P", "B" and "L", the keys on the middle line under the shift condition are assigned respectively from the basic side as a period ".", a comma ",", "G", "Z" and "D", and the keys on the lower line under the shift condition are assigned respectively from the basic side as "J", "Q", "F", "V" and "K".

16. The keyboard-type input apparatus according to claim 1, further comprising a function control key alternating each key in said main key area between under a letter key condition and under a function key condition, the keys in said main key area under the function key condition being adapted to carry out "後退" (RETREAT), "削除" (DELEATE), "改行" (LINE FEED), "実行" (RETURN), "取消" (CANCEL), "タブ" (TAB), "移動" (MOVE), "領域設定" (REGION SETUP), "単漢字" (SINGLE CHINESE CHARACTER), "前候補" (FORMER SELECTION), "部首別" (SORTING ON STANDARD COMMON PART COMPOSING CHINESE CHARACTER), and "分野別" (SORTING ON FIELD).

17. The keyboard-type input apparatus according to claim 16, wherein said function control key is provided at a place to be pressed with a thumb when the middle line row is used as a home position for waiting index, middle, ring and little fingers.

18. The keyboard-type input apparatus according to claim 16, wherein said function control key consists of plural subkeys arranged outside of the basic side of said main key area and plural control keys arranged below the lower line in said main key area.

19. The keyboard-type input apparatus according to claim 1, further comprising a shift key changing each key arranged in said main key area either in a shift condition or non-shift condition thereof, and a side-by-side finger shift input means for generating a symbol code established under the shift condition of one key when the one key and other keys corresponding to the one key are pressed at the same time.

20. The keyboard-type input apparatus according to claim 16, further comprising a function shift input means for carrying out a predetermined function upon pressing plural associated keys at the same time.

21. The keyboard-type input apparatus according to claim 20, wherein the plural associated keys are two side-by-side keys in one line.

22. The keyboard-type input apparatus according to claim 20, wherein the plural associated keys are of key combinations selected from the upper or middle line and from one line lower than the upper or middle line at an opposite to the basic side.

23. The keyboard-type input apparatus according to claim 1, further comprising a compound input means for generating a predetermined symbol code corresponding to a combination state of keys which are pressed simultaneously.

24. The keyboard-type input apparatus according to claim 23, wherein said compound input means is provided with a vowel compound input means for producing Japanese letter codes of a twisted sound or diphthong when simultaneously pressing plural vowel sound keys establishing vowel sounds which become the twisted sounds or diphthong.

25. The keyboard-type input apparatus according to claim 23, wherein said compound input means includes a pattern record means for recording a combination pattern of plural keys and a character string corresponding to the combination pattern, a pattern comparing means for comparing the combination of plural keys pressed simultaneously with the pattern recorded in the pattern record means, and a character string selection means for obtaining and outputting the character string from the pattern record means corresponding to the patterns when an applied pattern is find out in the pattern comparing means.

26. The keyboard-type input apparatus according to claim 25, wherein plural character string in a different arrangement are established corresponding to the combination pattern of the keys, and wherein the character string selection means is adapted to select the plural character strings in turns in accordance with a predetermined key operation.

27. The keyboard-type input apparatus according to claim 25, wherein the patterns are defined by fifteen patterns; six patterns of two letters (A) consonant+vowel, (B) consonant+consonant, (C) vowel+vowel, (D) diphthong consonants, (E) diphthong vowels, (F) vowel+consonant; and nine patterns of three letters (G) consonant+vowel+consonant, (H) consonant+consonant+vowel, (I) consonant+consonant+consonant, (J) consonant+diphthong vowels, (K) vowel+vowel+consonant, (L) vowel+consonant+consonant, (M) vowel+diphthong consonants, (N) consonant+vowel+consonant, (O) vowel+consonant+vowel.

28. The keyboard-type input apparatus according to claim 25, wherein the patterns belong to the twisted sound patterns of "consonant+Y+vowel" such as "しゃ" /sya/, "しゅ" /syu/ and "しょ" /syo/ concerning the spelling of Japanese Roman input.

29. The keyboard-type input apparatus according to claim 25, wherein the patterns are to include syllabic nasal sound at the end such as "vowel+syllabic nasal", for example "あん" /an/, "いん" /in/ and "うん" /un/ and "consonant+syllabic nasal", for example "かん" /kan/, "きん" /kin/ and "くん" /kun/ concerning the spelling of Japanese Roman input.

30. The keyboard-type input apparatus according to claim 1, further comprising a cursor movement key provided in said main key area and a cursor movement signal output means for outputting a cursor movement signal moving the cursor displayed on a monitor of a word-processor or personal computer when the cursor movement key is pressed.

* * * * *